US011567542B2

(12) United States Patent
Miller et al.

(10) Patent No.: US 11,567,542 B2
(45) Date of Patent: Jan. 31, 2023

(54) HINGES FOR ELECTRONIC DEVICES AND ACCESSORY DEVICES

(71) Applicant: Apple Inc., Cupertino, CA (US)

(72) Inventors: Ari P. Miller, San Francisco, CA (US); Kevin M. Robinson, Sunnyvale, CA (US); Chien-Tsun Chen, Taipei (TW)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 16/821,875

(22) Filed: Mar. 17, 2020

(65) Prior Publication Data

US 2020/0301480 A1    Sep. 24, 2020

Related U.S. Application Data

(60) Provisional application No. 62/895,394, filed on Sep. 3, 2019, provisional application No. 62/820,199, filed on Mar. 18, 2019.

(51) Int. Cl.
*G06F 1/16* (2006.01)
*F16C 11/04* (2006.01)
(Continued)

(52) U.S. Cl.
CPC ............. *G06F 1/1681* (2013.01); *E05D 1/04* (2013.01); *E05D 11/00* (2013.01); *E05D 11/082* (2013.01); *E05D 11/1028* (2013.01); *F16C 11/04* (2013.01); *G06F 1/1616* (2013.01); *E05Y 2201/62* (2013.01); *E05Y 2600/13* (2013.01); *E05Y 2900/606* (2013.01)

(58) Field of Classification Search
CPC .... G06F 1/1613; G06F 1/1615; G06F 1/1616; G06F 1/1681; G06F 1/1626; G06F 1/1628; G06F 1/1656; E05D 11/082; E05D 11/1028; E05D 7/00; E05D 7/06; E05D 7/1005
See application file for complete search history.

(56) References Cited

U.S. PATENT DOCUMENTS 6,223,393 B1 * 5/2001 Knopf ................... G06F 1/1618
16/386
6,502,496 B1 * 1/2003 Ravid ....................... F41H 7/04
138/140

(Continued)

*Primary Examiner* — Anthony Q Edwards
(74) *Attorney, Agent, or Firm* — BakerHostetler

(57) ABSTRACT

An accessory device for an electronic device is disclosed. The accessory device includes multiple sections, with one section holding the electronic device, and another section having an input mechanism, such as a keyboard. The accessory device includes a hinge assembly that allows relative movement of the sections with respect each other. An additional hinge assembly is integrated with the section carrying the electronic device, and provides additional flexibility and range of motion of the section, thereby allowing a user to position the electronic device at multiple different angles relative to the section carrying the input mechanism. Also, each hinge assembly may include multiple roller and spacer elements, as well as a retention structure passing through each roller element and spacer element. The retention structure can provide tension to increase the frictional force between the roller and spacer elements, and/or provide counterbalance to offset the weight of the electronic device.

19 Claims, 39 Drawing Sheets

(51) Int. Cl.
*E05D 11/00* (2006.01)
*E05D 11/08* (2006.01)
*E05D 11/10* (2006.01)
*E05D 1/04* (2006.01)

(56) References Cited

U.S. PATENT DOCUMENTS

| | | | |
|---|---|---|---|
| 6,515,852 B2 | 2/2003 | Huang et al. | |
| 7,055,656 B2* | 6/2006 | Drew | F16C 1/26 188/65.1 |
| 7,136,280 B2* | 11/2006 | Jobs | F16M 11/14 285/146.1 |
| 7,773,371 B2* | 8/2010 | Hillman | F16M 11/08 361/679.06 |
| 9,532,631 B2 | 1/2017 | Gu | |
| 9,606,583 B2* | 3/2017 | Ahn | G06F 1/1641 |
| 9,740,238 B2 | 8/2017 | Han | |
| 10,503,207 B1* | 12/2019 | Knoppert | G06F 1/3262 |
| 10,642,318 B1* | 5/2020 | Lehmann | G06F 3/016 |
| 10,664,012 B1* | 5/2020 | Zimmerman | G06F 1/166 |
| 10,968,673 B2* | 4/2021 | Aagaard | H04M 1/0268 |
| 11,079,807 B1* | 8/2021 | Robinson | E05D 11/0081 |
| 2003/0100338 A1 | 5/2003 | Lee | |
| 2016/0132075 A1* | 5/2016 | Tazbaz | G06F 1/1618 361/679.27 |
| 2018/0107253 A1* | 4/2018 | Landwehr | G06F 1/1681 |
| 2018/0168303 A1* | 6/2018 | Marks | G06F 1/1626 |

* cited by examiner

HINGES FOR ELECTRONIC DEVICES AND ACCESSORY DEVICES

CROSS-REFERENCE TO RELATED APPLICATION(S)

This application claims the benefit of priority to i) U.S. Provisional Application No. 62/820,199, filed on Mar. 18, 2019, titled "HINGES FOR ELECTRONIC DEVICES AND ACCESSORY DEVICES," and ii) U.S. Provisional Application No. 62/895,394, filed on Sep. 3, 2019, titled "HINGES FOR ELECTRONIC DEVICES AND ACCESSORY DEVICES," the disclosure of EACH is incorporated herein by reference in their entirety.

FIELD

The following description relates to hinges that are integrated with electronic devices and accessory devices. In particular, the following description relates to hinges formed from an assembly of multiple roller elements, as well as multiple spacer elements, or linking elements, positioned between adjacent roller elements. In order to maintain engagement between the roller elements and spacer elements, a hinge described herein may include one or more retention structures, or straps, that pass through each roller element and each spacer element. In order for the hinge to rotate or re-position sections or housing parts of the accessory devices and electronic devices, the hinge allows for rotational movement of the roller elements relative to the spacer elements, along with synchronous movement of the roller elements and the spacer elements.

BACKGROUND

Portable electronic devices and accessory devices may include a hinge that allows rotational movement of one part relative to another part. Some hinges include a C-shaped friction clip that surrounds a shaft. While one part (of the portable electronic device or accessory device) is rotated relative to the other part, the friction clip rotates around the shaft. When the rotation ceases, the friction between the friction clip and the shaft hold the parts in a fixed position.

These types of hinges have some drawbacks. For instance, the holding force (due to frictional engagement between the C-shaped friction clip and the shaft) is a function of the size of the friction clip and the shaft. Accordingly, the size must be adjusted based upon the weight of the device. Further, in the instance of an accessory device, the size must be adjusted based upon the weight of not only some parts of the accessory device, but also the weight of an electronic device that is carried by the accessory device.

SUMMARY

In one aspect, an accessory device suitable for use with an electronic device is described. The accessory device may include a first section that includes a first segment and a second segment coupled to the first segment by a first hinge assembly. The accessory device may further include a second section coupled to the first section by a second hinge assembly. The second section may include an input mechanism configured to provide a command to the electronic device. In some instances, a first position comprises the first section positioned over the second section and the first segment being fixed relative to the second segment. Also, in some instances, a second position includes the first section rotated away from the second section via the first hinge assembly such that the input mechanism is uncovered by the first section, and the first segment is rotated relative to the second segment via the second hinge assembly.

In another aspect, an accessory device suitable for use with an electronic device is described. The accessory device may include a first section that defines a receiving surface for the electronic device. The accessory device may further include a second section that includes an input mechanism configured to provide a command to the electronic device. The accessory device may further include a hinge assembly coupled to the first section and the second section. The hinge assembly may include a first roller element. The hinge assembly may further include a second roller element. The hinge assembly may further include a spacer element that engages the first roller element and the second roller element. In some instances, the first roller element and the second roller element rotate along the spacer element while the first section rotates relative to the second section.

In another aspect, an accessory device suitable for use with an electronic device is described. The accessory device may include a first section that includes a first segment and a second segment coupled to the first section by a first hinge assembly. The accessory device may further include a second section coupled to the first section by a second hinge assembly. The second section may include an input mechanism configured to provide a command to the electronic device. In some instances, a first position includes the electronic device engaged with the first segment and the second segment. Also, in some instances, a second position includes the first section rotated relative to the second section to a maximum angle based on the second hinge assembly, and the second segment is free of contact with the electronic device.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
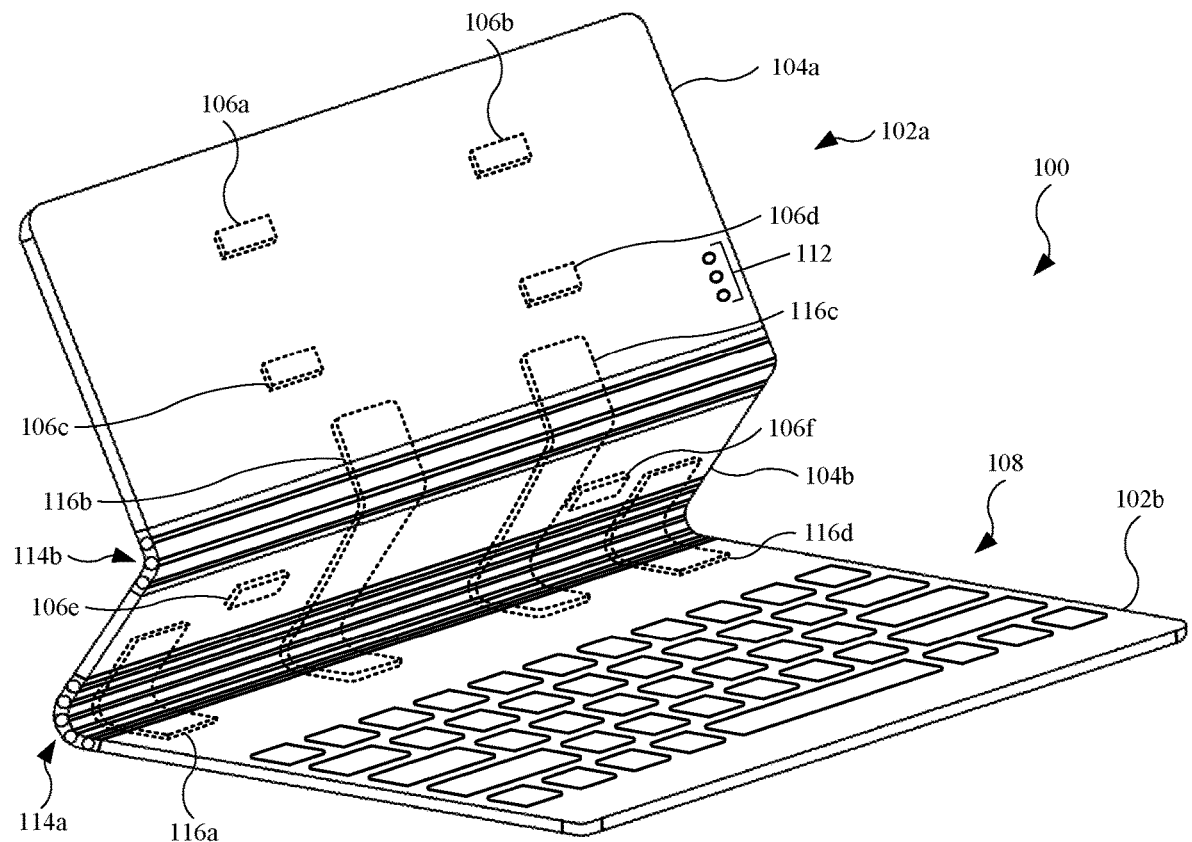
FIG. 1 illustrates an isometric view of an embodiment of an accessory device, showing the accessory device in an open position, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an accessory device that is suitable for use with portable electronic devices, including mobile wireless communication devices (such as smartphones and tablet computer devices). Accessory devices described herein may include multiple sections, or covers, that are coupled to each other by a hinge assembly, thereby allowing the sections to move relative to each other (based upon the hinge assembly). For instance, one section is designed to receive and couple with the portable electronic device by, for example, magnets, while another section may include an input mechanism (such as a keyboard, a display, a touch pad, or a combination thereof). Using the hinge assembly, the section that holds the portable electronic device can fold away from the section that includes the input mechanism. Further, when the portable electronic device is no longer in use, the hinge assembly allows the sections to move and surround the portable electronic device, which increases eases of portability and protection of the portable electronic device.

The accessory device may include an additional hinge assembly that increases the overall performance of the accessory device. For example, the additional hinge assembly may be integrated into the section carrying the portable electronic device, thereby partitioning the section into two segments. In this manner, when the accessory device is in an open position, the additional hinge assembly allows relative movement between the segments. As a result, the section carrying the portable electronic device provides a range of motion, and the portable electronic device can be rotated to different positions. This allows the user to adjust the portable electronic device relative to the input mechanism such that the user can position the portable electronic device in a desired manner.

The hinge assemblies described herein may include one or more roller elements (including cylindrical bodies) engaged with spacer elements (or linking elements), with a spacer element positioned between adjacent roller elements. Each spacer element can provide multiple surfaces, each of which is contoured to the shape of a roller element. The movement of the hinge assembly is based in part upon the roller elements rotating along the spacer elements, as well as movement of the roller elements and the spacer elements in multiple dimensions (that is, in a three-dimensional space). Further, in some instances, the roller elements and the spacer elements synchronously move together to provide a more fluid movement of the hinge assembly, as well as the sections (of the accessory device) coupled together by the hinge assembly.

In order to maintain engagement between the roller elements and the spacer elements, hinge assemblies described herein may include one or more retention structures, or straps, that pass through each roller element and each spacer element. The retention structures may include flexible properties, but may also provide stiffness to maintain the hinge assembly (as well as a section, or sections, coupled to the hinge assembly) in a fixed position. In some instances, the tension provided by the retention structures can be adjusted, which can cause an adjustment to the frictional forces between the roller elements and the spacer elements. As a result, the frictional engagement may be based upon the retention structure under tension. Further, due in part to this friction engagement providing a holding force to support parts of the accessory device and an electronic device carried by the electronic device, the hinge assembly is less dependent upon the size of components (such as the roller elements and the spacer element), as compared to traditional hinges with C-shaped friction clips and shafts engaged with the friction clips.

While a retention structure may pass through the center of the hinge assembly, in some instances, a hinge assembly described herein includes components manufactured such that a retention structure is offset through the hinge assembly. In other words, the retention structure passes through some point other than the center of the hinge assembly. As a result, the retention structure, under tension, can provide a force to the hinge assembly, thereby promoting a transition of the accessory device to an open position or a closed position, depending upon the offset position of the retention structure.

In addition to the offset position of the retention structure, the motion of the hinge assembly can be a function of one or more variables. For example, the amount of tension, or pulling force, applied to the strap can affect the torque applied to the hinge assembly. Further, the thickness of the strap can affect the ability of the strap to bend, or resist bending. Also, in some instances, when the accessory device transitions from an open position to a closed position, the length of the strap changes. The strap may respond by resisting the length change, thereby increasing the frictional force between the components to the hinge assembly. The increased frictional force can increase the torque required to move the hinge assembly. Further, when the accessory device holds an electronic device, the counterforce, or holding force, provided by the accessory device depends upon the angle at which the hinge assembly positions the section(s) holding the electronic device. In this regard, the force provided by the hinge assembly changes based upon the position of the hinge assembly. Accordingly, the counterforce provided by the hinge assembly is a function of the angular position of the section(s). The aforementioned variables can all be manipulated to provide an accessory device with a desired user experience.

These and other embodiments are discussed below with reference to FIGS. 1-63. However, those skilled in the art will readily appreciate that the detailed description given herein with respect to these Figures is for explanatory purposes only and should not be construed as limiting.

FIG. 1 illustrates an isometric view of an embodiment of an accessory device 100, showing the accessory device 100 in an open position, in accordance with some described embodiments. The accessory device 100 is designed to hold/carry a portable electronic device (not shown in FIG. 1), such as mobile wireless communication devices including smartphones and tablet computing devices. As shown, the accessory device 100 includes a section 102a and a section 102b. The section 102a and the section 102b may be referred to as a first section and a second section, respectively. However, these designations of first and second sections can be interchangeable.

The section 102a may be divided into multiple segments. For example, as shown, the section 102a includes a segment 104a and a segment 104b. The segment 104a and the segment 104b may be referred to as a first segment and a second segment, respectively. However, these designations of first and second segments can be interchangeable. The segment 104a and the segment 104b may provide a receiving surface for the portable electronic device. Further, the section 102a may hold and carry the portable electronic device using magnets. For example, the segment 104a includes a magnet 106a, a magnet 106b, a magnet 106c, and a magnet 106d. The segment 104b includes a magnet 106e and a magnet 106f These aforementioned magnets may magnetically couple with one or more magnets (not shown in FIG. 1) in the portable electronic device such that the portable electronic device remains coupled/engaged to the segment 104a and the segment 104b. Also, although specific locations of the magnets are shown, the magnets may be generally located in the segment 104a and the segment 104b at locations corresponding the locations of the magnets in the portable electronic device.

The section 102b may include an input mechanism 108 designed to provide a command or input to the portable electronic device. In some embodiments, the input mechanism 108 is a touch input display (or touchscreen) with user input capabilities by way of touching the touch input display. In the embodiment shown in FIG. 1, the input mechanism 108 is a keyboard. In order to place the input mechanism 108 in communication with the portable electronic device, the accessory device 100 may include contacts 112 located on the section 102a. The contacts 112 may include metal contacts that engage metal contacts (not shown in FIG. 1) of the portable electronic device, thereby placing the accessory device 100 (including the input mechanism 108) in communication with processing circuitry (not shown in FIG. 1) of the portable electronic device. As shown, the contacts 112 are located on the segment 104a. However, the contacts 112 may be located on the segment 104b, depending on the location of the contacts on the portable electronic device. Also, it should be noted that the accessory device 100 may include wireless circuitry (not shown in FIG. 1), such as Bluetooth® circuitry or near-field communication ("NFC") circuitry, designed to provide wireless communication with the portable electronic device, thereby providing a wireless method for transferring communication from the input mechanism 108 to the portable electronic device.

The accessory device 100 is designed to provide different benefits based upon the orientation/position of the accessory device 100. In this regard, the accessory device 100 includes hinges, or hinge assemblies, that allow relative movement between the sections and segments of the accessory device 100. For example, the accessory device 100 may include a hinge assembly 114a coupled to the section 102a and the section 102b. The hinge assembly 114a allows relative movement between the section 102a and the section 102b. The accessory device 100 may further include a hinge assembly 114b coupled to the segment 104a and the segment 104b. The hinge assembly 114b allows relative movement between segment 104a and the segment 104b. Based upon the configurations permitted by the hinge assembly 114a and the hinge assembly 114b, the accessory device 100 may transition to multiple different configurations, such as the open position shown in FIG. 1 as well as several other configurations shown and described below.

Both the hinge assembly 114a and the hinge assembly 114b may include multiple roller elements and spacer elements (not labeled). In order to maintain engagement between the roller elements and the spacer elements, the hinge assembly 114a and the hinge assembly 114b may include retention structures passing through the roller elements and the spacer elements. As shown in FIG. 1, the hinge assembly 114a includes a retention structure 116a, a retention structure 116b, a retention structure 116c and a retention structure 116d. Further, the hinge assembly 114b includes the retention structure 116b and the retention structure 116c. Due in part to the retention structure 116b and the retention structure 116c passing through the hinge assembly 114b, the movement of the hinge assembly 114a may dictate the movement of the hinge assembly 114b, and vice versa. This will be further discussed below.

The retention structures may be referred to as straps. The retention structures described herein may include a material (or materials) such as a metal (including steel), glass fiber, and/or carbon fiber. Also, the material and the thickness of the retention structures are selected to allow the hinge assembly 114a and the hinge assembly 114b to bend in accordance with a desired bend radius as well as a desired stiffness. The thickness of the retention structures may be proportional to the stiffness, and inversely proportional to the bend radius. Accordingly, the thickness should be selected to achieve desired properties of the hinge assemblies.

Due in part to the retention structures maintaining engagement between the roller elements and the spacer elements of the hinge assemblies, the retention structures may dictate, or at least partially dictate, the frictional force between roller elements and spacer elements. In this regard, the retention structures can be affixed to an adjustment mechanism (not shown in FIG. 1), including a spring-loaded adjustment mechanism (as a non-limiting example), located in the section 102a and/or the section 102b. The adjustment mechanism(s) can adjust the tension on the retention structures, thereby providing an adjustment to frictional forces between the roller elements and the spacer elements. This may allow the accessory device 100 to remain in the open position, as shown in FIG. 1.

Figure 2:
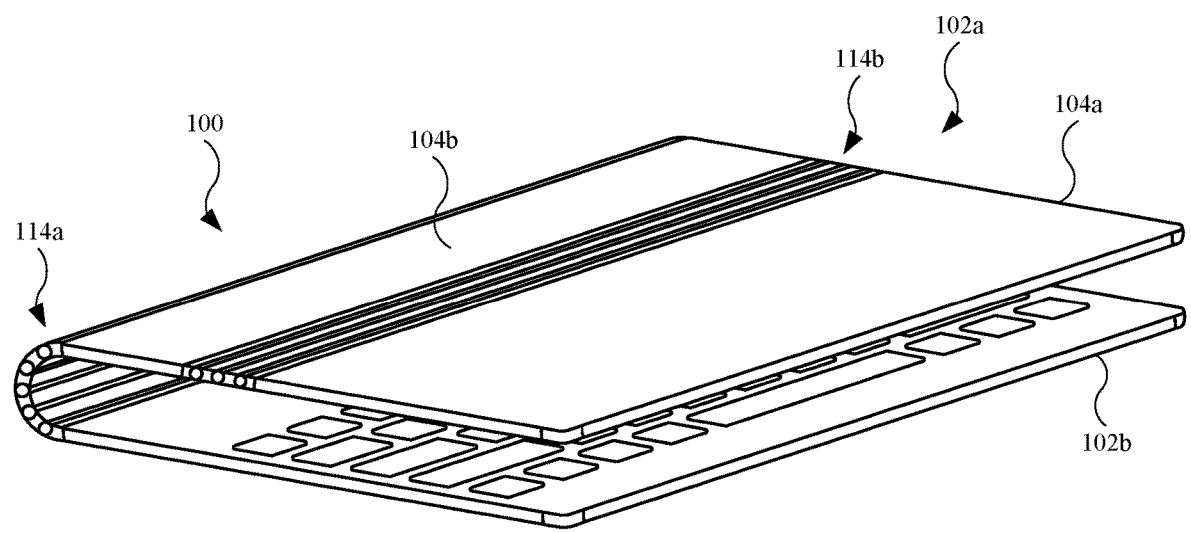
FIG. 2 illustrates an isometric view of the accessory device shown in FIG. 1, showing the accessory device in a closed position.

FIG. 2 illustrates an isometric view of the accessory device 100 shown in FIG. 1, showing the accessory device 100 in a closed position. In the closed position, based on movement allowed by the hinge assembly 114a, the section 102a is positioned over, and substantially covers, the section 102b. Further, in the closed position, the hinge assembly 114b may prevent relative movement between the segment 104a and the segment 104b. In other words, the hinge assembly 114b is essentially locked, thereby keeping the segment 104a co-planar with the segment 104b.

Figure 3:
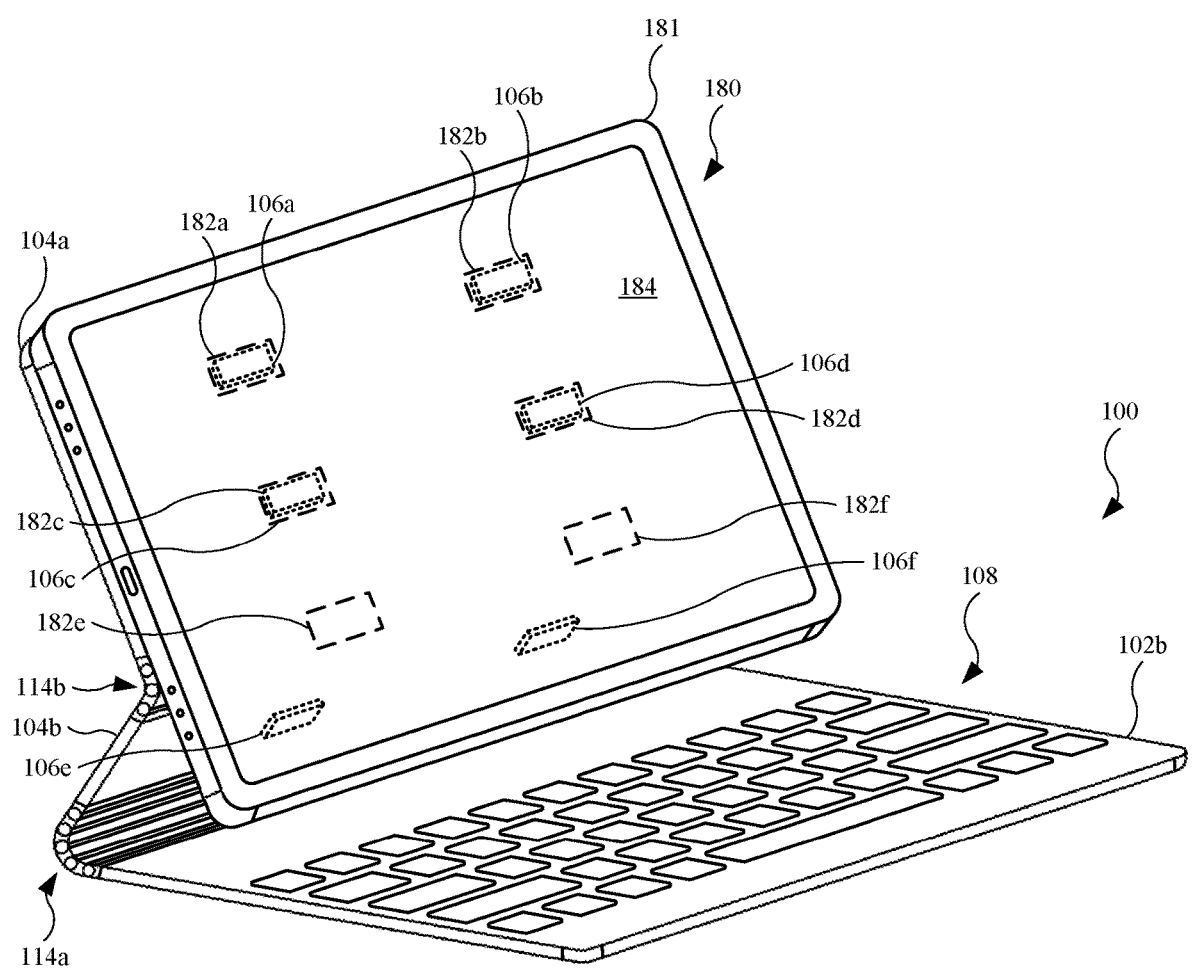
FIG. 3 illustrates an isometric view of the accessory device holding an electronic device.

FIG. 3 illustrates an isometric view of the accessory device 100 holding an electronic device 180. The electronic device 180 may include a portable electronic device, such as a mobile wireless communication device or a tablet computing device. The electronic device 180 includes a housing 181 designed to carry several components (such as a display, processing circuitry, memory circuitry, batteries, speakers, microphones, cameras, flexible circuitry, etc.) of the electronic device 180. Further, the electronic device 180 includes several magnets carried by the housing 181. The magnets of the accessory device 100 are designed to magnetically couple with the magnets of the electronic device 180. For example, the electronic device 180 includes a magnet 182a, a magnet 182b, a magnet 182c, and a magnet 182d that magnetically couples with the magnet 106a, the magnet 106b, the magnet 106c, and the magnet 106d, respectively. Further, the magnetic attraction force between the magnets of the electronic device 180 and the magnets of the accessory device 100 can hold and suspend the electronic device 180 over the section 102b such that the electronic device 180 is not in contact with the section 102b, as shown in FIG. 3.

When the aforementioned magnets of the accessory device 100 magnetically couple to the aforementioned magnets of the accessory device 100, the electronic device 180 is held against the accessory device 100, and in particular, against the segment 104a. Also, the electronic device 180 may further include a magnet 182e and a magnet 182f. The magnet 106e and the magnet 106f of the accessory device 100 are designed and positioned to magnetically couple with the magnet 182e and the magnet 182f, respectively, of the electronic device 180. However, as shown in FIG. 3, the electronic device 180 is rotated away from the segment 104b, based on movement allowed by the hinge assembly 114b. As a result, the magnet 106e and the magnet 106f are not magnetically coupled with the magnet 182e and the magnet 182f, respectively. However, it should be noted that when the electronic device 180 is engaged with the segment 104b, the magnet 106e and the magnet 106f are magnetically coupled with the magnet 182e and the magnet 182f, respectively.

The accessory device 100 provides a benefit to a user by holding the electronic device 180 upright (as shown in FIG. 3). Further, based upon movement allowed the hinge assembly 114a and the hinge assembly 114b, the accessory device 100 can position the electronic device 180, including a display 184 (designed to present visual information) of the electronic device 180, in a manner that the user can easily and readily use the input mechanism 108 of the accessory device 100 while viewing the display 184 of the electronic device 180.

Figure 4:
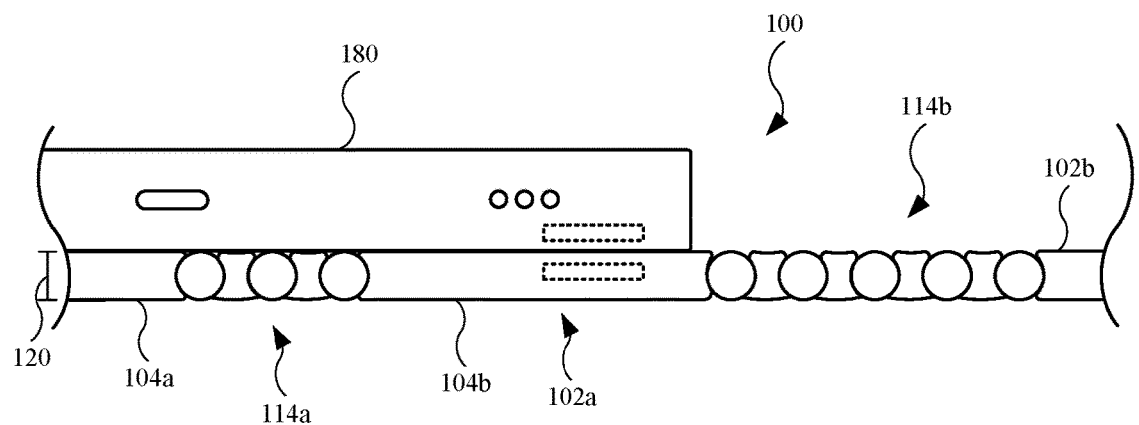
FIG. 4 illustrates a side view of the accessory device and the electronic device, showing the accessory device in an open position, in accordance with some described embodiments.

FIG. 4 illustrates a side view of the accessory device 100 and the electronic device 180, showing the accessory device 100 in an open position, in accordance with some described embodiments. As shown, the accessory device 100 is generally flat in this open position and the electronic device 180 can lie flat on the segment 104a and the segment 104b. It should be understood that additional "open positions" are possible, such as the position of the accessory device 100 shown in FIG. 3. Also, in some embodiments, the accessory device 100 includes a dimension 120 that defines a uniform thickness of the accessory device 100. For example, the section 102a (including the segment 104a and the segment 104b), the hinge assembly 114a, the hinge assembly 114b, and the section 102b can each include a thickness equal to the dimension 120. As a result, the accessory device 100 may provide a consistent finish in terms of size. Further, the accessory device 100 may provide an appearance, initially, of a single piece of material with portions removed for the hinge assemblies, based upon the uniform thickness defined by the dimension 120.

Figure 5:
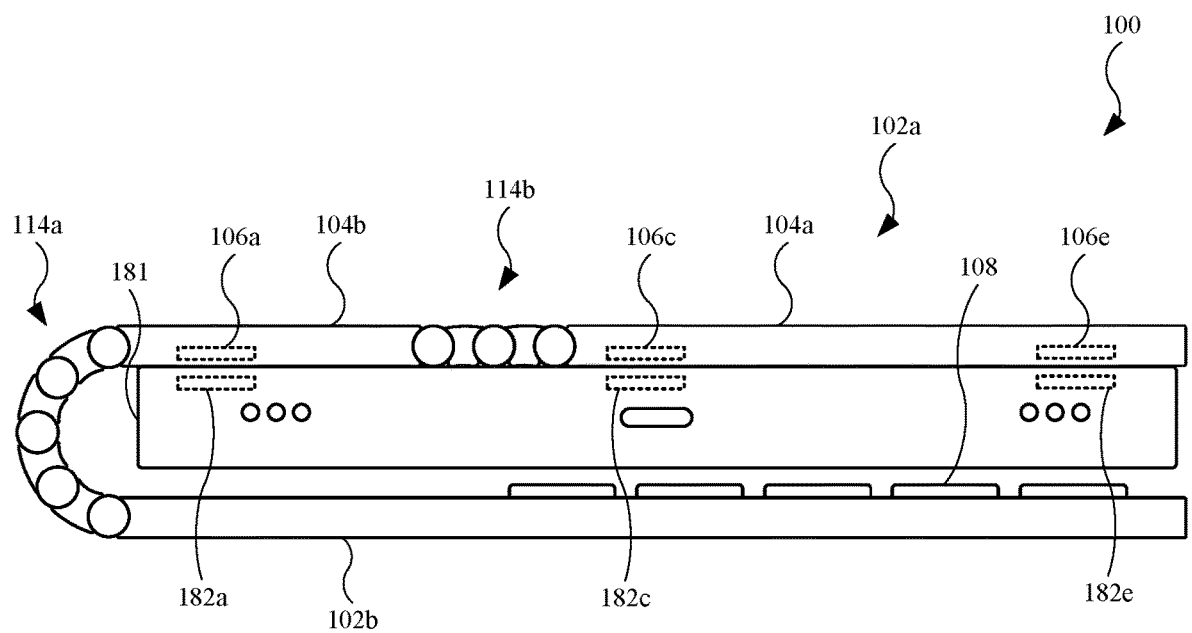
FIG. 5 illustrates a side view of the accessory device and the electronic device, showing the accessory device in a closed position, in accordance with some described embodiments.

FIG. 5 illustrates a side view of the accessory device 100 and the electronic device 180, showing the accessory device 100 in a closed position, in accordance with some described embodiments. In the closed position, the accessory device 100 surrounds the electronic device 180. For instance, the section 102b covers a front face that includes the display (not labeled) of the electronic device 180, while the section 102a covers, or at least substantially covers, the housing 181. In order to fold the accessory device 100, the hinge assembly 114a allows the section 102a to move relative to the section 102b, or vice versa. However, due to the position of the electronic device 180 relative to the section 102b, the hinge assembly 114b is stationary, allowing no relative movement between the segment 104a and the segment 104b. Also, as shown in FIG. 5, the hinge assembly 114a may be sufficiently stiff or rigid in this closed position to prevent contact between the electronic device 180 and the section 102a, including the input mechanism 108.

Further, in the closed position, at least some of the magnets located in section 102a magnetically couple with at least some of the magnets in the electronic device 180, and the housing 181 of the electronic device 180 remains engaged with the section 102b. For example, the magnet 106a, the magnet 106c, and the magnet 106e in the section 102a magnetically couple with the magnet 182a, the magnet 182c, and the magnet 182e, respectively, in the electronic device 180. Although not shown, additional magnetic couplings may occur.

Figure 6:
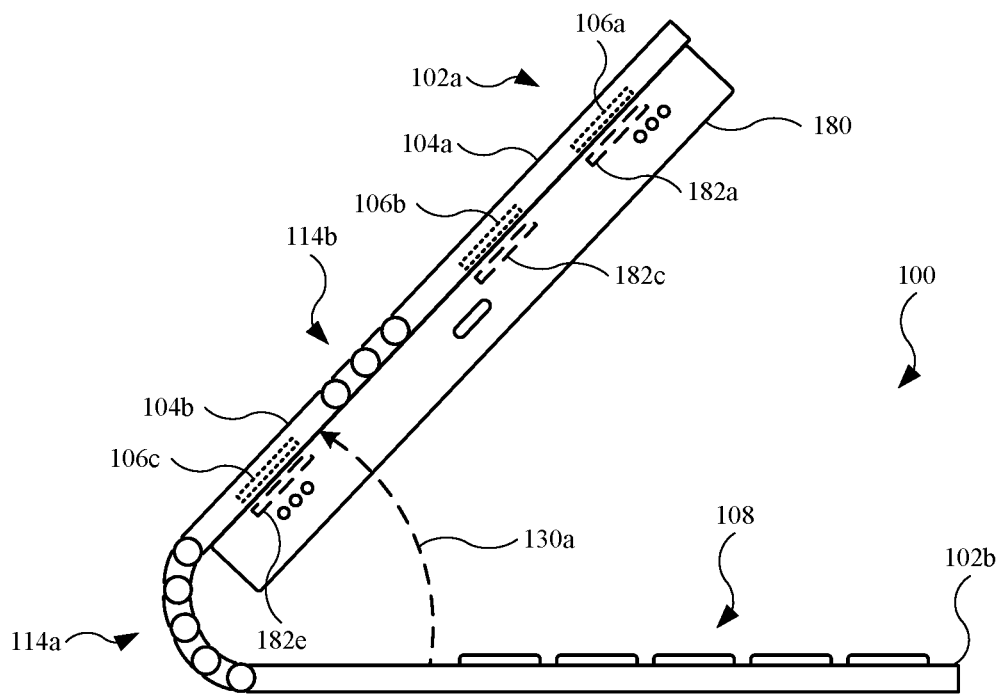
FIG. 6 illustrates a side view of the accessory device and the electronic device, showing the accessory device in an open position in which the section that carries the electronic device is rotated away from the section that includes the input mechanism, in accordance with some described embodiments.
Figure 7:
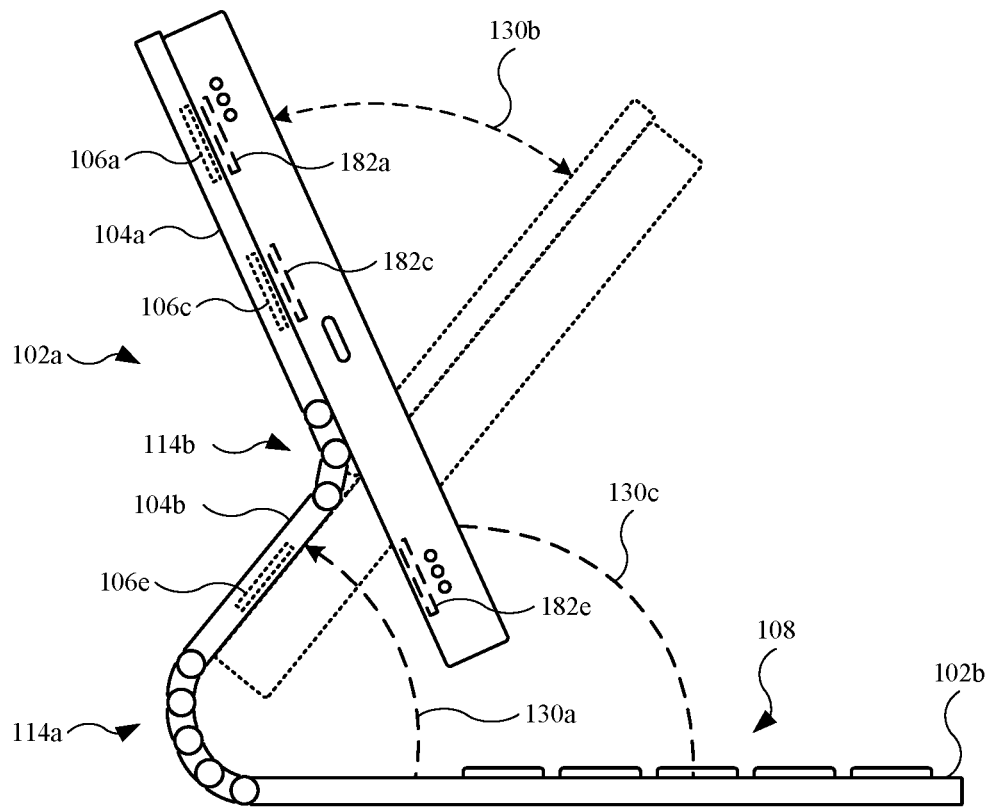
FIG. 7 illustrates a side view of the accessory device and the electronic device, showing the accessory device in an open position, with the section carrying the electronic device further rotated by the hinge assembly.

FIGS. 6 and 7 illustrate an exemplary movement of the accessory device 100, and in particular, an exemplary movement of the hinge assembly 114a and the hinge assembly 114b. FIG. 6 illustrates a side view of the accessory device 100 and the electronic device 180, showing the accessory device 100 in an open position in which the section 102a that carries the electronic device 180 is rotated away from the section 102b that includes the input mechanism 108, in accordance with some described embodiments. Using the hinge assembly 114a, the section 102a is rotated away from the section 102b to an angle 130a. In some embodiments, the angle 130a represents the greatest or maximum angle allowed by the hinge assembly 114a. In other words, when the section 102a is positioned at the angle 130a relative to the section 102b, the hinge assembly 114a does not allow additional rotational movement of the section 102a away from the section 102b. The angle 130a may be approximately in the range of 50 to 80 degrees. In some embodiments, the angle 130a is between 55 and 70 degrees. Furthermore, during the rotation (permitted by the hinge assembly 114a) of the section 102a relative to the section 102b, the hinge assembly 114b may remain stationary or fixed such that no relative movement between the segment 104a and the segment 104b occurs, and the section 102b remains substantially flat. Also, despite the relative movement of the section 102a, the electronic device 180 can remain coupled to the section 102a by way of the aforementioned magnets. As shown, the magnet 106a, the magnet 106c, and the magnet 106e in the section 102a remain magnetically coupled with the magnet 182a, the magnet 182c, and the magnet 182e, respectively, in the electronic device 180. Additional magnetic coupling (not shown in FIG. 6) may also occur.

FIG. 7 illustrates a side view of the accessory device 100 and the electronic device 180, showing the accessory device 100 in an open position, with the section 102a carrying the electronic device 180 further rotated by the hinge assembly 114b. As shown, when the section 102a, and in particular the segment 104b of the section 102a, is positioned at the angle 130a relative to the section 102b, the hinge assembly 114b is permitted to move, thereby allowing the segment 104a to move or rotate relative to the segment 104b. When the segment 104a is allowed to move relative to the segment 104b, the accessory device 100 permits additional movement of the electronic device. As shown, when the segment 104a relative to the segment 104b, the electronic device 180 is no longer coupled to the segment 104b. The magnet 106a and the magnet 106c in the segment 104a remain magnetically coupled with the magnet 182a and the magnet 182c, respectively, in the electronic device 180. However, the magnet 106e in the segment 104b is no longer magnetically coupled with the magnet 182f in the electronic device 180. Accordingly, despite the relative movement of the segment 104a relative to the segment 104b, the electronic device 180 can remain at least partially coupled to the section 102a by way of the aforementioned magnetic couplings.

The hinge assembly 114b allows the segment 104a to rotate to an angle 130b, representing an angle relative to an initial position (shown as dotted lines) of the segment 104a. The angle 130b may represent the greatest or maximum angular movement of the segment 104a relative to the initial position, with the initial position corresponding to the position of the section 102a (particularly the segment 104b) when positioned relative to the section 102b at the angle 130a. The angle 130b may be approximately in the range of 30 to 60 degrees. In some embodiments, the angle 130b is between 40 and 50 degrees.

As a result of the movement of the hinge assembly 114a and the hinge assembly 114b, the electronic device 180 can be positioned an angle 130c relative to the section 102b, and in particular, relative to the input mechanism 108. The angle 130c may be approximately in the range of 90 to 150 degrees. In some embodiments, the angle 130c is between 120 and 140 degrees.

The dynamics of the hinge assemblies of the accessory device 100 provide certain advantages. For example, prior to the section 102a rotating (relative to the section 102b) to the angle 130a by way of the hinge assembly 114a, the hinge assembly 114b may be prohibited from movement. However, when the section 102a rotates to the angle 130a by way of the hinge assembly 114a, the hinge assembly 114a may become stationary (that is, prevented from further movement) such that the section 102a is not permitted to move toward or away from the section 102b, while the hinge assembly 114b allows the segment 104a to move relative to the segment 104b. Also, when the segment 104a is subsequently positioned at the initial position (shown as dotted lines), then hinge assembly 114b again becomes stationary (with no relative movement between the segment 104a and the segment 104b), and the hinge assembly 114a is allowed to move, such that the section 102a can move toward the section 102b to place the accessory device 100 in the closed position (shown in FIG. 4). Accordingly, the accessory device 100 provides added stability by regulating movement of the hinge assembly 114a and the hinge assembly 114b based upon certain positions and configurations of the accessory device 100.

Figure 8:
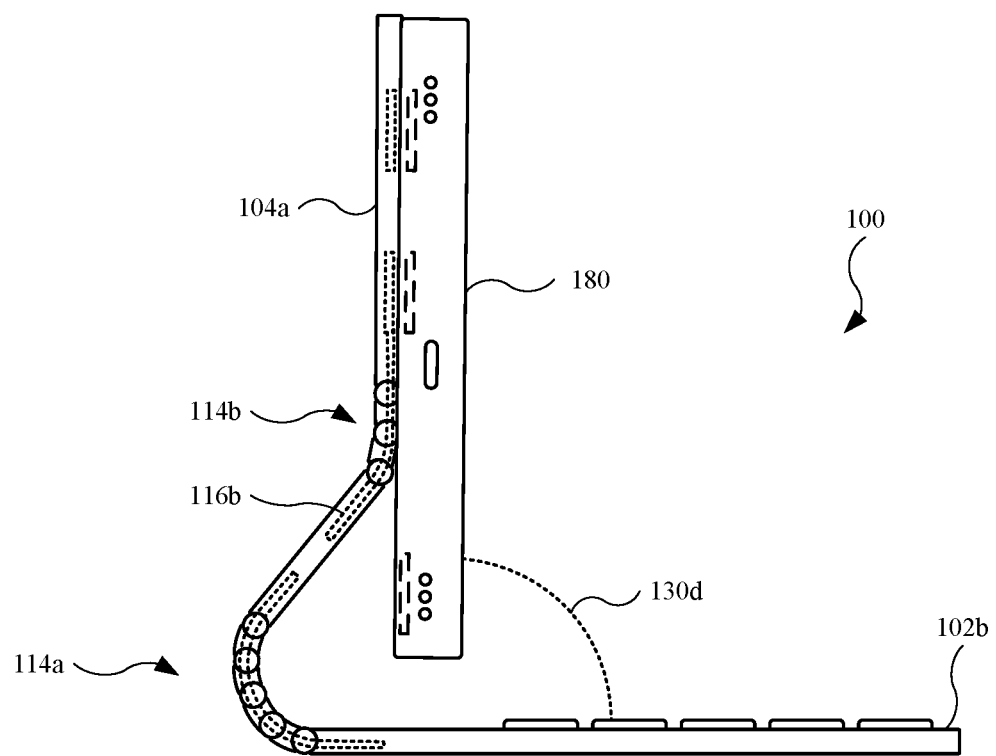
FIG. 8 illustrates a side view of the accessory device, showing the accessory device carrying the device at an angle.
Figure 9:
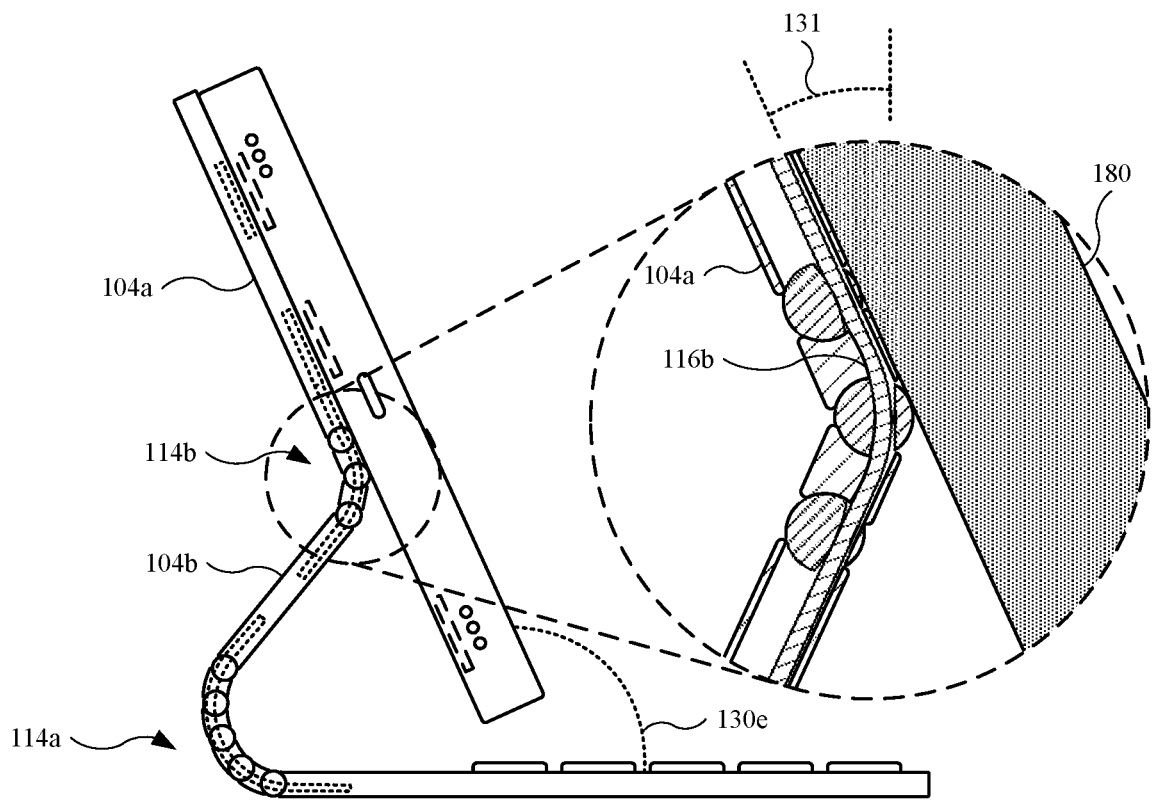
FIG. 9 illustrates a side view of the accessory device carrying the electronic device at an alternate angle.
Figure 10:
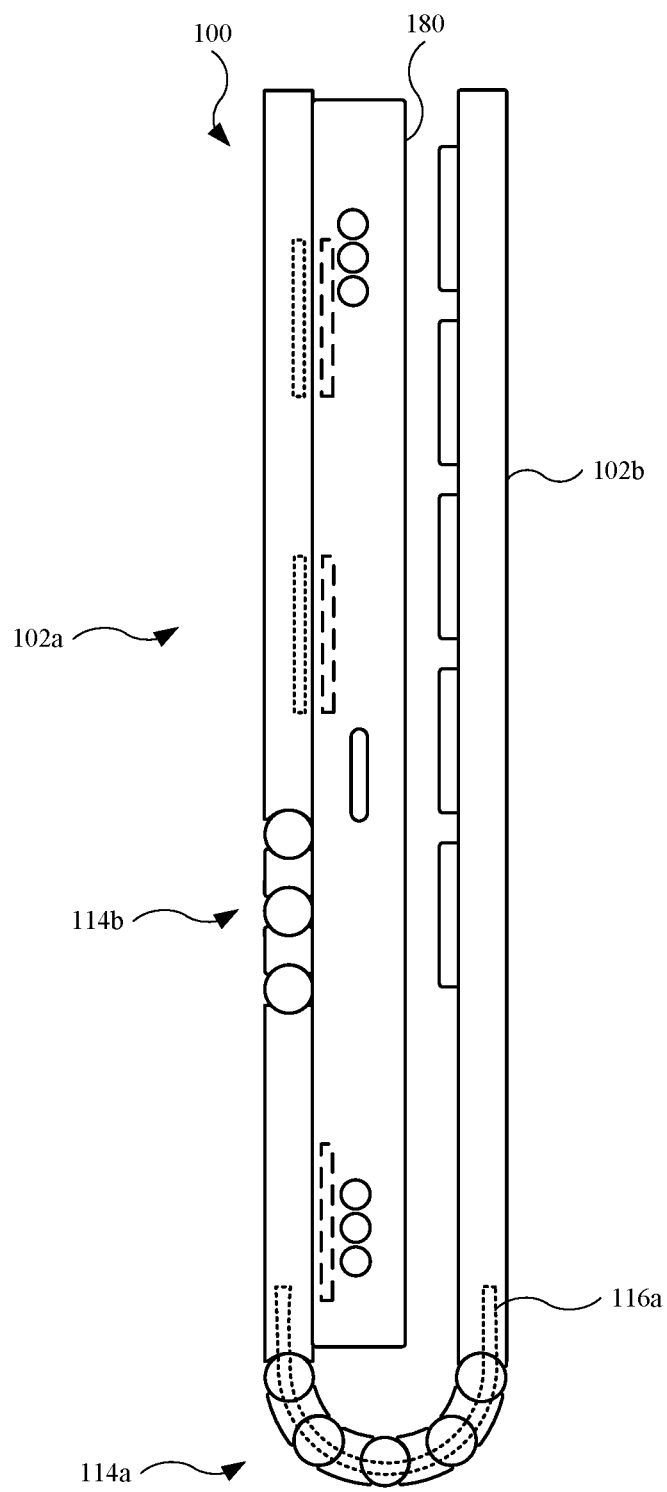
FIG. 10 illustrates a side view of the accessory device, showing the accessory device in a closed positioned and carrying the electronic device.

FIGS. 8-10 show additional features of the hinge assemblies of the accessory device 100. The hinge assemblies shown and described in FIGS. 8-10, as well as other hinge assemblies described herein, may provide a variable holding force that is a function of several factors such as the friction between the components of the hinge assemblies, the relative position of the retention structures within the hinge assemblies, the thickness of the retention structures, the stiffness of the retention structures, and the spring constant of the retention structures, as non-limiting examples. The holding force is related to the ability of the hinge assemblies to maintain/hold the accessory device with at a given position, either with or without carrying an electronic device.

FIG. 8 illustrates a side view of the accessory device 100, showing the accessory device 100 carrying the electronic device 180 at an angle 130d. The hinge assembly 114a and the hinge assembly 114b combine to hold the electronic device 180 at the angle 130d relative to the section 102b. In particular, the hinge assembly 114b provides a counterforce that balances the weight of the electronic device 180 (and portions of the section 102a) and resists unwanted movement of the section 102a. The counterforce provided by the hinge assembly 114b may be a function of the retention structure 116b, including the properties of the retention structure 116b (and other retention structures of the hinge assembly 114b shown in FIG. 1). For instance, the stiffness and thickness of the retention structure 116b, the angle at which the segments connected to the hinge assembly 114b are positioned, the spring constant of the retention structure 116b, pre-bending (if applicable) of the retention structure 116b, and the relative position of the retention structure 116b within the hinge assembly 114b (discussed below) affect the ability of the hinge assembly 114b to provide a counterbalance to support the electronic device 180.

Additional movement of the accessory device 100 may change the counterforce properties of the hinge assembly 114b. For example, FIG. 9 illustrates a side view of the accessory device 100 carrying the electronic device 180 at an angle 130e different from the angle 130d (shown in FIG. 8). As shown, the segment 104a rotates (using the hinge assembly 114b) relative to the segment 104b, thereby rotating the electronic device 180 and providing a user with a different viewing angle of the electronic device 180. The movement of the hinge assembly 114b imparts movement of the retention structure 116b (and any additional retention structures passing through the hinge assembly 114b).

As shown in the enlarged view, the segment 104a shifts by an angular distance 131 relative to the segment 104a in FIG. 8. The angular distance 131, allowed by the movement of the hinge assembly 114b, may cause additional changes to the retention structure 116b. For instance, the length of the retention structure 116b (and any additional retention structures passing through the hinge assembly 114b) may increase on the order of 50-100 micrometers or more. This length increase of the retention structure 116b may increase the tension of the retention structure 116b, and the material properties of the retention structure 116b may cause the retention structure 116b to resist the length increase. As a result, the frictional forces between structural components, such as roller elements and spacer elements, of the hinge assembly 114b increase. The increased frictional forces increase the torque required to move hinge assembly 114b. The increased torque of the hinge assembly 114b can provide additional support, or holding force, for the electronic device 180. Accordingly, the properties and characteristics of the hinge assembly 114b are dynamic, and depend upon the position of the accessory device 100. It should be noted that any retention structure not shown in FIGS. 8 and 9 that passes through the hinge assembly 114b undergo similar changes and provide similar features as those of the retention structure 116b.

FIG. 10 illustrates a side view of the accessory device 100, showing the accessory device 100 carrying the electronic device 180 in a closed position. As shown, the accessory device 100 is generally upright such that forces (including gravitational forces) may act on the accessory device 100 to otherwise cause the section 102a and the section 102b to separate from each other. However, the hinge assembly 114a is designed to withstand these forces to keep the accessory device 100 in the closed position. For instance, the retention structure 116a may causes the structural components, such as roller elements and spacer elements (discussed below), to frictionally engage each other in a manner that provides the hinge assembly 114a sufficient torque to resist gravitational forces. As a result, only user interaction with the accessory device 100 causes the accessory device 100 to transition out of the closed position. Although not shown in FIG. 10, one or more retentions structures may pass through the hinge assembly 114b to provide support and maintain the hinge assembly 114b in a flat configuration.

Figure 11:
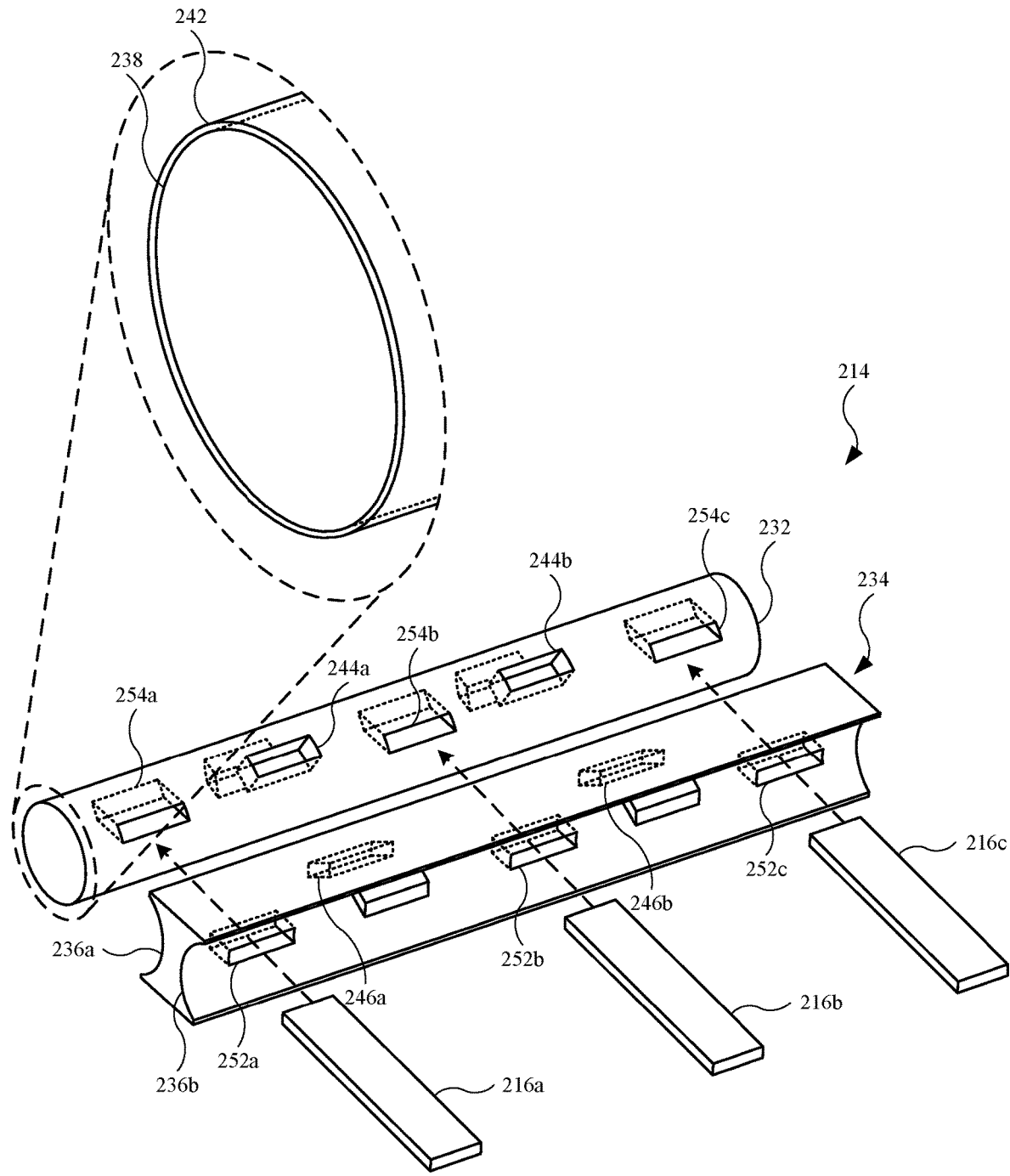
FIG. 11 illustrates an exploded view of components of a hinge assembly, in accordance with some described embodiments.

FIG. 11 illustrates an exploded view of components of a hinge assembly 214, in accordance with some described embodiments. The hinge assembly 214, including its components and associated features, may represent any hinge assembly described herein. As shown, the hinge assembly 214 includes a roller element 232 and a spacer element 234. The roller element 232 defines a cylindrical, or at least substantially cylindrical, body. However, other shapes are possible. The spacer element 234 can be positioned between the roller element 232 and an additional roller element (not shown in FIG. 8), thereby providing a link, or linking element, between adjacent roller elements. The spacer element 234 may include a surface 236a and a surface 236b (opposite the surface 236a). The surface 236a and the surface 236b each define a receiving surface for the roller element 232 and an additional roller element, respectively. Further, the surface 236a and the surface 236b may each take on a shape that corresponds to the shape of a roller element. During movement of the hinge assembly 214, the roller element 232 (representative of additional roller elements) is designed to rotate, or roll, along the surface 236a of the spacer element 234 (representative of additional spacer elements).

As shown in the enlarged view, the roller element 232 may include a cylindrical body 238 and a coating 242 that covers the cylindrical surface defined by the cylindrical body 238. In some embodiments, the cylindrical body 238 includes a metal such, as steel (including stainless steel) or aluminum (including anodized aluminum). In order to prevent or reduce wearing of the cylindrical body 238, the coating 242 may cover (fully cover or at least substantially cover) the cylindrical body 238. The coating 242 may include polyetheretherketone (PEEK) filled w/polytetrafluoroethylene (Teflon™), graphite, carbon fiber, perfluoroalkoxy copolymer resin (PFA Teflon™), or other similar materials. Also, the coating 242 may include a thickness of 1 millimeter or less. The coating 242 may include a thickness on the order of several hundred micrometers, and the visibility of the coating 242 is somewhat minimal. In this regard, the roller element 232 may include a cylindrical body 238 with a relatively high structural rigidity that is protected from wear based on the coating 242 that is generally not viewable by a user. Also, the spacer element 234 may include any material(s) described for the roller element 232.

When mated with the surface 236a, the roller element 232 is partially interlocked with the spacer element 234. For example, the roller element 232 may include a cavity 244a and a cavity 244b that receive a protrusion 246a and a protrusion 246b, respectively, located along the surface 236a of the spacer element 234. Although the roller element 232 is partially interlocked with the spacer element 234, at least some freedom of movement is allowed by the roller element 232 relative to the spacer element 234. Although not labeled, the roller element 232 includes additional cavities for protrusions of an additional spacer element (not shown in FIG. 8), and the spacer element 234 includes additional protrusion located on the surface 236b for cavities of an additional roller element (not shown in FIG. 8).

In order to further maintain engagement between roller elements and spacer elements, the hinge assembly 214 may include retention structures, or straps. For example, the hinge assembly 214 includes a retention structure 216a, a retention structure 216b, and a retention structure 216c. The aforementioned retention structure may include a metal, fabric, a combination of metal and fabric, or generally any sturdy, yet flexible material. The retention structure 216a passes through an opening 252a (or through hole) of the spacer element 234 and an opening 254a of the roller element 232. The retention structure 216b passes through an opening 252b of the spacer element 234 and an opening 254b of the roller element 232. The retention structure 216c passes through an opening 252c of the spacer element 234 and an opening 254c of the roller element 232. The retention structures can be fastened or secured to sections or segments of an accessory device (not shown in FIG. 8). Further, the retention structures can be pulled or stretched in order to increase tension, which in turns causes an increased frictional force between the roller element 232 and the spacer element 234 (as well as increased frictional forces between additional roller elements and spacer elements of the hinge assembly 214 that are not shown). Even further, the retention structures can be fastened or secured to tensioning elements, including adjustable tensioning elements, which can be used to adjust the frictional forces between the roller element 232 and the spacer element 234 (as well as adjust the frictional forces between additional roller elements and spacer elements of the hinge assembly 214 that are not shown). As a result, the ability for the hinge assembly 214 to hold the weight of the sections, segments, and an electronic device (not shown in FIG. 8) can be controlled in part by the frictional forces that depend upon the use of at least one of the retention structure 216a, the retention structure 216b, and the retention structure 216c.

It should be further noted that the retention structure 216a, the retention structure 216b, and the retention structure 216c can provide additional features. For example, the retention structure 216a can provide the tension, which dictates frictional forces between roller elements and spacer elements, while the retention structure 216b can be relatively rigid (compared to the retention structure 216a and the retention structure 216c) in order to provide an additional stiffness and holding force by the hinge assembly 214. Further, the retention structure 216c may include a flexible circuit that passes electrical communication between an electronic device and an input mechanism of an accessory device (not shown in FIG. 8). Also, the number of retention features may vary based on the number of features required.

Figure 12:
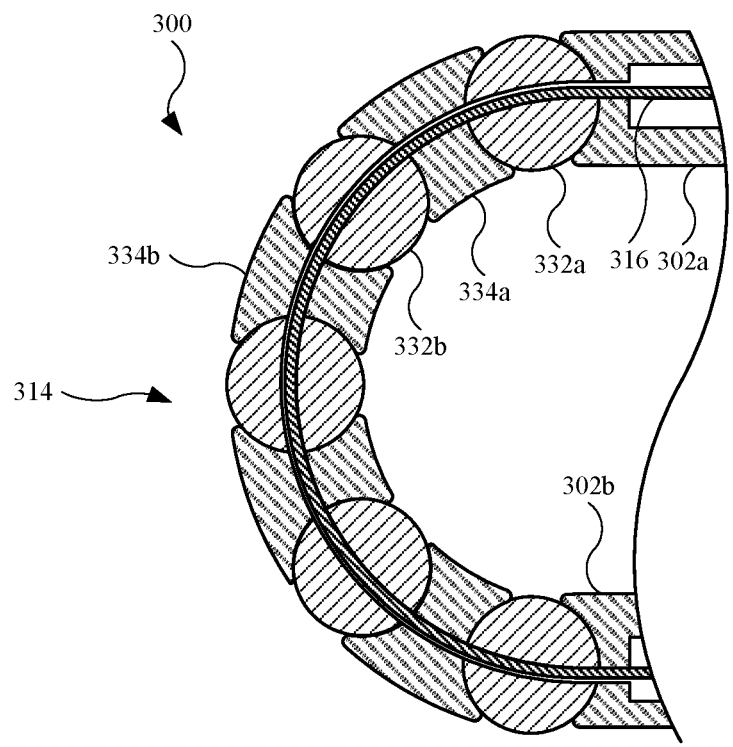
FIG. 12 illustrates a cross sectional view of an embodiment of an accessory device, showing a hinge assembly and a retention structure passing through the hinge assembly, in accordance with some described embodiments.
Figure 13:
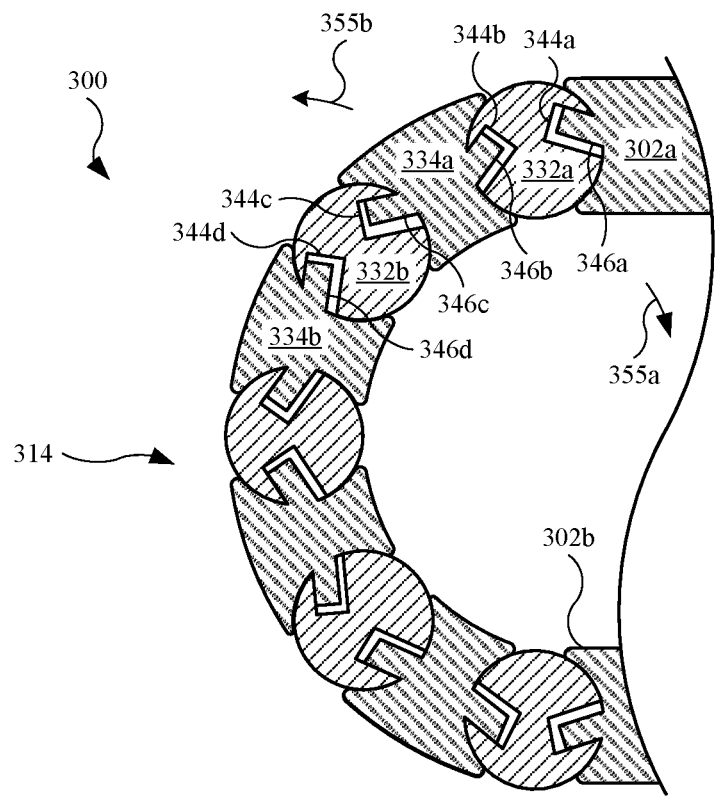
FIG. 13 illustrates a cross sectional view of the accessory device shown in FIG. 12, showing the hinge assembly and components the hinge assembly interlocked with each other.

FIGS. 12 and 13 illustrate an accessory device 300 with a hinge assembly 314, taken along different cross sections. The hinge assembly 314, including its components and associated features, may represent any hinge assembly described herein.

FIG. 12 illustrates a cross sectional view of an embodiment of an accessory device 300, showing a hinge assembly 314 and a retention structure 316 passing through the hinge assembly 314, in accordance with some described embodiments. As shown, the accessory device 300 is generally in a closed position, similar to what is shown in FIG. 4. The retention structure 316 passes through an opening in each spacer element and each roller element, and further extends into a section 302a and a section 302b of the accessory device 300. The retention structure 316 can be fastened to the section 302a and the section 302b, or a tensioning system (not shown in FIG. 9) located in the section 302a and/or the section 302b.

In addition to the retention structure 316, the hinge assembly 314 may include a roller element 332a, a spacer element 334a, a roller element 332b, and a spacer element 334b. The roller element 332a is engaged with a curved surface of the section 302a as well as a surface of the spacer element 334a. The roller element 332b is engaged with the spacer element 334a and the spacer element 334b. The roller element 332a is designed to at least partially rotate along a surface of the spacer element 334a and the section 302a, and the roller element 332b is designed to at least partially rotate along a surface of the spacer element 334a and the spacer element 334b. The retention structure 316 is designed to maintain frictional engagement between the roller elements and the spacer elements, which may not be permanently affixed together by fasteners, adhesives, or the like. As a result, the retention structure 316 can regulate movement of the hinge assembly 314, and confine the movement of the hinge assembly 314 to certain positions.

In addition to the retention structure 316, the hinge assembly 314 may include additional feature designed to regulate movement. For example, FIG. 13 illustrates a cross sectional view of the accessory device 300 shown in FIG. 9, showing the hinge assembly 314 and components the hinge assembly 314 interlocked. As shown, the roller element 332a includes a cavity 344a and the section 302a includes a protrusion 346a positioned in the cavity 344a. The roller element 332a further includes a cavity 344b and the spacer element 334a includes a protrusion 346b positioned in the cavity 344b. The roller element 332b includes a cavity 344c and the spacer element 334b includes a protrusion 346c positioned in the cavity 344d. The roller element 332b further includes a cavity 344d and the spacer element 334b includes a protrusion 346d positioned in the cavity 344d.

As shown in FIG. 13, the protrusions are positioned in the cavities and are engaged with surfaces that define the cavities. As a result, further movement of the hinge assembly 314 may be limited or prevented. For example, based on the physical contact between the protrusions and the surfaces within the cavities, the section 302a may not be permitted to travel toward the section 302b in the direction of an arrow 355a. However, when the section 302a moves away from the section 302b in the direction of an arrow 355b, the protrusions are no longer engaged with surfaces that define the cavities.

Figure 14:
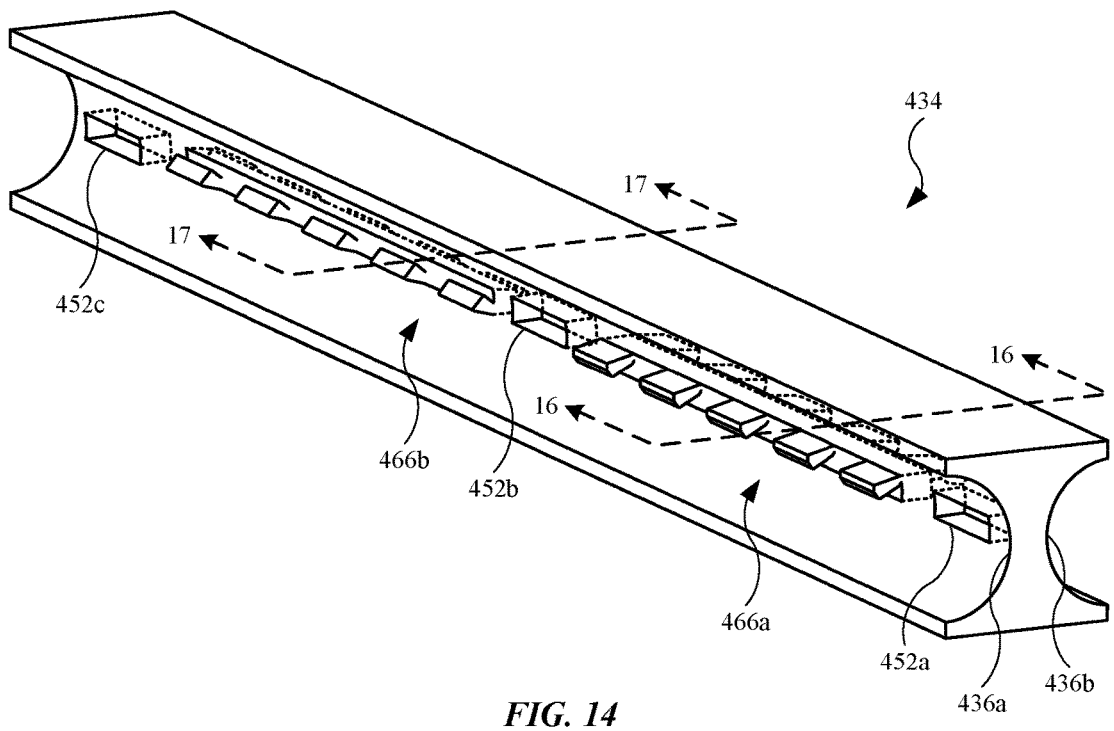
FIG. 14 illustrates an isometric view of an alternate embodiment of a spacer element, showing the spacer element with inserts that include protrusions that extend in different directions, in accordance with some described embodiments.

FIG. 14 illustrates an isometric view of an alternate embodiment of a spacer element 434, showing the spacer element 434 with inserts that include protrusions that extend in different directions, in accordance with some described embodiments. The spacer element 434 (and several additional spacer elements with features similar to the spacer element 434) may be integrated with hinge assemblies described herein. The spacer element 434 includes an insert 466a and an insert 466b, each of which includes multiple protrusions designed to interact with a roller element(s) (not shown in FIG. 14) to control the movement of a hinge assembly. The protrusions of the insert 466a and the insert 466b include structural features similar to the protrusion 346a, the protrusion 346b, and the protrusion 346c (shown in FIG. 13). However, the insert 466a and the insert 466b may include additional benefits, including the ability to control the movement of a hinge assembly in different directions. This will be further discussed below.

The insert 466a and the insert 466b each include protrusions positioned at a diagonal (non-zero angle) relative to a surface of the spacer element 434 through which the protrusions protrude. However, the protrusions of the insert 466a may be positioned an angle different than the protrusions of the insert 466b. By providing an insert 466a with protrusions directed at one angle and an insert 466b at another angle, the spacer element 434 may provide a hinge assembly with mechanical stops at two different positions. For example, the insert 466a may provide a mechanical stop for a hinge assembly in a closed position of an accessory device, and the insert 466b may provide a mechanical stop for a hinge assembly in an open position of an accessory device. The phrases "open position" and "closed position" for an accessory device are previously described. The insert 466a and the insert 466b may include a symmetric design. In this manner, while FIG. 14 shows the insert 466a and the insert 466b protruding from a surface 436a of the spacer element 434, the insert 466a and the insert 466b may include an additional matching number of protrusions (not shown in FIG. 14) that protrude from a surface 436b of the spacer element 434 that is opposite the surface 436a.

In addition to having openings for the inserts, the spacer element 434 may include openings, or through holes, with each opening designed to receive a retention structure (not shown in FIG. 14). For example, the spacer element 434 includes an opening 452a, an opening 452b, and an opening 452c. The number of openings of the spacer element 434 may vary based upon the number of retention structures used with a hinge assembly.

Figure 15:
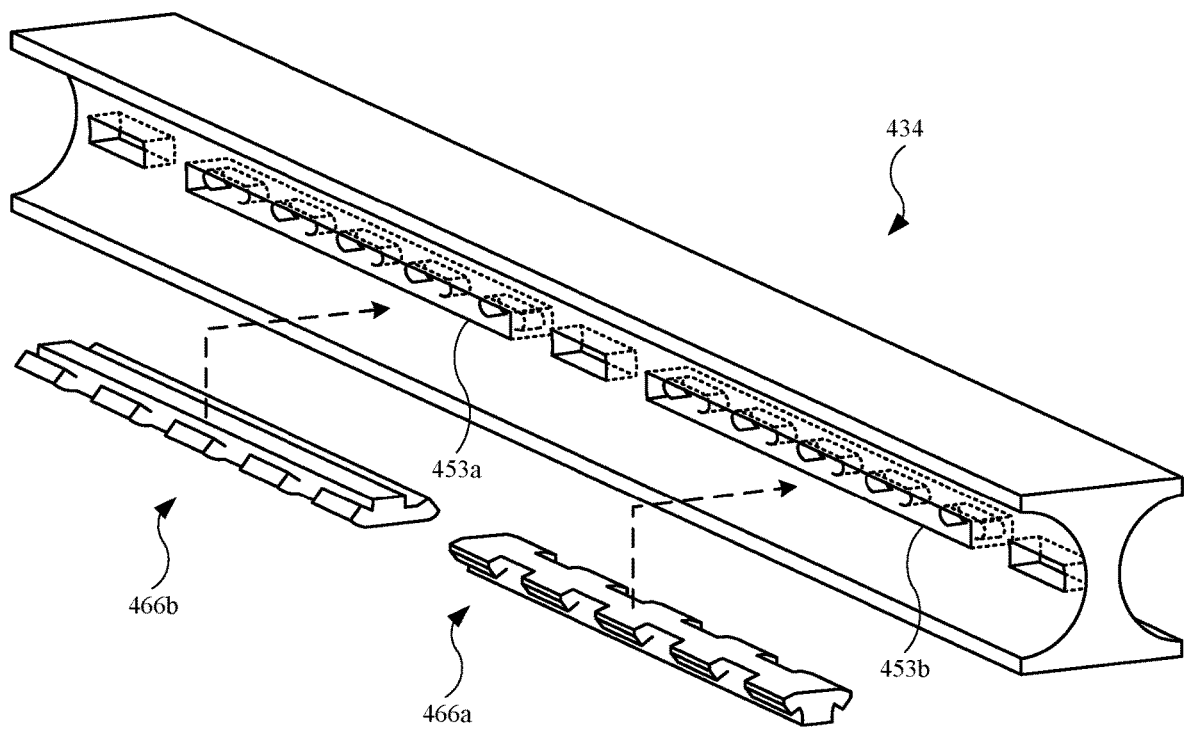
FIG. 15 illustrates an isometric view of the spacer element shown in FIG. 14, showing the inserts prior to installing in the spacer element.

FIG. 15 illustrates an isometric view of the spacer element shown in FIG. 14, showing the inserts prior to installing in the spacer element 434. As shown, the spacer element 434 includes a slot 453a and a slot 453b that receives the insert 466a and the insert 466b, respectively. The insert 466a and the insert 466b represent modular inserts that can be manufactured (including molding and/or machining, as non-limiting examples) prior to integration with the spacer element 434. In other words, the insert 466a and the insert 466b are initially separate from the spacer element 434, and subsequently positioned into openings (not labeled) of the spacer element 434 and secured through means such as adhesives, welding, soldering, press fitting, interference fitting, or a combination thereof. By pre-fabricating the insert 466a and the insert 466b, the tolerances can be reduced and the ease of manufacture of the protrusions of the insert 466a and the insert 466b are enhanced, as compared to machining a single piece of material to form a spacer element with integrated protrusions. Also, the insert 466a and the insert 466b each represent a single body with multiple protrusions, as opposed to multiple, separate protrusions. While an alternative embodiment (not shown) may include multiple, separate protrusion, the single-body style (of the insert 466a and the insert 466b) that carries multiple protrusions reduce assembly times.

Figure 16:
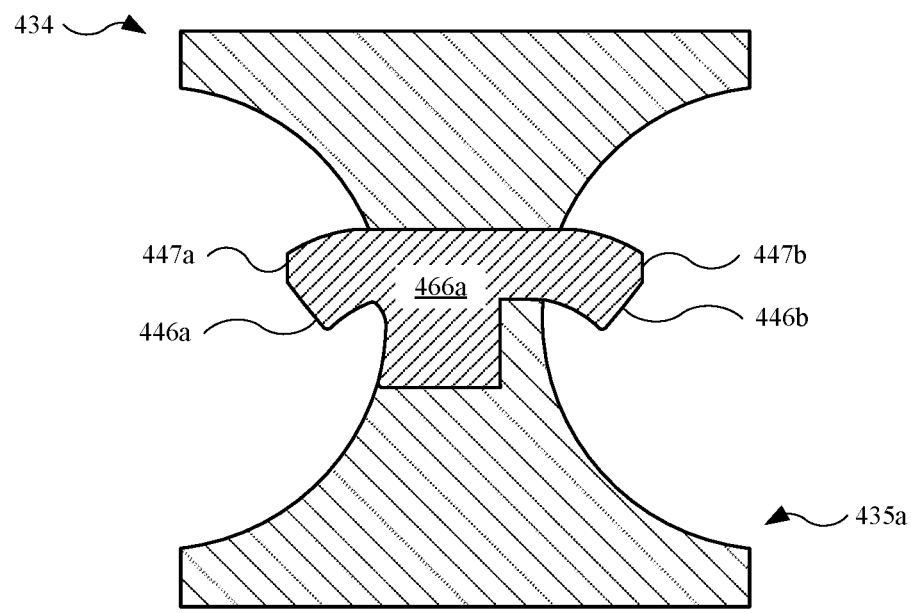
FIG. 16 illustrates a cross sectional view of the spacer element shown in FIG. 14, taken along line 16-16, showing the insert positioned in the spacer element.

FIG. 16 illustrates a cross sectional view of the spacer element 434 shown in FIG. 14, taken along line 16-16, showing the insert 466a positioned in the spacer element 434. As shown, the insert 466a includes a protrusion 446a and a protrusion 446b (as well as several similar protrusions that are not shown). The protrusion 446a and the protrusion 446b are generally diagonal. Further, the protrusion 446a and the protrusion 446b are directed toward a first portion 435a, or lower portion, of the spacer element 434. Based the configuration of the protrusion 446a and the protrusion 446b (and additional protrusions of the insert 466a), the insert 466a may limit or prevent movement of a hinge assembly that integrates the spacer element 434. This will be further shown below. Also, in order to enhance the integration of the insert 466a into the spacer element 434, the protrusion 446a and the protrusion 446b (as well as remaining protrusion of the insert 466a) may include a chamfered edge 447a and a chamfered edge 447b, respectively.

Figure 17:
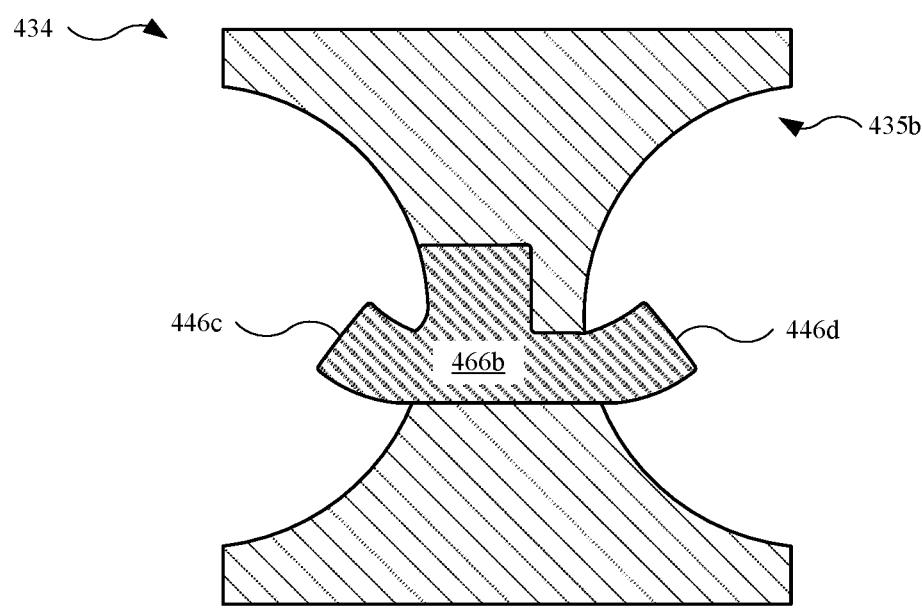
FIG. 17 illustrates a cross sectional view of the spacer element shown in FIG. 14, taken along line 17-17, showing the insert positioned in the spacer element.

FIG. 17 illustrates a cross sectional view of the spacer element shown in FIG. 14, taken along line 17-17, showing the insert 466b positioned in the spacer element 434. As shown, the insert 466b includes a protrusion 446c and a protrusion 446d. The protrusion 446c and the protrusion 446d are generally diagonal. However, the protrusion 446c and the protrusion 446d are directed toward a second portion 435b, or upper portion, of the spacer element 434. The second portion 435b is opposite the first portion 435a (shown in FIG. 16). Based the configuration of the protrusion 446c and the protrusion 446d (and additional protrusions of the insert 466b), the insert 466b may limit or prevent movement of a hinge assembly that integrates the spacer element 434. Moreover, the insert 466b may limit or prevent movement of the hinge assembly in a direction (or position) that is different from the direction (or position) limited or prevented by the insert 466a (shown in FIG. 16). This will be further shown below.

The protrusions shown and described in FIGS. 16 and 17 may include a dovetail configuration. For example, the protrusion 446a and the protrusion 446b (shown in FIG. 16), as well as the protrusion 446c and the protrusion 446d (shown in FIG. 17), may taper, or flare. This may enhance the interlocking, and subsequent stopping, capabilities of the protrusions. However, it should be noted that other shapes for the protrusions, such as rectangular shapes, are possible.

FIGS. 18-21 show and describe a hinge assembly with spacer elements that includes features and components previously described for the spacer element 434 (shown in FIG. 14). Although the spacer elements are integrated with a particular hinge assembly, the spacer elements may be integrated with any hinge assembly of an accessory device described herein.

Figure 18:
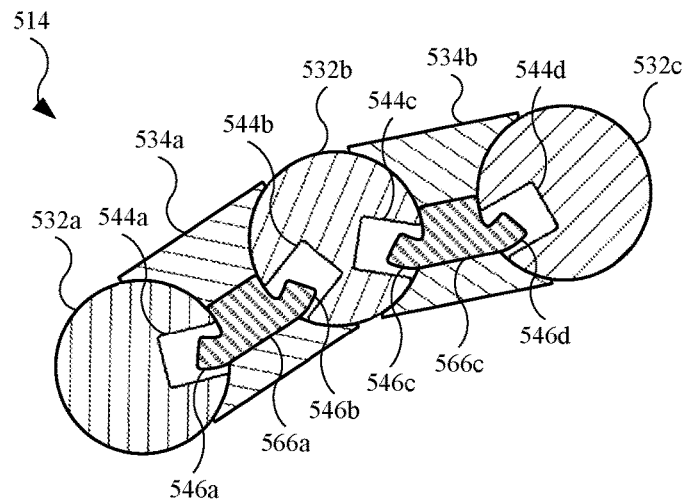
FIG. 18 illustrates a cross sectional view of a hinge assembly, in accordance with some described embodiments.

FIG. 18 illustrates a cross sectional view of a hinge assembly 514, in accordance with some described embodiments. As shown, the hinge assembly 514 may include a roller element 532a, a roller element 532b, and a roller element 532c. The hinge assembly 514 may further include a spacer element 534a and a spacer element 534b, with an insert 566a and an insert 566c integrated with the spacer element 534a and the spacer element 534b, respectively. The insert 566a includes a protrusion 546a and a protrusion 546b located in a cavity 544a (of the roller element 532a) and a cavity 544b (of the roller element 532b), respectively. Also, the insert 566c includes a protrusion 546c and a protrusion 546d located in a cavity 544c (of the roller element 532b) and a cavity 544d (of the roller element 532c), respectively.

As shown, the aforementioned protrusions are not engaged, or in contact with, surfaces that define the aforementioned cavities. As a result, the roller elements can rotate (along concave surfaces of the spacer elements) relative to the spacer elements, or conversely, the spacer elements can rotate (along rounded surfaces of the roller elements) relative to the roller elements. However, once the protrusions contact the surfaces (that define the cavities), the hinge assembly 514 can prevent further movement of accessory device from further movement.

Figure 19:
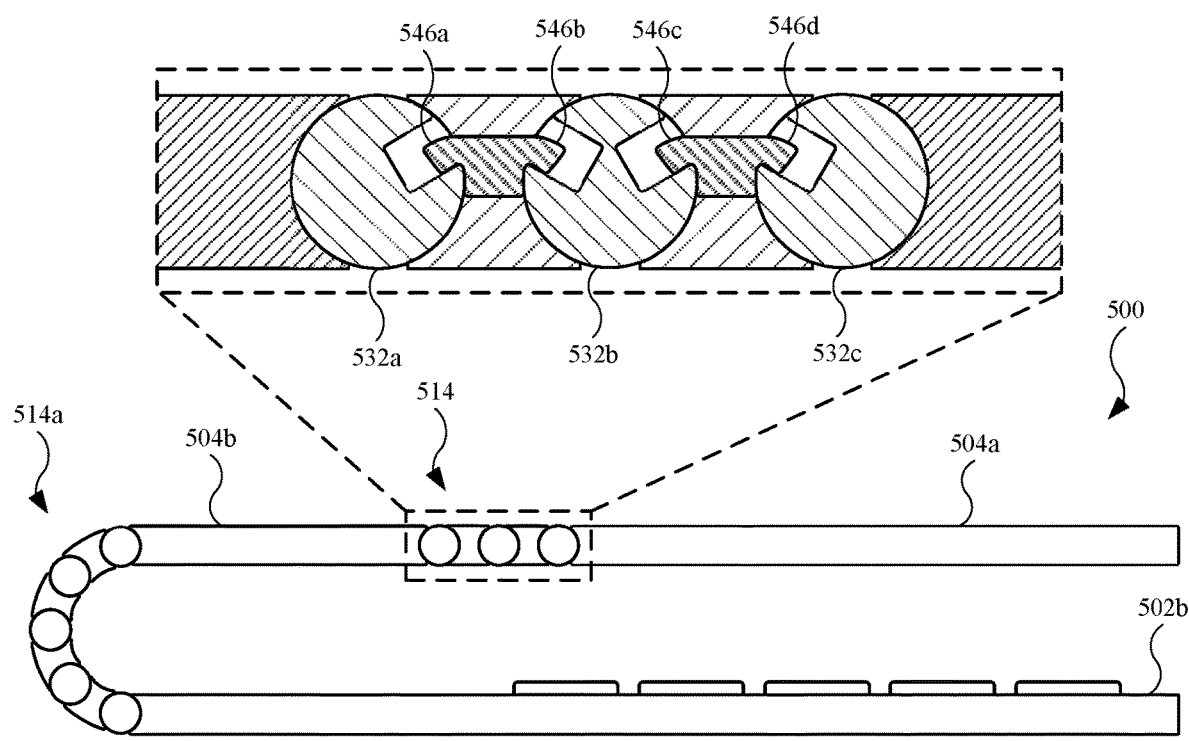
FIG. 19 illustrates a side view of an accessory device with the hinge assembly shown in FIG. 18 integrated with the accessory device.

FIG. 19 illustrates a side view of an accessory device 500 with the hinge assembly 514 shown in FIG. 18 integrated with the accessory device 500. As shown, the accessory device 500 is in a closed position, and the hinge assembly 514 connects a segment 504a of the accessory device 500 with a segment 504b of the accessory device 500. Further, as shown in the enlarged cross sectional view, the protrusions of the inserts are engaged with the roller elements. For example, the accessory device 500, in the closed position, causes movement of the hinge assembly 514 such that the protrusion 546a and the protrusion 546b engage the roller element 532a and the roller element 532b, respectively, within the respective cavities of the roller element 532a and the roller element 532b. Also, the closed position of the accessory device 500 further causes the protrusion 546c and the protrusion 546c to engage the roller element 532b and the roller element 532c, respectively, within the respective cavities of the roller element 532b and the roller element 532c. As a result, the segment 504a is prevented from further movement toward a section 502b of the accessory device 500. Also, the accessory device 500 further includes a hinge assembly 514a that connects the segment 504b with the section 502b. The hinge assembly 514a may include any features described for the hinge assembly 514.

Figure 20:
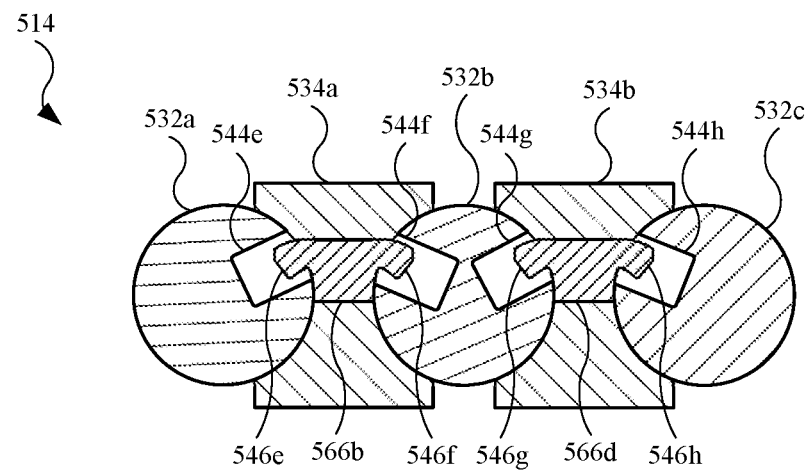
FIG. 20 illustrates a cross sectional view of the hinge assembly shown in FIG. 18, showing the spacer elements with additional inserts, in accordance with some described embodiments.

FIG. 20 illustrates a cross sectional view of the hinge assembly 514 shown in FIG. 18, showing the spacer elements with additional inserts, in accordance with some described embodiments. As shown, the spacer element 534a and the spacer element 534b may further include an insert 566b and an insert 566d, respectively. The insert 566d includes a protrusion 546e and a protrusion 546f located in a cavity 544e (of the roller element 532a) and a cavity 544f (of the roller element 532b), respectively. Also, the insert 566d includes a protrusion 546g and a protrusion 546h located in a cavity 544g (of the roller element 532b) and a cavity 544h (of the roller element 532c), respectively. Also, it should be noted that the roller element 532a, the roller element 532b, and the roller element 532c each include multiple openings to accommodate multiple inserts, and their accompanying protrusions. As an example, the roller element 532b may include a four openings dedicated to the inserts, with an assigned opening for the insert 566a and the insert 566c (shown in FIG. 18), as well as the insert 566b and the insert 566c.

The spacer element 534a carries the insert 566a (shown in FIG. 18) and the insert 566b, and the spacer element 534b carries the insert 566c (shown in FIG. 18) and the insert 566d. However, the protrusion 546e and the protrusion 546f of the insert 566b are oriented toward a direction that is generally opposite to that of the protrusion 546a and the protrusion 546b of the insert 566a (shown in FIG. 18). Further, the protrusion 546g and the protrusion 546h of the insert 566d are oriented toward a direction that is generally opposite to that of the protrusion 546c and the protrusion 546d of the insert 566c (shown in FIG. 18). This configuration allows the spacer element 534a and the spacer element 534b are to limit or prevent movement of the hinge assembly 514 in two different directions. Accordingly, the hinge assembly 514 can limit or prevent movement of an accessory device (that integrates the hinge assembly 514) in two different positions, such as a closed position (shown in FIG. 19) and open position (discussed below).

While the aforementioned protrusions are not engaged, or in contact with, surfaces that define the aforementioned cavities (as shown in FIG. 20), the roller elements can rotate (along concave surfaces of the spacer elements) relative to the spacer elements, or conversely, the spacer elements can rotate (along rounded surfaces of the roller elements) relative to the roller elements. However, once the protrusions contact the surfaces (that define the cavities), the hinge assembly 514 can prevent further movement of accessory device components from further movement.

Figure 21:
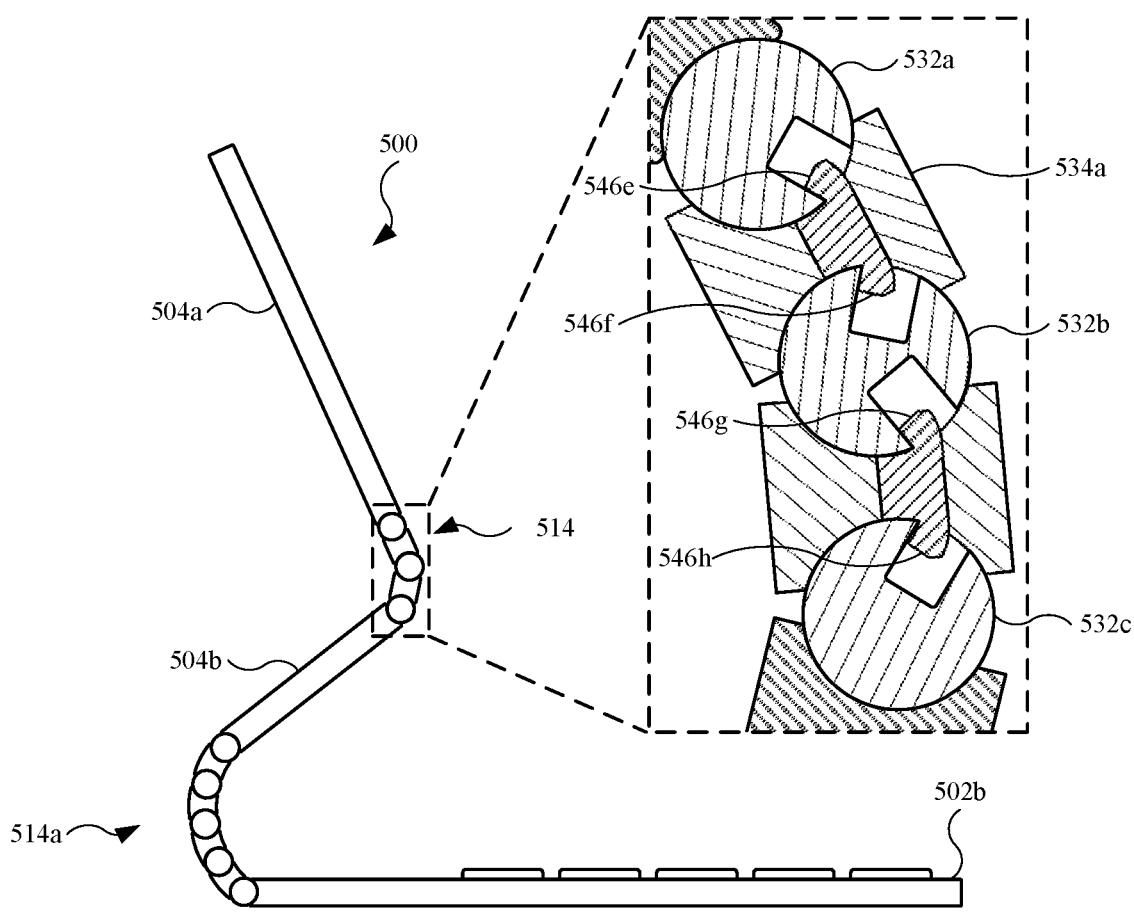
FIG. 21 illustrates a side view of the accessory device shown in FIG. 19, showing the accessory device further limited in movement based on the hinge assembly.

FIG. 21 illustrates a side view of the accessory device 500 shown in FIG. 19, showing the accessory device 500 further limited in movement based on the hinge assembly 514. As shown, the accessory device 500 is in an open position. Further, as shown in the enlarged cross sectional view, the protrusions of the inserts are engaged with the roller elements. For example, the accessory device 500 in the open position causes movement of the hinge assembly 514 such that the protrusion 546e and the protrusion 546f engages the roller element 532a and the roller element 532b, respectively, within the respective cavities of the roller element 532a and the roller element 532b. Also, the open position of the accessory device 500 further causes the protrusion 546g and the protrusion 546h to engage the roller element 532b and the roller element 532c, respectively, within the respective cavities of the roller element 532b and the roller element 532c. As a result, the segment 504a is prevented from further movement away from the section 502b. Also, the hinge assembly 514a may include any features described for the hinge assembly 514 shown in FIGS. 20 and 21.

Figure 22:
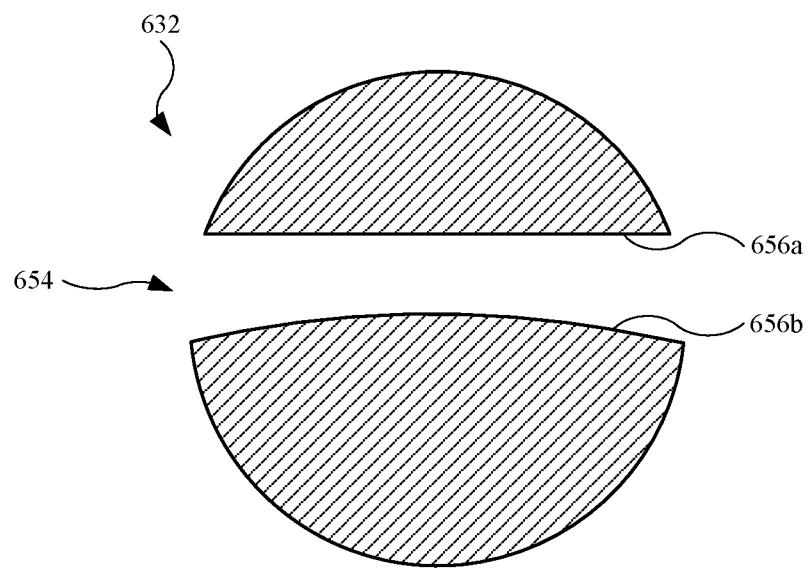
FIG. 22 illustrates a cross sectional view of an embodiment of a roller element for use with a hinge assembly, in accordance with some described embodiments.

FIG. 22 illustrates a cross sectional view of an embodiment of a roller element 632 for use with a hinge assembly, in accordance with some described embodiments. As shown, the roller element 632 includes an opening 654 that may receive, for example, a retention structure (not shown in FIG. 22). The opening 654 may be defined by multiple surfaces. For example, the opening 654 includes a surface 656a and a surface 656b. The surface 656a is generally flat or planar, while the surface 656b is curved or contoured. As shown, the surface 656b defines a convex surface. When integrated into a hinge assembly (not shown in FIG. 22), the roller element 632 can rotate such that the surface 656b engages a retention structure in certain positions and configurations of the hinge assembly.

Figure 23:
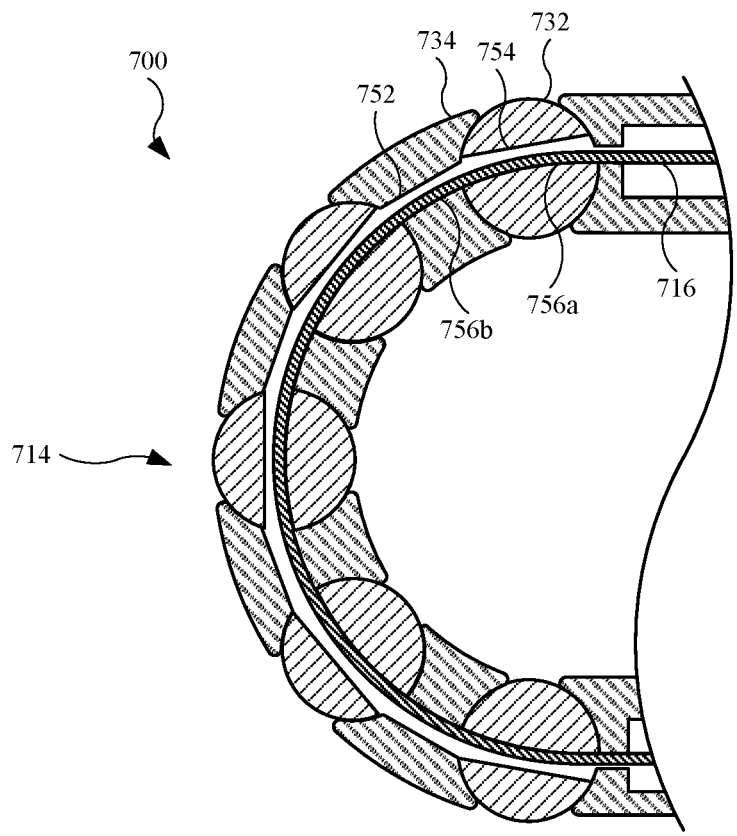
FIG. 23 illustrates a cross sectional view of an embodiment of an accessory device, showing a hinge assembly and a retention structure passing through the hinge assembly, in accordance with some described embodiments.

FIG. 23 illustrates a cross sectional view of an embodiment of an accessory device 700, showing a hinge assembly 714 and a retention structure 716 passing through the hinge assembly 714, in accordance with some described embodiments. The roller elements of the hinge assembly 714 may include a convex surface, similar to the surface 656b of the roller element 632 (shown in FIG. 22). Further, the spacer elements, such as a spacer element 734, of the hinge assembly 714 may include a convex surface, similar to the surface 656b of the roller element 632 (shown in FIG. 22). The hinge assembly 714 includes a roller element 732 with an opening 754 that includes a surface 756a and a spacer element 734 with an opening 752 that includes a surface 756b. These surfaces, and remaining surfaces of the openings in the roller elements and the spacer elements, may be similar to the surface 656b (shown in FIG. 22). In this manner, each surface may include a convex surface designed to engage the retention structure 716, as shown in FIG. 23.

Figure 24:
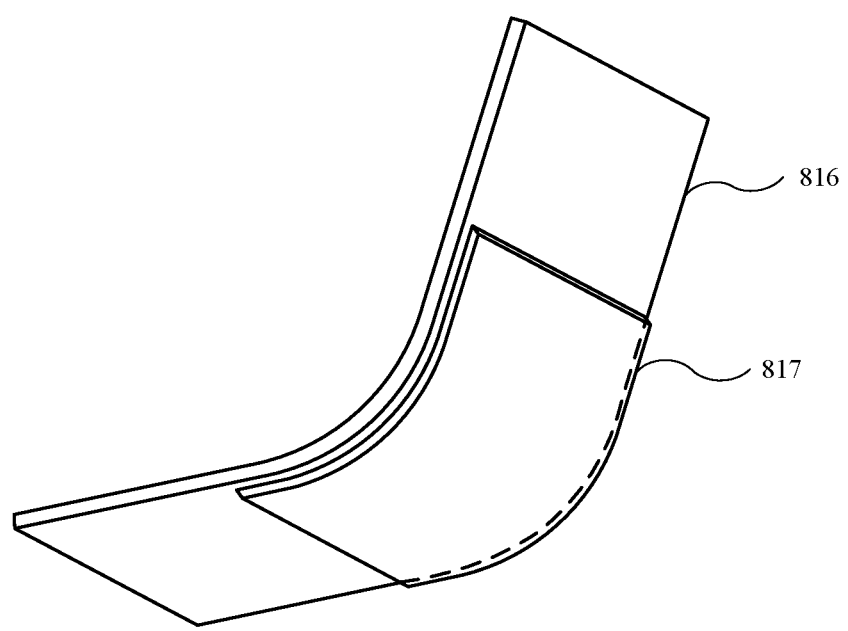
FIG. 24 illustrates an isometric view of an embodiment of a retention structure with a shim structure, in accordance with some described embodiments.

FIG. 24 illustrates an isometric view of an embodiment of a retention structure 816 with a shim structure 817, in accordance with some described embodiments. The retention structure 816 may include any features described herein for a retention structure. Also, the retention structure 816 may substitute for other retention structures described herein. The shim structure 817 (shown primarily as a dotted line) is positioned on a surface of the retention structure 816, and provides additional volume to the retention structure 816. In particular, the shim structure 817 may increase the retention structure 816 in a particular dimension. The shim structure 817 can be adhesively coupled to the retention structure 816, or secured by other means. The shim structure 817 may include tape, as a non-limiting example. Generally, the thickness of the shim structure 817 is less than that of the retention structure 816. However, the relationship related to the thickness may vary.

Figure 25:
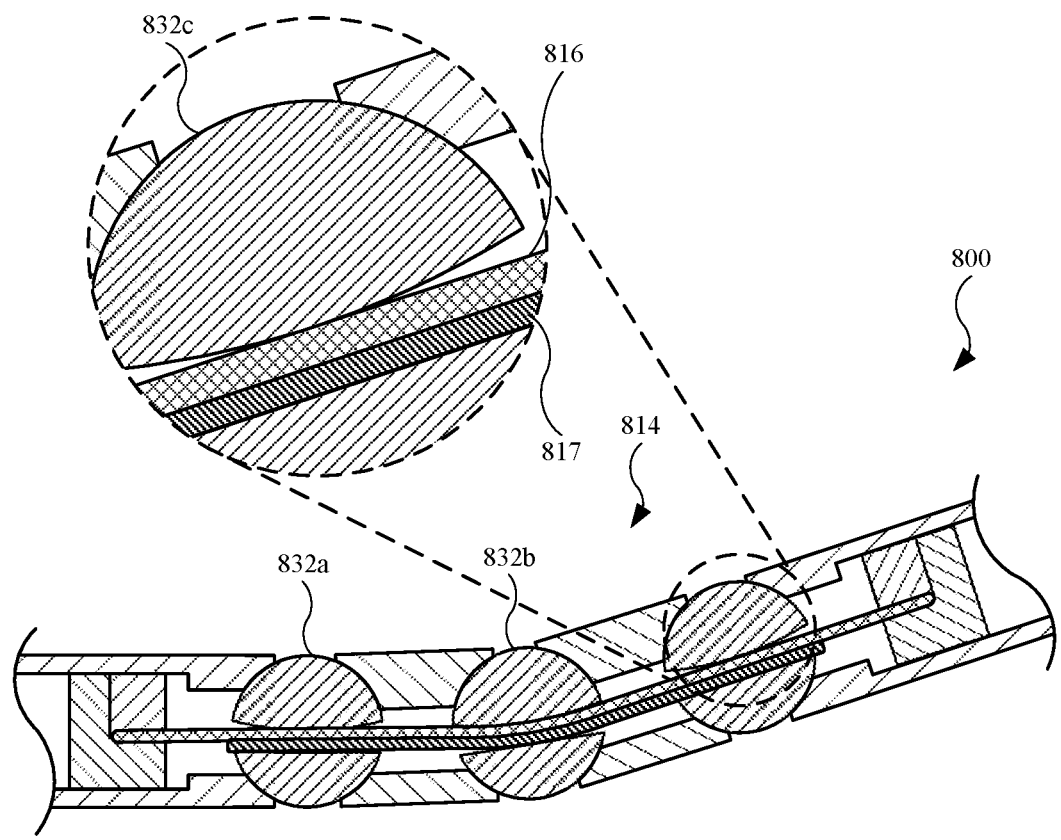
FIG. 25 illustrates a cross sectional view of an embodiment of an accessory device with a hinge assembly, showing the retention structure and the shim structure shown in FIG. 24 integrated with the hinge assembly, in accordance with some described embodiments.
Figure 26:
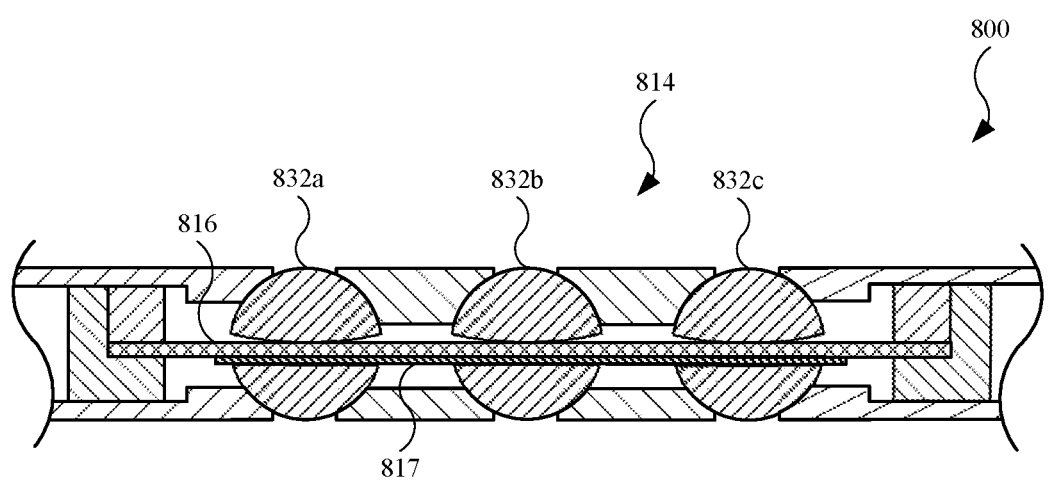
FIG. 26 illustrates a cross sectional view of the accessory device shown in FIG. 25, showing the hinge assembly positioning the accessory device at a different angle.

FIGS. 25 and 26 show and describe an accessory device 800 with a hinge assembly 814 that includes the retention structure 816 (shown in FIG. 24). Further, FIGS. 25 and 26 show movement of the retention structure 816 during movement of the hinge assembly 814 (and the accessory device 800).

FIG. 25 illustrates a cross sectional view of an embodiment of an accessory device 800 with a hinge assembly 814, showing the retention structure 816 and the shim structure 817 integrated with the hinge assembly 814, in accordance with some described embodiments. As shown, the hinge assembly 814 positions the accessory device 800 at an angle that is greater than 90 degrees. In some instances, a retention structure may disengage from any one of the roller element 832a, the roller element 832b, and the roller element 832c of the hinge assembly 814. During the disengagement, the torque required to move the hinge assembly 814 changes, and as a result the force required to transition the accessory device 800 also changes. This may lead to an inconsistent transition of the accessory device 800. However, due in part to the shim structure 817, the retention structure 816 remains engaged with the aforementioned roller elements during a transition of the accessory device 800, and the torque required to move the hinge assembly 814 remains unchanged. Accordingly, the torque profile (of the hinge assembly 814) is consistent, predictable, and repeatable, and a user experiences little or no changes in the hinge assembly 814 when transitioning the accessory device 800. Also, in some instances, the retention structure 816 undergoes a pre-bending operation or a tensioning operation. The shim structure 817 nonetheless provides the engagement with the roller elements.

FIG. 26 illustrates a cross sectional view of the accessory device 800 shown in FIG. 25, showing the hinge assembly 814 positioning the accessory device 800 at a different angle. As shown, the accessory device 800 is generally flat such that two sections of the accessory device 800 are planar and define a 180-degree angle. Despite the retention structure 816 being flat, the retention structure 816 (by way of the shim structure 817) remains engaged with the roller element 832a, the roller element 832b, and the roller element 832c during a transition of the accessory device 800, and the torque required to move the hinge assembly 814 remains unchanged.

Figure 27:
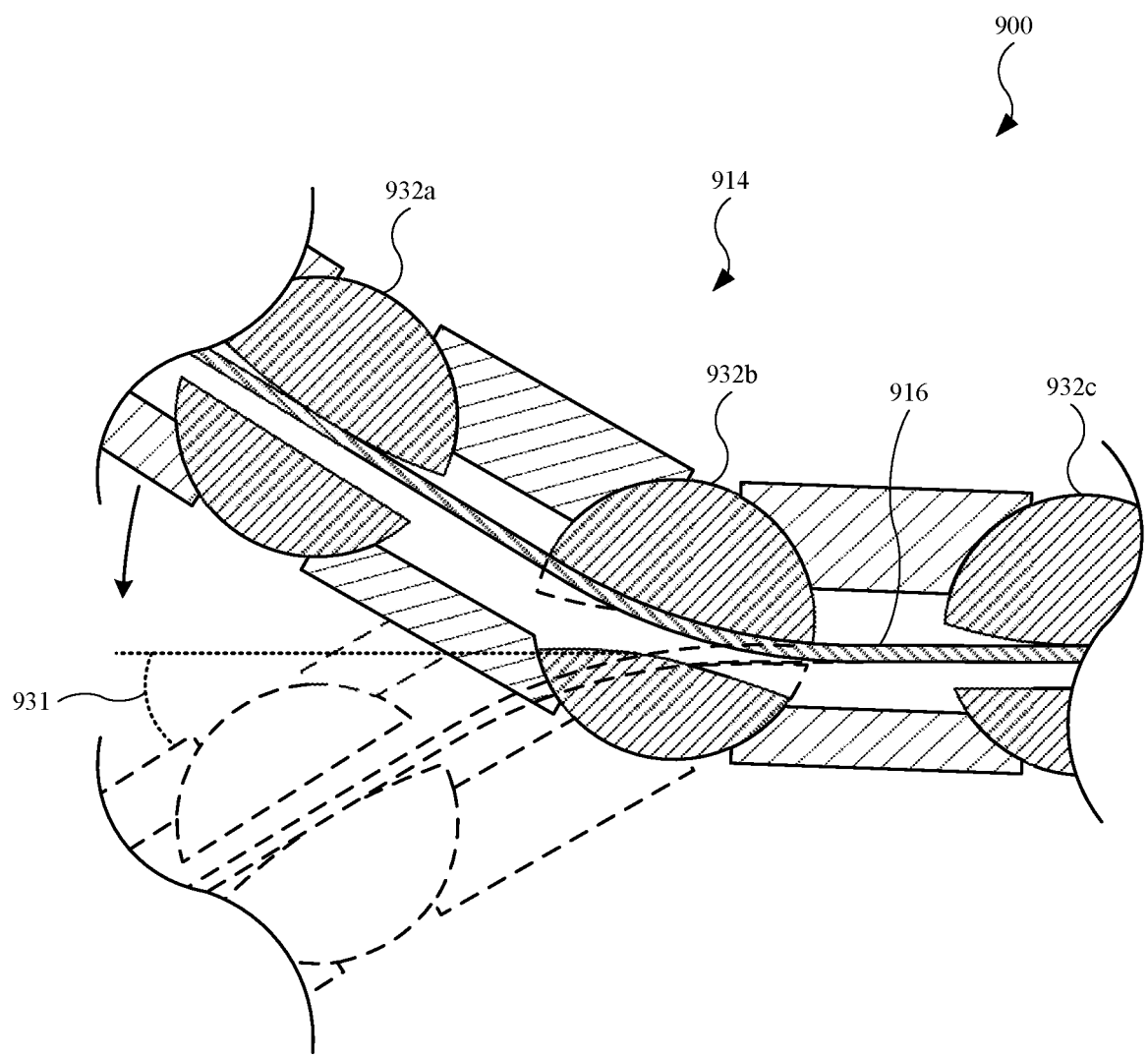
FIG. 27 illustrates a cross sectional view of an alternate embodiment of an accessory device and a hinge assembly, showing the hinge assembly positioning the accessory device at an angle greater than 180 degrees, in accordance with some described embodiments.

In some instances, however, it may be advantageous to allow a retention structure (or structures) to disengage from the components of a hinge assembly. For example, FIG. 27 illustrates a cross sectional view of an alternate embodiment of an accessory device 900 and a hinge assembly 914, showing the hinge assembly 914 positioning the accessory device at an angle greater than 180 degrees, in accordance with some described embodiments. As shown, the hinge assembly 914 includes a roller element 932a, a roller element, 932b, and a roller element 932c. The hinge assembly 914 further includes a retention structure 916 that passes through the aforementioned roller elements. As shown, in an initial position of the hinge assembly 914, the retention structure 916 engages the roller element 932a, the roller element, 932b, and the roller element 932c. However, during a transition to a subsequent position (shown as dotted lines) to an angle 931 beyond the 180-degree angle, the retention structure 916 disengages with at least the roller element 932b. During this instance of disengagement, the torque profile of the hinge assembly 914 changes. For example, the external force or torque (provided by a user) required to move the hinge assembly 914 may decrease, which may facilitate transitioning the hinge assembly 914 (and in turn, the accessory device 900) from one position to another. The initial torque profile (prior to disengagement of the retention structure 916 with the roller element(s)) returns once the retention structure 916 engages the roller element(s). Accordingly, the torque profile of hinge assembly 914 provides at least two positions of equal torque when, with a different (e.g., smaller) torque when the retention structure 916 disengages with at least one of the roller elements.

Figure 28:
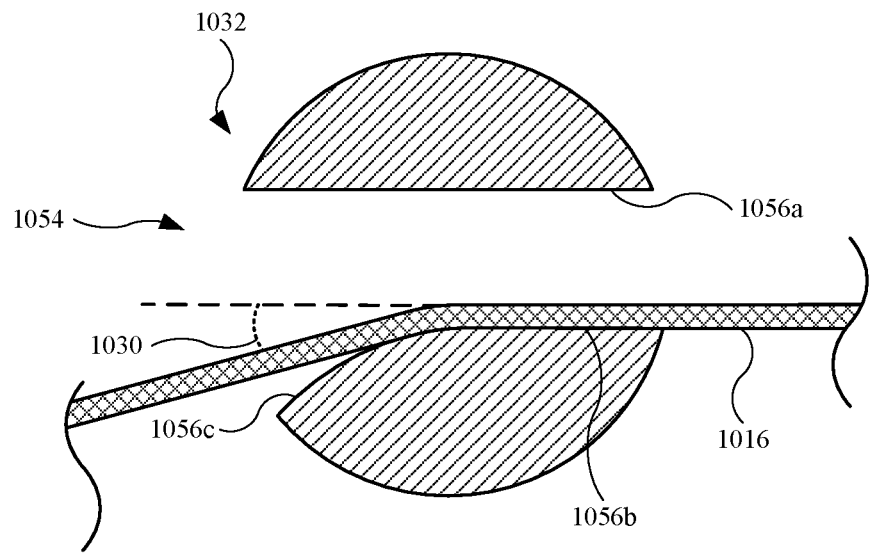
FIG. 28 illustrates a cross sectional view of an alternate embodiment of a roller element for use with a hinge assembly, in accordance with some described embodiments.

FIG. 28 illustrates a cross sectional view of an alternate embodiment of a roller element 632 for use with a hinge assembly, in accordance with some described embodiments. As shown, the roller element 1032 includes an opening 1054 that may receive, for example, a retention structure 1016. The opening 1054 may be defined by multiple surfaces. For instance, the opening 1054 includes a surface 1056a that is generally flat or planar, as well as a surface that includes both a flat portion 1056b and a curved portion 1056c. As shown, the curved portion 1056c includes a non-linear surface. Generally, the curved portion 1056c may include a different slope/curvature, as compared to the flat portion 1056b. As an example, in some embodiments, the curved portion 1056c includes a diagonal, or sloped, configuration with respect to the flat portion 1056b. When integrated into a hinge assembly (not shown in FIG. 28), the roller element 1032 is positioned such that the flat portion 1056b engages, or at least partially engages, the retention structure 1016.

Based on the dimensions of the opening 1054, the retention structure 1016 may apply additional torque to the roller element 1032, which in turn applies additional torque to a hinge assembly that includes the roller element 1032. For example, when the retention structure 1016 is parallel, or approximately parallel, to the flat portion 1056b, the retention structure 1016 can apply a given torque to the roller element 1032. However, as shown in FIG. 2, when the retention structure 1016 is non-parallel to the flat portion 1056b by an angle 1030 (non-zero angle relative to a horizontal line), the retention structure 1016 can rotate toward the curved portion 1056c and apply additional torque to the roller element 1032. The additional torque provided to a hinge assembly by the retention structure 1016 may be used to support, or counterbalance, additional weight provided an electronic device carried by an accessory device (not shown in FIG. 28) that includes the roller element 1032 and the retention structure 1016. It should be noted that the opening 1054 (shown in FIG. 28) and the opening 1054 each define an asymmetric opening, in which two surfaces facing each other are significantly different from each other.

Also, by adjusting the angle 1030, the torque provided by the retention structure 1016 to the roller element 1032 can also change. For instance, by increasing the angle 1030 (i.e., making the angle larger), the surface defined by the curved portion 1056c becomes steeper than what is shown for the curved portion 1056c in FIG. 28. As a result, the retention structure 1016 (when engaging the curved portion 1056c) can provide additional torque to the roller element 1032 when tension is applied to the retention structure 1016. Conversely, by decreasing the angle 1030 (i.e., making the angle smaller), the surface defined by the curved portion 1056c becomes shallower than what is shown for the curved portion 1056c in FIG. 28. As a result, the retention structure 1016 (when engaging the curved portion 1056c) can provide a reduced torque to the roller element 1032 when same tension is applied to the retention structure 1016.

Figure 29:
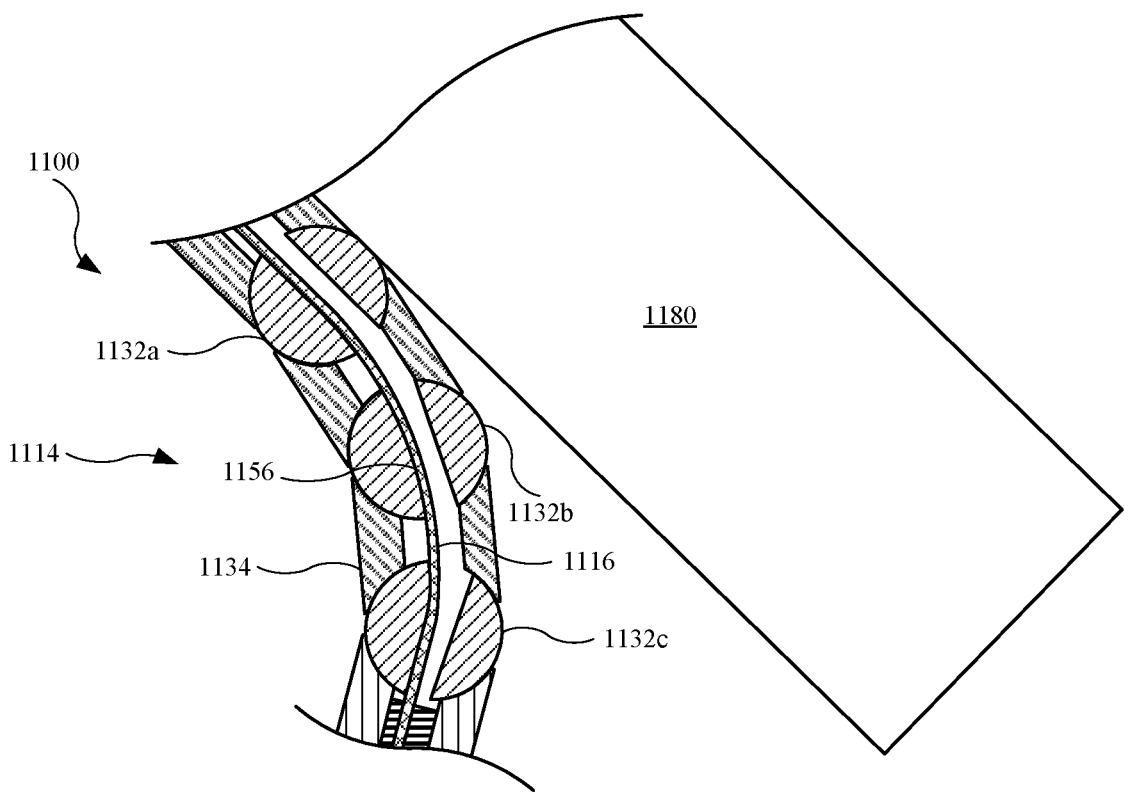
FIG. 29 illustrates a cross sectional view of an alternate embodiment of an accessory device, showing a hinge assembly and a retention structure passing through the hinge assembly, in accordance with some described embodiments.

FIG. 29 illustrates a cross sectional view of an embodiment of an accessory device 1100, showing a hinge assembly 1114 and a retention structure 1116 passing through the hinge assembly 1114, in accordance with some described embodiments. As shown, the hinge assembly 1114 includes a roller element 1132a, a roller element 1132b, and a roller element 1132c. Some of the roller elements of the hinge assembly 1114 may include a flat portion and a diagonal portion, similar to the flat portion 1056b and the curved portion 1056c, respectively, of the roller element 1032 (shown in FIG. 28). For example, the roller element 1132a and the roller element 1132c each include a flat portion and a diagonal portion. However, the respective diagonal portions of the roller element 1132a and the roller element 1132c face the roller element 1132b such that the roller element 1132a and the roller element 1132c are mirror images of each other, in terms of their respective cross sections. The roller element 1132b, located between the roller element 1132a and the roller element 1132c, includes a convex surface 1156 (similar to the surface 656b, shown in FIG. 22). As shown, the accessory device 1100 is supporting an electronic device 1180, similar to the configuration of the accessory device 100 and the electronic device 180 (shown in FIG. 3). By providing roller elements of the hinge assembly 1114 with an engagement surface (for the retention structure 1116) with both a flat portion and a diagonal portion, the retention structure 1116 can provide additional torque to the hinge assembly 1114. In this manner, the hinge assembly 1114 is better suited to support the electronic device 1180 as well as a segment and/or section of the accessory device 1100 that supports the weight of the electronic device 1180. Further, some roller elements can be designed to provide full clearance between a spacer element and the retention structure 1116. For example, the roller element 1132a and a roller element 1132b are designed such that in the position (of the hinge assembly 1114) shown in FIG. 29, a spacer element 1134 (between the roller element 1132a and the roller element 1132b) is not in contact with the retention structure 1116. However, in other positions of the hinge assembly 1114, the spacer element 1134 is contact with the retention structure 1116.

Figure 30:
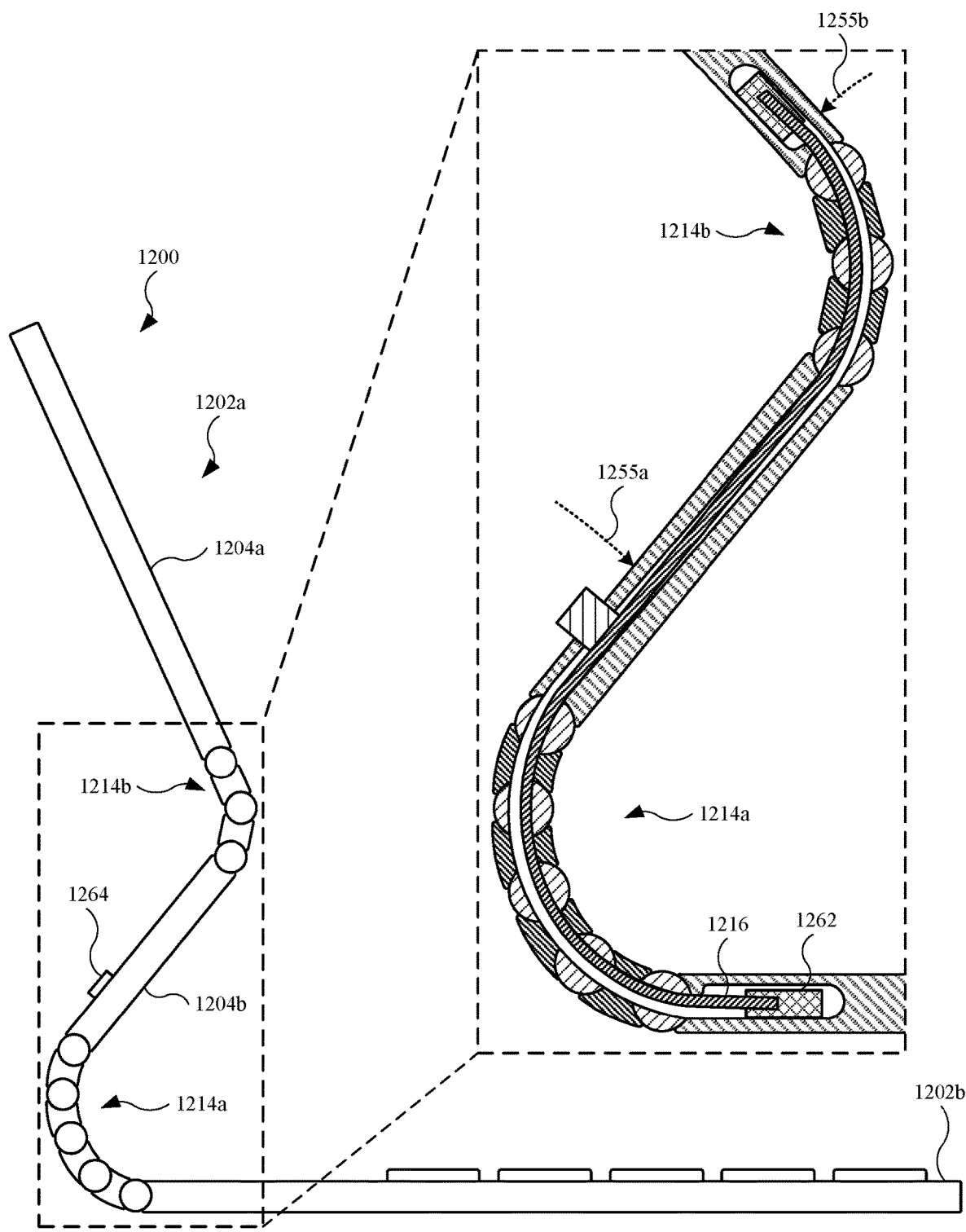
FIG. 30 illustrates a side view of an alternate embodiment of an accessory device, showing a retention structure passing through multiple hinge assemblies, in accordance with some described embodiments.

FIG. 30 illustrates a side view of an alternate embodiment of an accessory device 1200, showing a retention structure 1216 passing through multiple hinge assemblies, in accordance with some described embodiments. As shown, the accessory device 1200 includes a section 1202a and a section 1202b connected to the section 1202a by a hinge assembly 1214a, thereby allowing relative rotational movement between the section 1202a and the section 1202b. The section 1202a further includes a segment 1204a and a segment 1204b connected to the segment 1204a by a hinge assembly 1214b, thereby allowing relative rotational movement between the segment 1204a and the segment 1204b.

As shown in the enlarged cross sectional view, the retention structure 1216 passes through both the hinge assembly 1214a and the hinge assembly 1214b. This may promote synchronous movement of the hinge assembly 1214a and the hinge assembly 1214b. The accessory device 1200 may additional features designed to further promote movement of the hinge assembly 1214a and the hinge assembly 1214b. For example, the accessory device 1200 may include an automated system 1262. The automated system 1262 may include a motor (including a step motor), a spring-loaded mechanism, and/or a cam mechanism. The automated system 1262 is designed adjust the tension of the retention structure 1216. For instance, the automated system 1262 can provide a pulling force that increases the tension on the retention structure 1216. The automated system 1262 can also release the pulling force, thereby decreasing at least some of the tension on the retention structure 1216. The accessory device 1200 may include an internal power supply (not shown in FIG. 30), such as a battery, that provides energy to the automated system 1262. Alternatively, the accessory device 1200 can receive energy from an internal power supply located in an electronic device (not shown in FIG. 30) when the accessory device 1200 is coupled to the electronic device. The adjustment of the tension to the retention structure 1216 can adjust the frictional force between the roller elements and the spacer elements of the hinge assembly 1214a and the hinge assembly 1214b. As a result, the accessory device 1200 can provide an adjustable mechanism that adjusts the degree to which the hinge assemblies can open and close, as well as how much force can be provided to hold an electronic device (not shown in FIG. 30). Regarding the latter, the adjustment to the hinge assembly 1214a can adjust the degree to which the segment 1204b can withstand a force in the direction of an arrow 1255a. Also, the adjustment to the hinge assembly 1214b can adjust the degree to which the segment 1204a can provide a counterbalance to offset a force in the direction of an arrow 1255b. The accessory device 1200 may further include a button 1264 that can be operated by a user. The button 1264 may include a mechanical button that actuates a switch (not shown in FIG. 30), or a button with a capacitive touch interface. The button 1264 is used to control the automated system 1262. Accordingly, the button 1264 can control the retention structure 1216, and in turn, control the frictional forces between the components of the hinge assembly 1214a and the hinge assembly 1214b.

Figure 31:
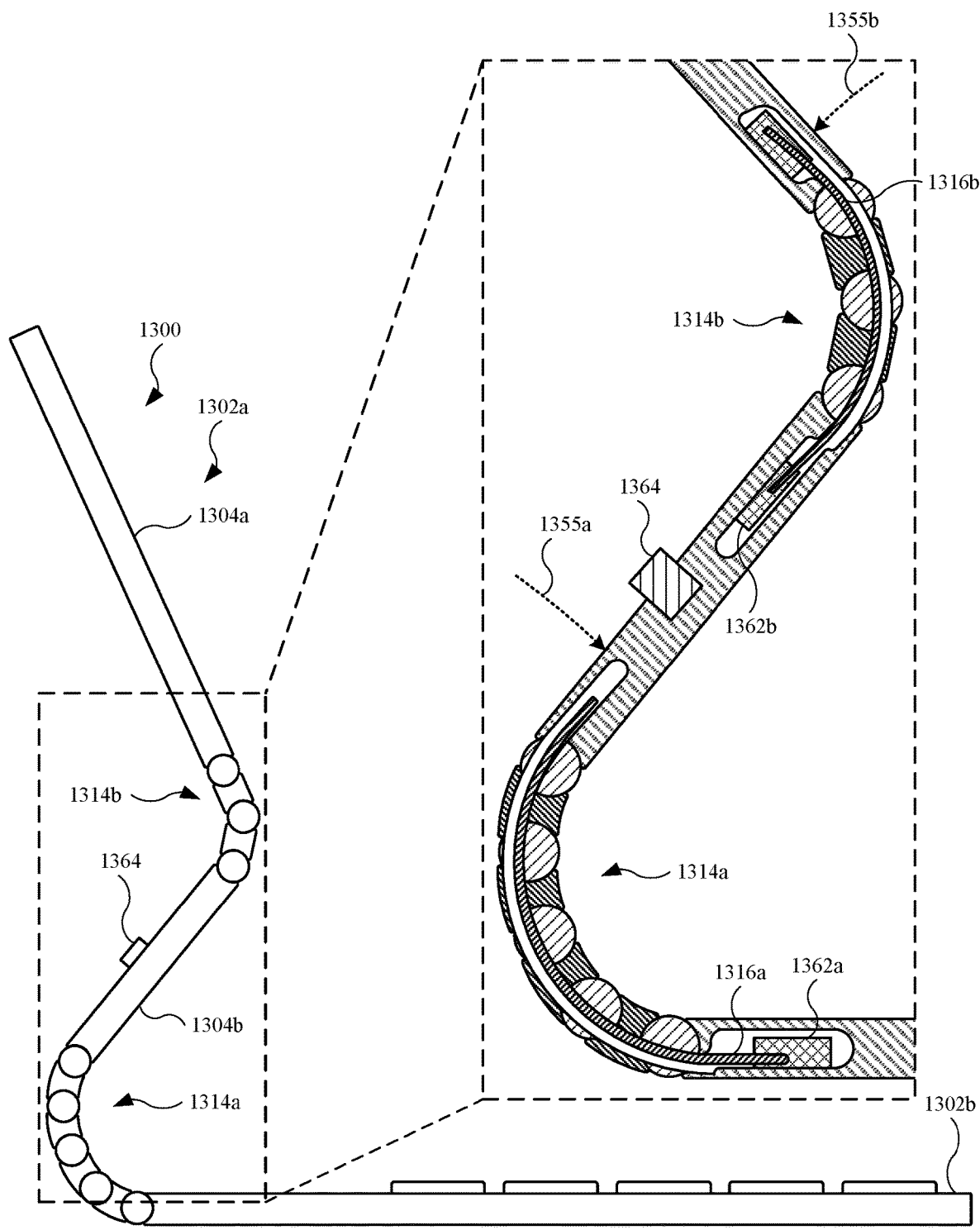
FIG. 31 illustrates a side view of an alternate embodiment of an accessory device, showing multiple hinge assemblies, each with a retention structure, in accordance with some described embodiments.

FIG. 31 illustrates a side view of an alternate embodiment of an accessory device 1300, showing multiple hinge assemblies, each with a retention structure, in accordance with some described embodiments. As shown, the accessory device 1300 includes a section 1302a and a section 1302b connected to the section 1302a by a hinge assembly 1314a, thereby allowing relative rotational movement between the section 1302a and the section 1302b. The section 1302a further includes a segment 1304a and a segment 1304b connected to the segment 1304a by a hinge assembly 1314b, thereby allowing relative rotational movement between the segment 1304a and the segment 1304b.

As shown in the enlarged cross sectional view, the accessory device 1300 includes a retention structure 1316a that passes through the hinge assembly 1314a, and a retention structure 1316b that passes through the hinge assembly 1314b. The accessory device 1300 may include an automated system 1362a and an automated system 1362b connected to the retention structure 1316a and the retention structure 1316b, respectively. The automated system 1362a and the automated system 1362b may include any feature(s)

described for the automated system 1262 (shown in FIG. 30). In this regard, the automated system 1362*a* and the automated system 1362*b* is designed adjust the tension of the retention structure 1316*a* and the retention structure 1316*b*, respectively. The accessory device 1300 may include an internal power supply (not shown in FIG. 31), such as a battery, that provides energy to the automated system 1362*a* and the automated system 1362*b*. Alternatively, the accessory device 1300 can receive energy from an internal power supply located in an electronic device (not shown in FIG. 31) when the accessory device 1300 is coupled to the electronic device. The automated system 1362*a* and the automated system 1362*b* can increase or decrease the tension on the retention structure 1316*a* and the retention structure 1316*b*, respectively. Accordingly, the automated system 1362*a* and the automated system 1362*b* can adjust the frictional force between the roller elements and the spacer elements of the hinge assembly 1314*a* and the hinge assembly 1314*b*, respectively. Moreover, the accessory device 1300 can provide an adjustable mechanism capable of individually adjusting the degree of frictional forces of each hinge assembly, which can adjust the stiffness of the hinge assemblies, as well as how much force can be provided to hold an electronic device (not shown in FIG. 31) by the hinge assemblies. Regarding the latter, the adjustment to the hinge assembly 1314*a* can adjust the degree to which the segment 1304*b* can withstand a force in the direction of an arrow 1355*a*. Also, the adjustment to the hinge assembly 1314*b* can adjust the degree to which the segment 1304*a* can provide a counterbalance to offset a force in the direction of an arrow 1355*b*. The accessory device 1300 may further include a button 1364 that can be operated by a user. The button 1364 is used to control the automated system 1362*a* and the automated system 1362*b*. Accordingly, the button 1364 can control the retention structure 1316*a* and the retention structure 1316*b*, and in turn, control the frictional forces between components of the hinge assembly 1314*a* and the hinge assembly 1314*b*, respectively.

Figure 32:
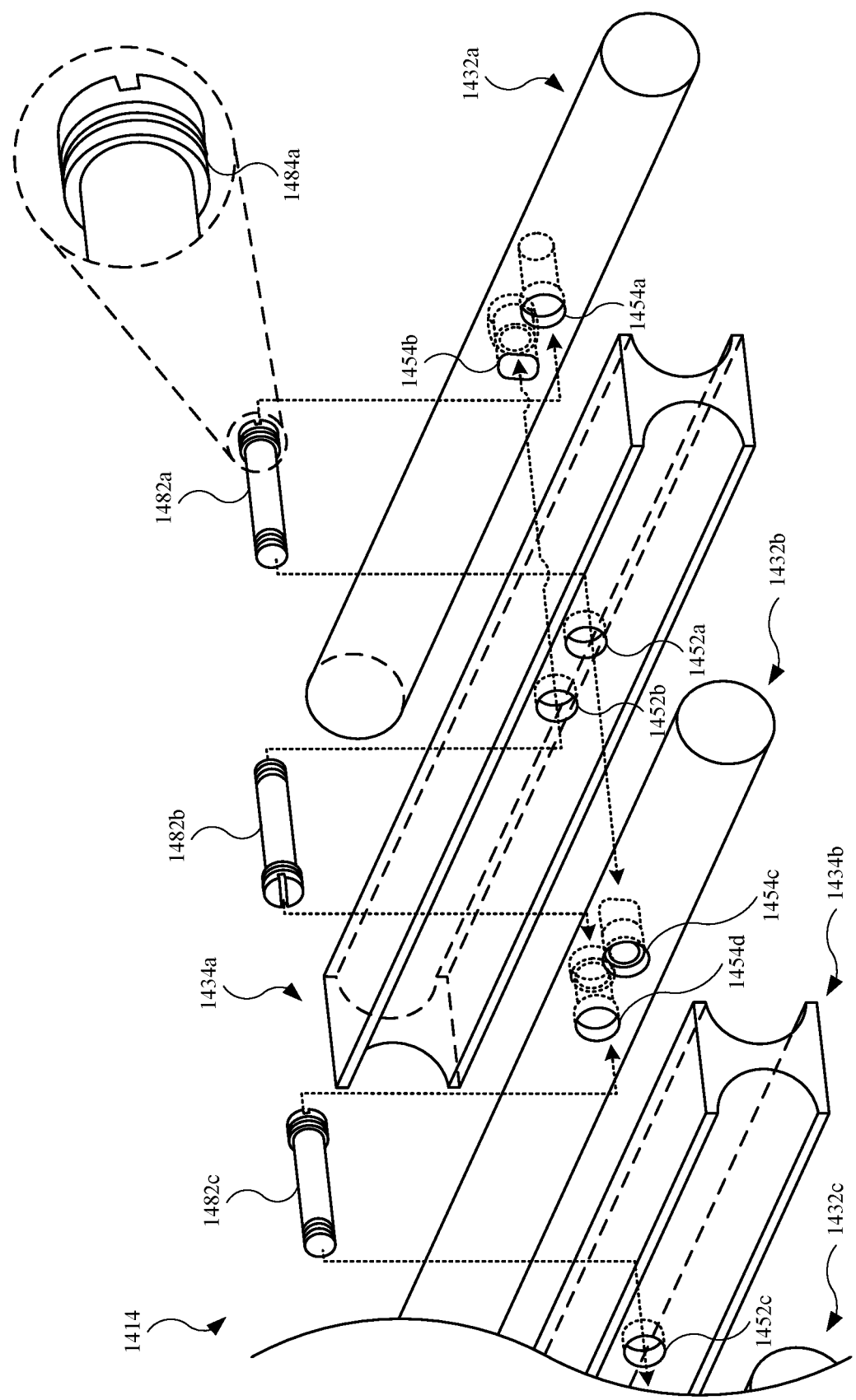
FIG. 32 illustrates an exploded view of an alternate embodiment of a hinge assembly, showing the various components of the hinge assembly.

FIG. 32 illustrates an exploded view of an alternate embodiment of a hinge assembly 1414, showing the various components of the hinge assembly 1414. As shown, the hinge assembly 1414 includes a roller element 1432*a*, a roller element 1432*b*, and a roller element 1432*c*. The hinge assembly 1414 further includes a spacer element 1434*a* positioned between the roller element 1432*a* and the roller element 1432*b*, as well as a spacer element 1434*b* positioned between the roller element 1432*b* and the roller element 1432*c*. Although not shown, the hinge assembly 1414 may include additional features, such as retention structures (see the retention structure 216*a*, the retention structure 216*b*, and the retention structure 216*c* in FIG. 11) as well as corresponding openings for the retention structures, as non-limiting examples. Also, although not shown, the hinge assembly 1414 may include additional roller and spacer elements.

Additionally, the hinge assembly 1414 may include a fastening component 1482*a*, a fastening component 1482*b*, and a fastening component 1482*c*. The aforementioned fastening components may include a threaded fastener or threaded bolt, as non-limiting examples. The aforementioned fastening components couple with consecutive roller elements of the hinge assembly 1414, and also pass through a spacer element. For instance, the fastening component 1482*a* includes an end that fits into an opening 1454*a* of the roller element 1432*a*, as well as a threaded end that passes through an opening 1452*a* of the spacer element 1434*a* and into an opening 1454*c* of the roller element 1432*b*. The roller element 1432*b* may include a threaded nut (not labeled) located in the opening 1454*c*. In this manner, the threaded end of the fastening component 1482*a* can be in threaded engagement with the threaded nut. An example will be shown below. Similarly, the fastening component 1482*b* includes an end that fits into an opening 1454*d* of the roller element 1432*b*, as well as a threaded end that passes through an opening 1452*b* of the spacer element 1434*a* and into an opening 1454*b* of the roller element 1432*a*. The roller element 1432*a* may include a threaded nut (not labeled) located in the opening 1454*b* and capable of threaded engagement with the threaded end of the fastening component 1482*b*. Also, the fastening component 1482*c* includes an end that fits into the opening 1454*d* of the roller element 1432*b*, as well as a threaded end that passes through an opening 1452*c* of the spacer element 1434*b* and into an opening (not shown in FIG. 32) of the roller element 1432*c*. The roller element 1432*c* may include a threaded nut (not shown in FIG. 32) located in the opening (that receives the threaded end of the fastening component 1482*c*), and capable of threaded engagement with the threaded end of the fastening component 1482*c*.

Further, each of the fastening components may carry a tensioning element. For example, as shown in the enlarged view, the fastening component 1482*a* carries a tensioning element 1484*a*. The tensioning element 1484*a* may include a flexible assembly, such as a spring or a washer (including a Belleville washer, as a non-limiting example). When the hinge assembly 1414 is assembled, the fastening components may be compressed by adjacent structures. For example, the tensioning element 1484*a* can be compressed by the roller element 1432*a* and the spacer element 1434*a*. The compression of the tensioning element 1484*a* allows for frictional engagement between the roller element 1432*a* and the spacer element 1434*a*. Moreover, an adjustment to the fastening component 1482*a* (e.g., rotating to tighten or loosen) can alter the compression to the tensioning element 1484*a*, thereby adjusting the frictional engagement between the roller element 1432*a* and the spacer element 1434*a*.

Figure 33A:
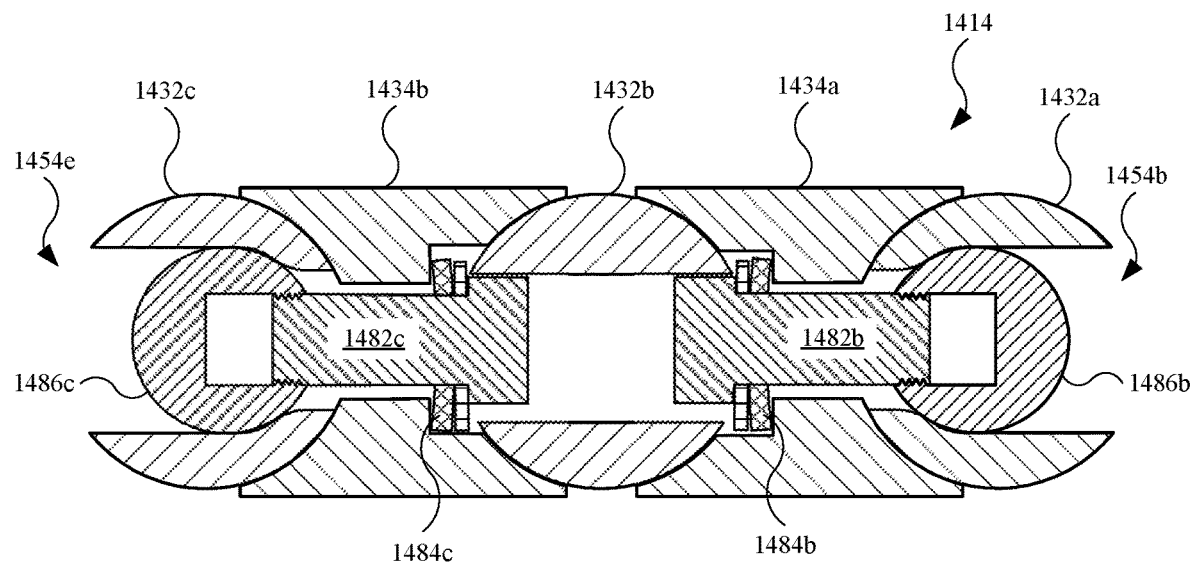
FIG. 33A illustrates a cross sectional view of the hinge assembly shown in FIG. 32, showing the elements of the hinge assembly secured together.

FIG. 33A illustrates a cross sectional view of the hinge assembly 1414 shown in FIG. 32, showing the elements of the hinge assembly 1414 secured together. As shown, the spacer element 1434*a* engages the roller element 1432*a* and the roller element 1432*b*. Also, the spacer element 1434*b* engages the roller element 1432*b* and the roller element 1432*c*. Additionally, the fastening component 1482*b* and the fastening component 1482*c* carry a tensioning element 1484*b* and tensioning element 1484*c*, respectively. The tensioning element 1484*b* and the tensioning element 1484*c* may include any features described for the tensioning element 1484*a* (shown in FIG. 32). In this regard, the tensioning element 1484*b* may be compressed between the spacer element 1434*a* and the roller element 1432*b*, and the tensioning element 1484*c* may be compressed between the spacer element 1434*b* and the roller element 1432*b*.

Further, the roller element 1432*a* includes a nut 1486*b* located in the opening 1454*b*, and the roller element 1432*c* includes a nut 1486*c* located in an opening 1454*e* (of the roller element 1432*c*). In some embodiments, the nut 1486*b* and the nut 1486*c* each include a cylindrical perimeter, thereby defining a cylindrical nut. In the embodiment shown in FIG. 33A, the nut 1486*b* and the nut 1486*c* define a spherical perimeter, thereby defining a spherical nut. The nut 1486*b* and the nut 1486*c* are in threaded engagement with the fastening component 1482*b* and the fastening component 1482*c*, respectively. In some embodiments (not shown in FIG. 33A), a surface of the nut 1486*b* and the nut 1486*c* are co-planar, or flush, with a surface of the roller element 1432a and the roller element 1432c, respectively. For instance, an outer perimeter of the nut 1486b and the nut 1486c can be co-planar, or flush, with an outer perimeter of the roller element 1432a and the roller element 1432c, respectively. In this manner, the nut 1486b and the nut 1486c can define a frictional engagement surface with the spacer element 1434a and the spacer element 1434b, respectively.

Figure 33B:
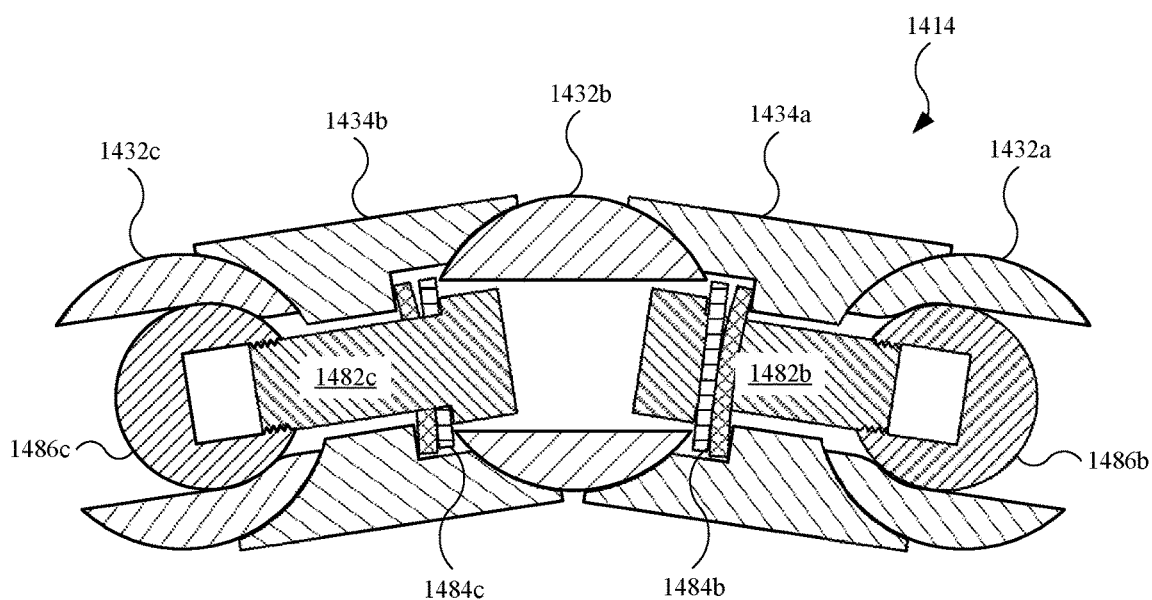
FIG. 33B illustrates a cross sectional view of the hinge assembly shown in FIG. 33A, showing relative movement of some of the elements of the hinge assembly.

When the hinge assembly 1414 is integrated with a system (such as the accessory device 100, shown in FIG. 1), at least some of the elements and components of the hinge assembly 1414 can move/rotate. For example, FIG. 33B illustrates a cross sectional view of the hinge assembly 1414 shown in FIG. 33A, showing relative movement of some of the elements of the hinge assembly 1414. As shown, the spacer element 1434a and the roller element 1432a can move relative to the roller element 1432b, and vice versa, despite the integration of the fastening component 1482b. Similarly, the spacer element 1434b and the roller element 1432c can move relative to the roller element 1432b, and vice versa, despite the integration of the fastening component 1482c. Also, in some embodiments, an additional nut is fitted in to the opening 1454d in order to secure the fastening component 1482b and the fastening component 1482c.

It should be noted that while FIGS. 33A and 33B show and describe the hinge assembly 1414 as having a particular number of elements (e.g., roller elements, spacer elements, fastening components, nuts, etc.), the number of elements can increase or decrease in other embodiments based on the desired length and other characteristics of the hinge assembly 1414. In other words, the hinge assembly 1414 shown and described in FIGS. 33A and 33B is an exemplary hinge assembly, and should not be construed as limiting.

Figure 34:
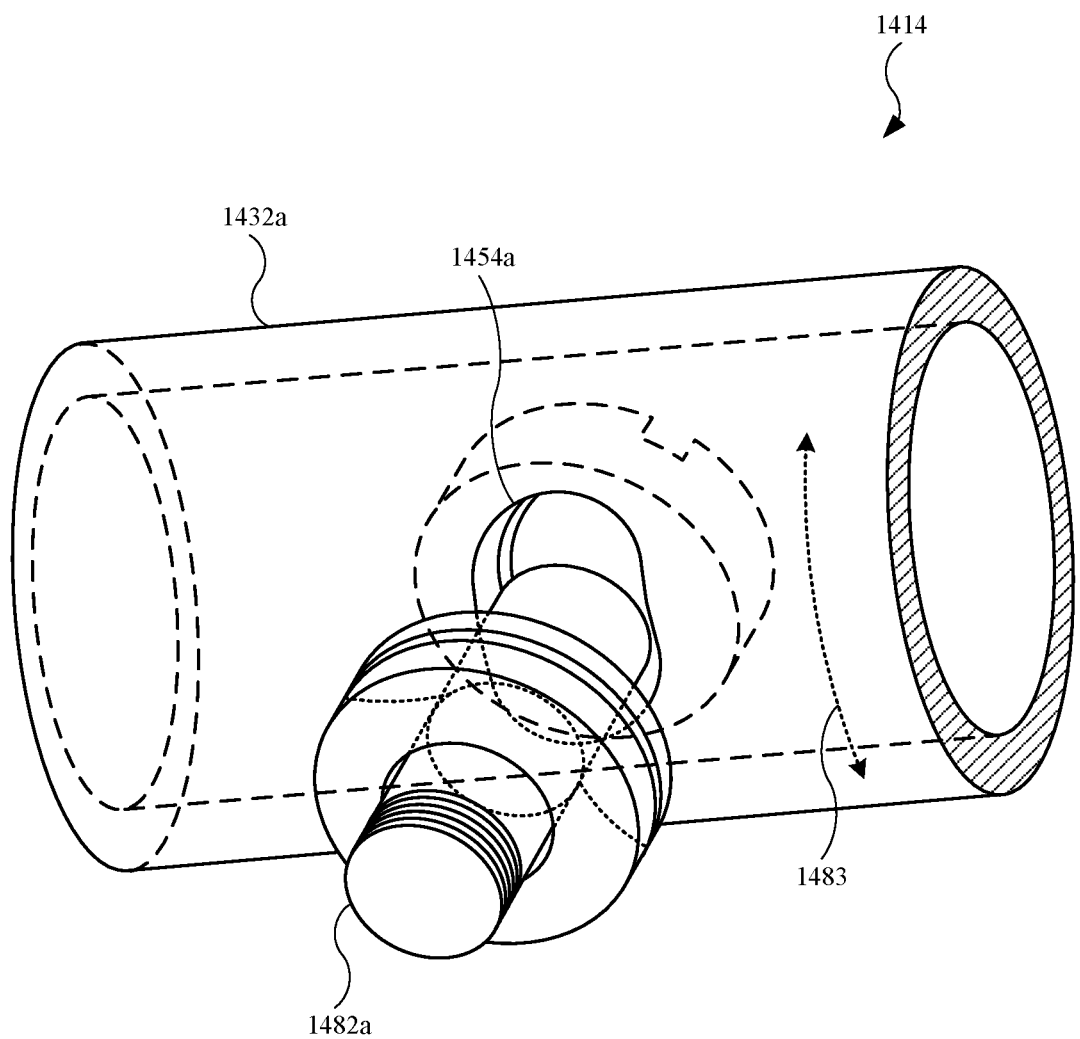
FIG. 34 illustrates an isometric view of a roller element of the hinge assembly shown in FIGS. 32-33B, showing exemplary movement of the fastening component.

FIG. 34 illustrates an isometric view of a roller element 1432a of the hinge assembly 1414 shown in FIGS. 32-33B, showing exemplary movement of the fastening component 1482a. For purposes of illustration, the spacer element 1434a (shown in FIGS. 32-34) is removed. During movement of the roller element 1432a relative to the spacer element 1434a (or vice versa), the fastening component 1482a can move in either direction defined by a two-sided arrow 1483. However, the movement of the fastening component 1482a is limited based upon the dimensions of the opening 1454a. For example, the fastening component 1482a can move in one of the directions defined by the two-sided arrow 1483 until the fastening component 1482a engages the edge of the opening 1454a. Similarly, the fastening component 1482a can move in the other direction defined by the two-sided arrow 1483 until the fastening component 1482a engages the (opposing) edge of the opening 1454a. Once the fastening component 1482a engages the edges of the opening 1454a, further movement of the fastening component 1482a. Additionally, further movement of the spacer element 1434a and the roller element 1432b (both shown in FIGS. 32-33B) also ceases. Thus, the fastening components shown and described in FIGS. 32-34 can be used for controlling movement of the hinge assembly 1414.

Figure 35A:
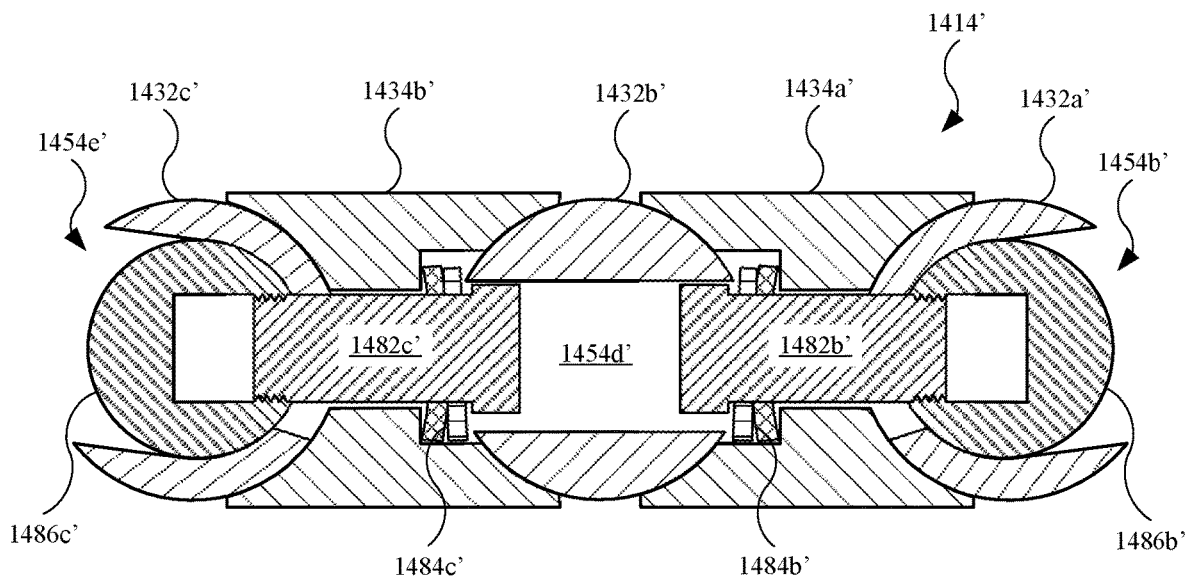
FIG. 35A illustrates a cross sectional view of an alternate embodiment of a hinge assembly.

FIG. 35A illustrates a cross sectional view of an alternate embodiment of a hinge assembly. The hinge assembly 1414' may include any feature(s) shown and described for the hinge assembly 1414 (shown in FIGS. 32-34). As shown, the spacer element 1434a' engages the roller element 1432a' and the roller element 1432b'. Also, the spacer element 1434b' engages the roller element 1432b' and the roller element 1432c'. Additionally, the fastening component 1482b' and the fastening component 1482c' carry a tensioning element 1484b' and tensioning element 1484c', respectively. In this regard, the tensioning element 1484b' may be compressed between the spacer element 1434a' and the roller element 1432b', and the tensioning element 1484c' may be compressed between the spacer element 1434b' and the roller element 1432b'.

Further, the roller element 1432a' includes a nut 1486b' located in the opening 1454b', and the roller element 1432c' includes a nut 1486c' located in an opening 1454e' (of the roller element 1432c'). In some embodiments, the nut 1486b' and the nut 1486c' each include a cylindrical perimeter, thereby defining a cylindrical nut. In the embodiment shown in FIG. 35A, the nut 1486b' and the nut 1486c' define a spherical perimeter, thereby defining a spherical nut. The nut 1486b' and the nut 1486c' are in threaded in engagement with the fastening component 1482b' and the fastening component 1482c', respectively. In some embodiments (not shown in FIG. 35A), a surface of the nut 1486b' and the nut 1486c' are co-planar, or flush, with a surface of the roller element 1432a' and the roller element 1432c', respectively. For instance, an outer perimeter of the nut 1486b' and the nut 1486c' can be co-planar, or flush, with an outer perimeter of the roller element 1432a' and the roller element 1432c', respectively. In this manner, the nut 1486b' and the nut 1486c' can define a frictional engagement surface with the spacer element 1434a' and the spacer element 1434b', respectively.

Figure 35B:
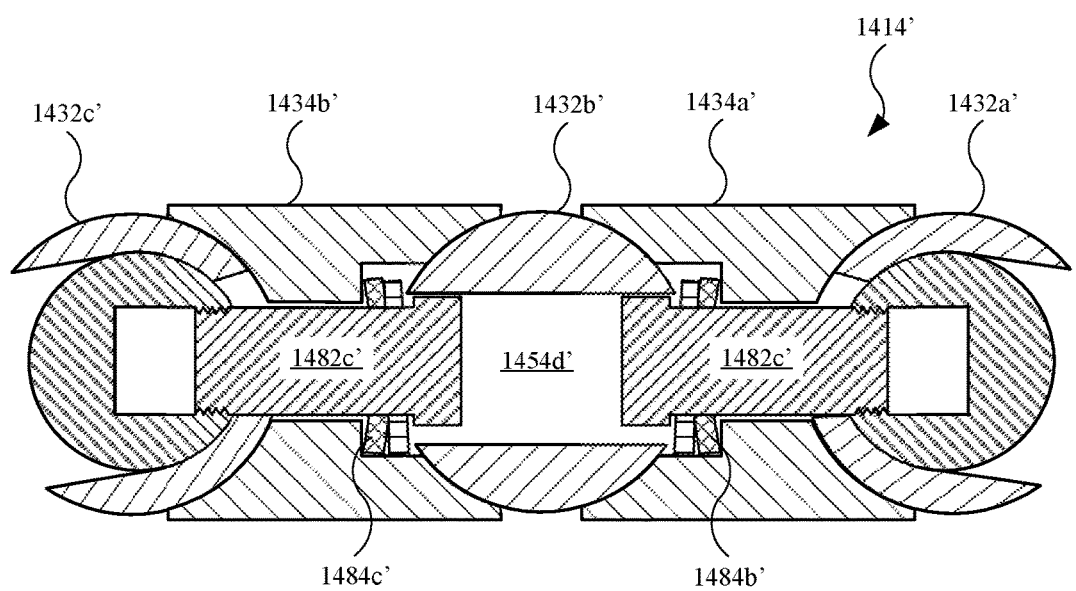
FIG. 35B illustrates a cross sectional view of the hinge assembly shown in FIG. 35A, showing relative movement of some of the elements of the hinge assembly.

When the hinge assembly 1414' is integrated with a system (such as the accessory device 100, shown in FIG. 1), at least some of the elements and components of the hinge assembly 1414' can move/rotate. For example, FIG. 35B illustrates a cross sectional view of the hinge assembly 1414' shown in FIG. 35A, showing relative movement of some of the elements of the hinge assembly 1414'. In some embodiments, the spacer element 1434a' and the roller element 1432a' can move relative to the roller element 1432b', and vice versa, despite the integration of the fastening component 1482b'. Similarly, in some embodiments, the spacer element 1434b' and the roller element 1432c' can move relative to the roller element 1432b', and vice versa, despite the integration of the fastening component 1482c'. However, in the embodiment shown in FIG. 35B, the roller element 1432a' and the roller element 1432c' move (i.e., rotate) relative to the spacer element 1434a', the roller element 1432b', and the spacer element 1434b'.

Figure 36:
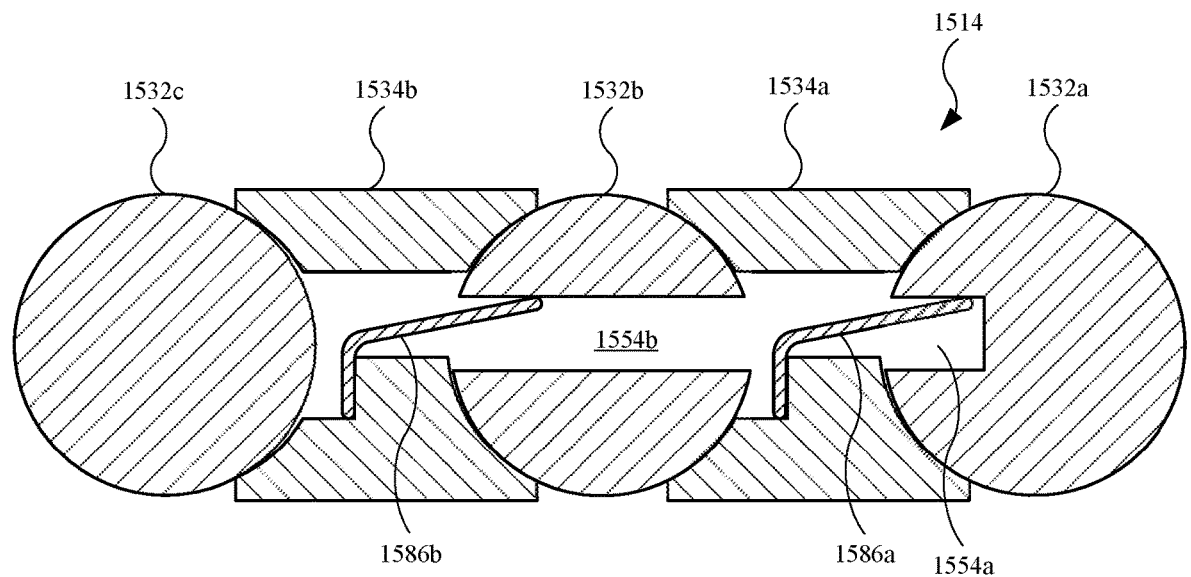
FIG. 36 illustrates a cross sectional view of an alternate embodiment of a hinge assembly, showing the hinge assembly with multiple flexible components.

FIG. 36 illustrates a cross sectional view of an alternate embodiment of a hinge assembly 1514, showing the hinge assembly with multiple flexible components. As shown, the hinge assembly 1514 includes a roller element 1532a, a roller element 1532b, and a roller element 1532c. The hinge assembly 1514 further includes a spacer element 1534a that engages the roller element 1532a and the roller element 1532b, as well as a spacer element 1534b engages the roller element 1532b and the roller element 1532c. Further, the spacer element 1534a carries a flexible member 1586a that extends out of the spacer element 1534a and into an opening 1554a of the roller element 1532a. Additionally, the spacer element 1534b carries a flexible member 1586b that extends out of the spacer element 1534b and into an opening 1554b of the roller element 1532b. The flexible member 1586a and the flexible member 1586b can be secured with the spacer element 1534a and the spacer element 1534b, respectively, by welding, soldering, or adhesives, as non-limiting examples. Also, the flexible member 1586a and the flexible member 1586b may each include a leaf spring, and accordingly, the flexible member 1586a and the flexible member 1586b may include flexible properties. Although not shown, the hinge assembly 1514 may include additional features, such as retention structures (see the retention structure 216a, the retention structure 216b, and the retention structure 216c in FIG. 11) as well as corresponding openings for the retention structures, as non-limiting examples. Also, although not shown, the hinge assembly 1514 may include additional roller and spacer elements.

Figure 37:
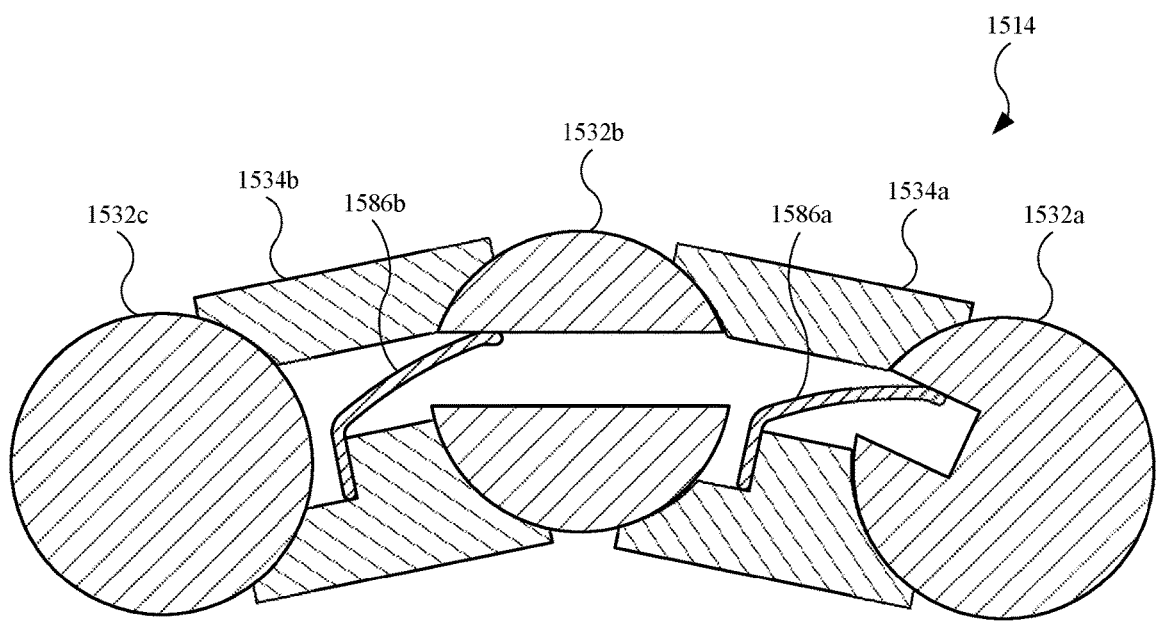
FIG. 37 illustrates a cross sectional view of the hinge assembly shown in FIG. 36, showing relative movement of some of the elements of the hinge assembly.

The flexible member 1586a and the flexible member 1586b are each designed to bend or flex in response to a force (including a torque) derived from movement of the certain components of the hinge assembly 1514. For example, FIG. 37 illustrates a cross sectional view of the hinge assembly 1514 shown in FIG. 36, showing relative movement of some of the elements of the hinge assembly 1514. When the roller element 1532a is rotated relative to the spacer element 1534a (or vice versa), the relative movement causes the flexible member 1586a to bend or flex. Similarly, when the roller element 1532b is rotated relative to the spacer element 1534b (or vice versa), the relative movement causes the flexible member 1586b to bend or flex. The bending/flexing of the flexible member 1586a and the flexible member 1586b increases the stiffness of the hinge assembly 1514, thereby limiting the further movement of the hinge assembly 1514 to within two or more desired positions, and may also provide a force that returns the hinge assembly 1514 to the prior configuration (such as what is shown in FIG. 36). Additionally, the flexible member 1586a and the flexible member 1586b may promote synchronous motion of the components of the hinge assembly 1514. For example, as a result of the bending/flexing of the flexible member 1586a due to movement of the roller element 1532a, the flexible member 1586a may bend but subsequently cease bending, and further torque provided to the roller element 1532a causes the spacer element 1534a to move/rotate, while also promoting movement/rotation of the roller element 1532b and the spacer element 1534b. This may, concurrently, result in the bending/flexing of the flexible member 1586b until the spacer element 1534b and the roller element 1532c begin to move/rotate.

Figure 38:
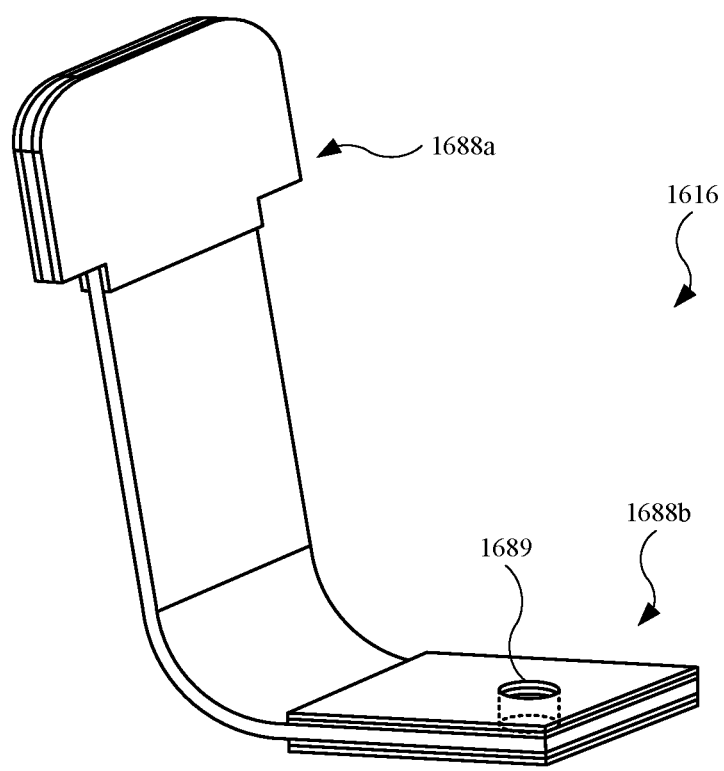
FIG. 38 illustrates an isometric view of an embodiment of a retention structure, showing several layers of materials secured with the ends of the retention structure.

FIG. 38 illustrates an isometric view of an embodiment of a retention structure 1616, showing several layers of materials secured with the ends of the retention structure 1616. As shown, the retention structure 1616 includes several layers of materials on opposing ends (the retention structure 1616). Specifically, the retention structure 1616 includes layers of material 1688a and layers of material 1688b. Each of the layers of material may include two or more layers of steel, including stainless steel (as a non-limiting example). In this manner, the layers of material 1688a and layers of material 1688b may more readily distribute loads applied to the retention structure 1616, as compared to the material layer being formed from non-metal materials. In addition, the layers of material 1688a and layers of material 1688b, each being formed from metal, may provide a more robust retention structure. This may be particularly useful when the retention structure 1616 is secured at its ends, which are defined by the layers of material 1688a and layers of material 1688b. In this manner, the layer of material 1688a may define a structure that fits into a slot (not shown in FIG. 38) and the layers of material 1688b may include an opening 1689 used to receive a fastener (not shown in FIG. 38). Further details regarding integrating a retention structure similar to the retention structure 1616 may be found in, for example, in U.S. patent application Ser. No. 16/053,693, entitled FRICTION ROLLER HINGE FOR ELECTRONIC DEVICES AND METHOD FOR MAKING ROLLER AND SPACER ELEMENTS, which is incorporated by reference in its entirety herein.

Figure 39:
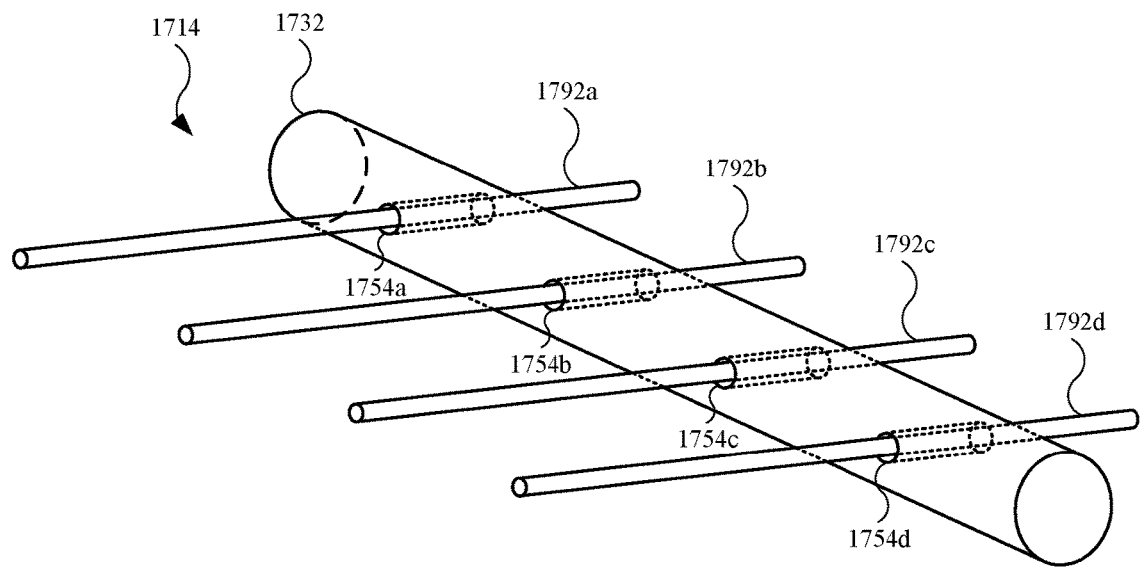
FIG. 39 illustrates an isometric view of an alternate embodiment of a hinge assembly, showing several cables passing through a roller element of the hinge assembly.

FIG. 39 illustrates an isometric view of an alternate embodiment of a hinge assembly 1714, showing several cables passing through a roller element 1732 of the hinge assembly 1714. As shown, the roller element 1732 includes an opening 1754a, an opening 1754b, an opening 1754c, and an opening 1754d. The hinge assembly 1714 further includes a cable 1792a, a cable 1792b, a cable 1792c, and a cable 1792d passing through the opening 1754a, the opening 1754b, the opening 1754c, and the opening 1754d, respectively. Generally, the aforementioned cables and openings each includes a circular cross section. Although not shown, the hinge assembly 1714 may include additional roller elements, as well as spacer elements (similar to spacer elements previously shown and described), with the additional roller elements and spacer elements having circular openings (similar to those shown and described for the openings of the roller element 1732) designed to receive a cable.

Figure 40:
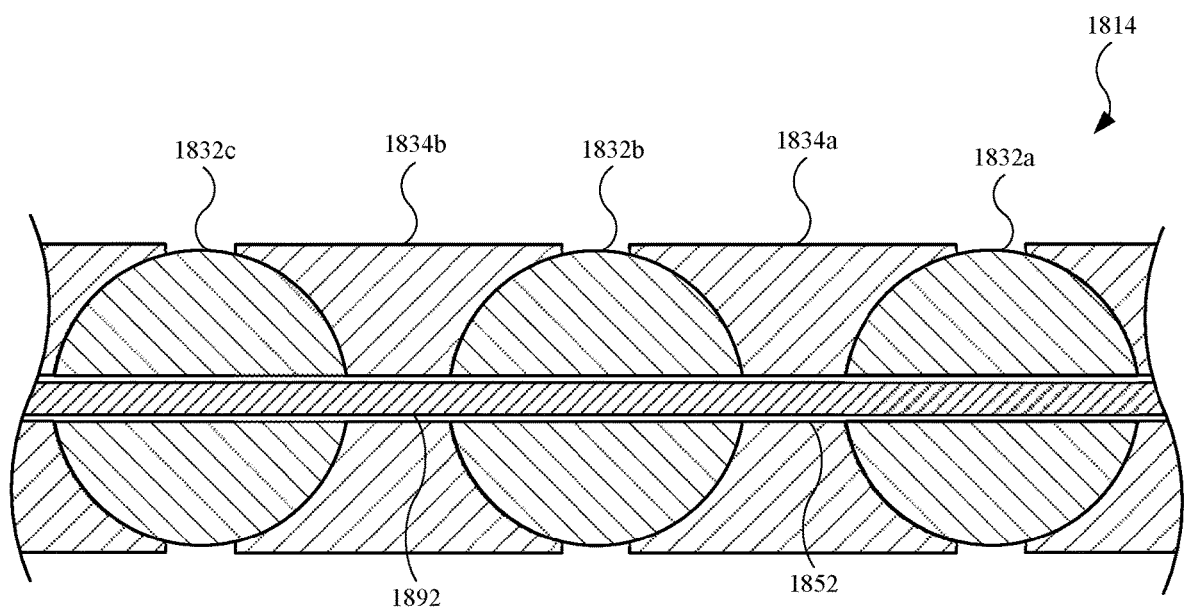
FIG. 40 illustrates a cross sectional view of a hinge assembly, showing a cable passing through several components of the hinge assembly.

FIG. 40 illustrates a cross sectional view of a hinge assembly 1814, showing a cable 1892 passing through several components of the hinge assembly 1814. The hinge assembly 1814 may include features similar to those shown and described for the hinge assembly 1714 (shown in FIG. 39). As shown, the hinge assembly 1814 includes a roller element 1832a, a roller element 1832b, and a roller element 1832c. The hinge assembly 1814 further includes a spacer element 1834a that engages the roller element 1832a and the roller element 1832b, as well as a spacer element 1834b engages the roller element 1832b and the roller element 1832c. The hinge assembly 1814 further includes a cable 1892 passing through respective openings of the aforementioned roller elements and spacer elements. It should be noted that the cable 1892 may include flexible properties, thereby allowing relative movement of the components of the hinge assembly 1814.

Referring to both FIGS. 39 and 40, the openings in the component(s) of the hinge assembly 1714 and the hinge assembly 1814 are relatively smaller than those previously shown and described for prior hinge assemblies. In this regard, the volume or space defined by the openings of the hinge assembly 1714 and the hinge assembly 1814 are relatively smaller. As a result, the locations of the spacer elements below and above the openings may include relatively more material, which may lead to a more reliable spacer element. This may be particularly beneficial when surrounding roller elements are compressing the spacer element. For instance, a spacer element (in prior embodiments) surrounded by, and in contact with, a pair of roller elements may be compressed by the roller elements, causing the spacer element to separate when sufficient compression force is applied, particularly at location(s) associated with an opening of the spacer element. However, when the spacer element 1834a is compressed by the roller element 1832a and the roller element 1832b, the spacer element 1834a is less likely to separate along an opening 1852 of the spacer element 1834a, due in part to the relatively smaller size of the opening 1852, as compared to, for example, the opening 252c (shown in FIG. 11).

Figure 41:
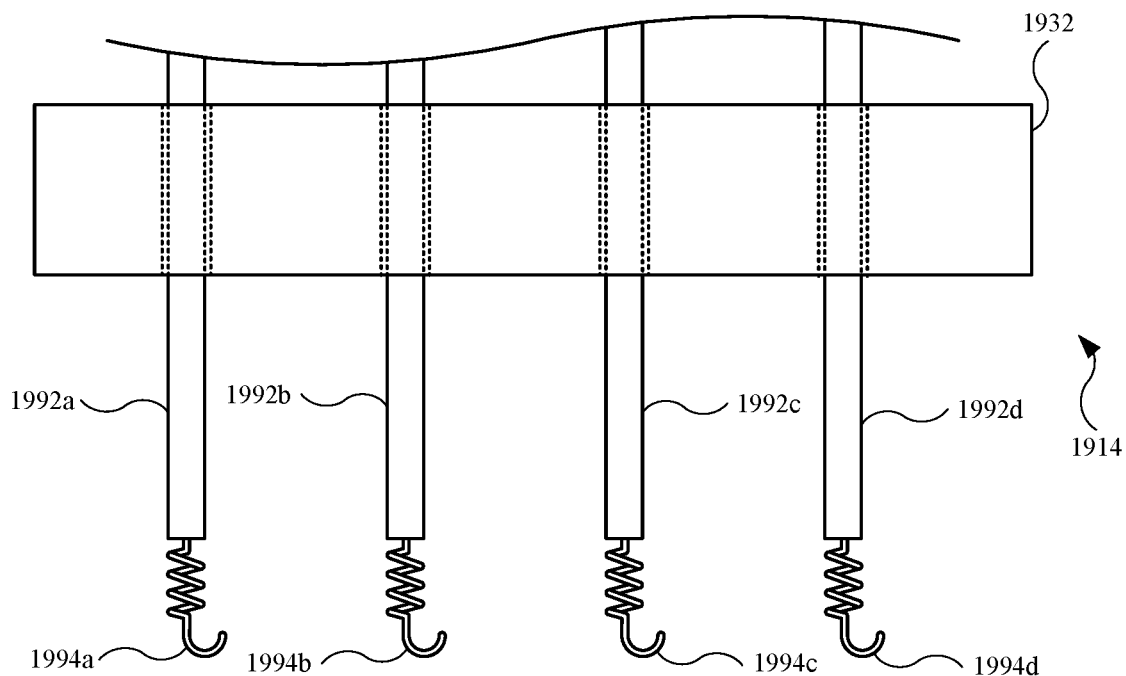
FIG. 41 illustrates a plan view of an alternate embodiment of a hinge assembly, showing several cables of the hinge assembly, with each cable connected to a flexible component.

In some embodiments, a cable(s) passing through a hinge assembly may be fastened or anchored to one end of a system or body, and coupled to another system or body by a spring. For example, FIG. 41 illustrates a plan view of an alternate embodiment of a hinge assembly 1914, showing several cables of the hinge assembly 1914, with each cable connected to a flexible component. As shown, the hinge assembly 1914 includes a roller element 1932. Although not shown, the hinge assembly 1914 may include additional roller elements, as well as spacer elements (similar to spacer elements previously shown and described), with the additional roller elements and spacer elements having circular openings (similar to those shown and described for the openings of the roller element 1932) designed to receive a cable.

The roller element 1932 includes several openings, with each opening receiving a cable. As shown, the hinge assembly 1914 includes a cable 1992a, a cable 1992b, a cable 1992c, and a cable 1992d. The hinge assembly 1914 further includes a flexible component 1994a, a flexible component 1994b, a flexible component 1994c, and the flexible component 1994d connected to the cable 1992a, the cable 1992b, the cable 1992c, and the cable 1992d, respectively. The aforementioned flexible components may include a spring, as a non-limiting example. In this manner, the aforementioned flexible components allow for flexibility and variation in tension of the aforementioned cables, which may be beneficial when the hinge assembly 1914 is transitioning from one configuration/position to another.

Figure 42:
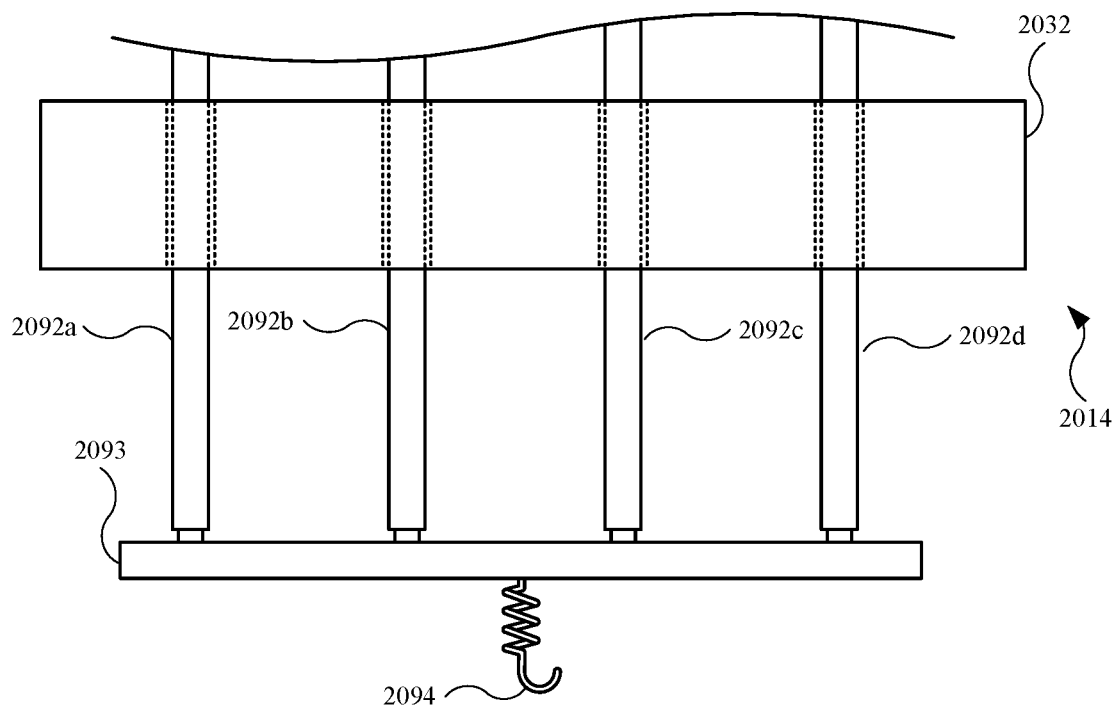
FIG. 42 illustrates a plan view of an alternate embodiment of a hinge assembly, showing several cables of the hinge assembly, and further showing a flexible component coupled with the cables.

FIG. 42 illustrates a plan view of an alternate embodiment of a hinge assembly 2014, showing several cables of the hinge assembly, and further showing a flexible component coupled with the cables. As shown, the hinge assembly 2014 includes a roller element 2032. Although not shown, the hinge assembly 2014 may include additional roller elements, as well as spacer elements (similar to spacer elements previously shown and described), with the additional roller elements and spacer elements having circular openings (similar to those shown and described for the openings of the roller element 2032) designed to receive a cable.

The roller element 2032 includes several openings, with each opening receiving a cable. As shown, the hinge assembly 2014 includes a cable 2092a, a cable 2092b, a cable 2092c, and a cable 2092d. The hinge assembly 2014 further includes a bar 2093 coupled with each of the aforementioned cables. The hinge assembly 2014 further includes a flexible component 2094 coupled with the bar 2093, and accordingly, the flexible component 2094 is coupled with the aforementioned cables. As a result, the flexible component 2094 still allows for flexibility and variation in tension of the aforementioned cables, while also reducing the number of components for the hinge assembly 2014.

Referring to both the hinge assembly 1914 and the hinge assembly 2014 in FIGS. 41 and 42, respectively, in some embodiments, the flexible component (or components) are coupled with both ends of the cables.

Figure 43:
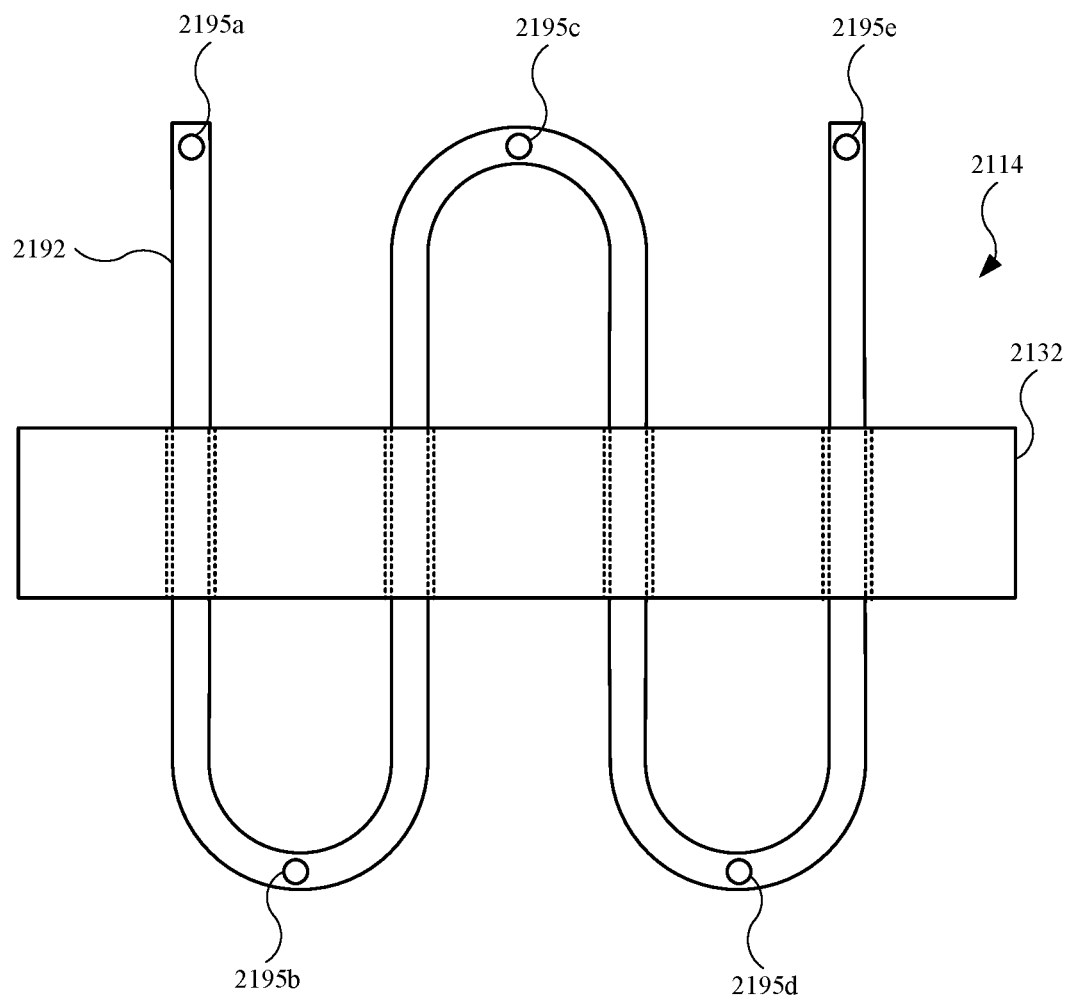
FIG. 43 illustrates a plan view of an alternate embodiment of a hinge assembly, showing a roller element and a single cable passing through several openings of the roller element.

FIG. 43 illustrates a plan view of an alternate embodiment of a hinge assembly 2114, showing a roller element 2132 and a cable 2192 passing through several openings of the roller element 2132. Although not shown, the hinge assembly 2114 may include additional roller elements, as well as spacer elements (similar to spacer elements previously shown and described), with the additional roller elements and spacer elements having circular openings (similar to those shown and described for the openings of the roller element 2132) designed to receive a cable.

The roller element 2132 includes several openings, with the cable 2192 passing through each of the openings. The cable 2192 may include several integrated nodes, or connection points. For example, the cable 2192 includes a node 2195a, a node 2195b, a node 2195c, a node 2195d, and a node 2195e. Each of the nodes may connect to a system(s) or body/bodies, thereby connecting the cable 2192 (and thus, the hinge assembly 2114) to the system(s)/body/bodies.

Figure 44:
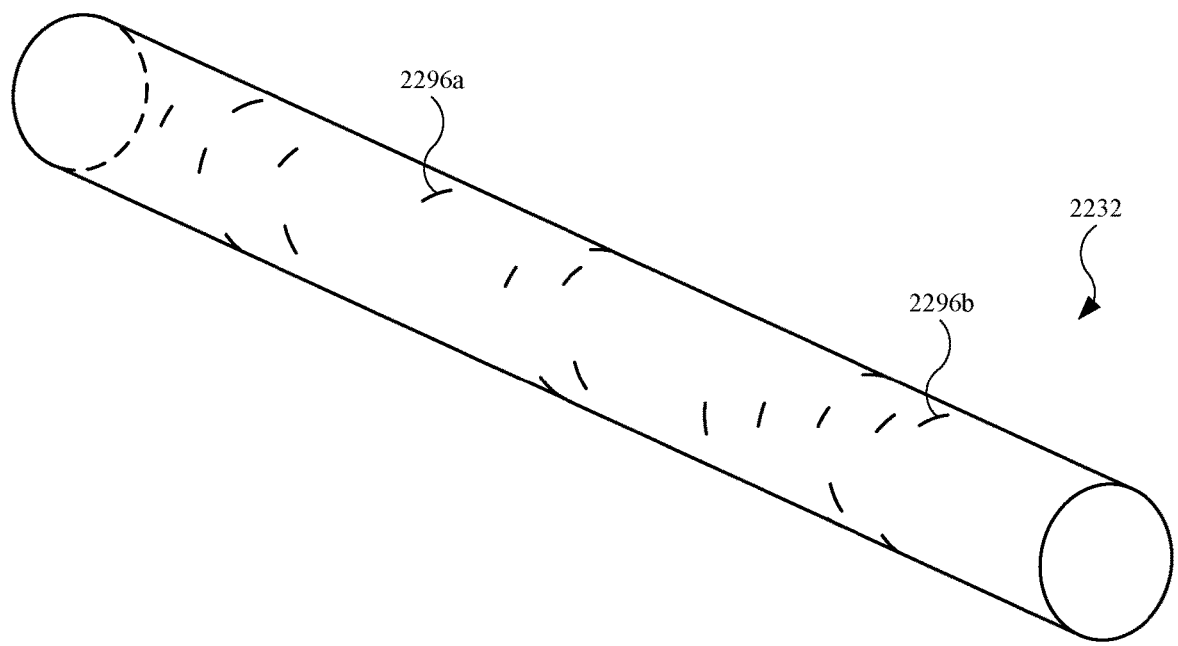
FIG. 44 illustrates an isometric view of an embodiment of a roller element, showing several grooves on an outer circumference of the roller element.

In some instances, a hinge assembly may, over several cycles, break down in certain areas due to wear. For example, FIG. 44 illustrates an isometric view of an embodiment of a roller element 2232, showing several grooves on an outer circumference of the roller element 2232. As shown, the roller element 2232 includes a groove 2296a and a groove 2296b (both representative of additional grooves) on the outer circumference. The aforementioned grooves may result from relative movement, over the course of several instances, by one or more spacer elements (not shown in FIG. 44) engaged with the roller element 2232 (see, for example, FIGS. 33 and 34). As a result, the appearance of the roller element 2232 may change based on the grooves. The change in appearance may include a change in roughness/texture and/or reflectivity, as non-limiting examples. Generally, such changes from the original manufacturer specification are undesirable.

Figure 45:
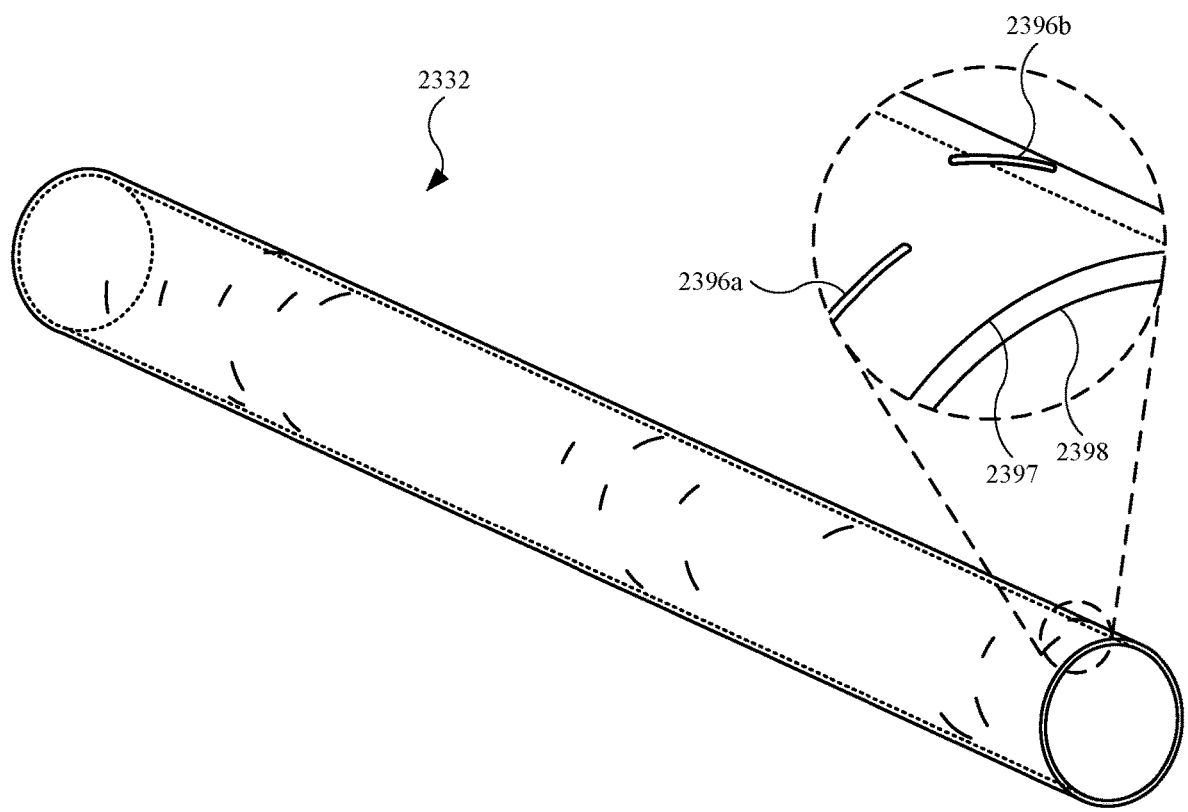
FIG. 45 illustrates an isometric view of an embodiment of a roller element with a coating on an outer circumference of the roller element, further showing a textured pattern applied to the coating.

FIG. 45 illustrates an isometric view of an embodiment of a roller element 2332 with a coating 2397 on an outer circumference 2398 of the roller element 2332, further showing a textured pattern applied to the coating 2397. The coating 2397 may include polymers/plastics (as non-limiting examples) sprayed, molded, or otherwise applied to the outer circumference 2398. Moreover, the coating 2397 may be manipulated to include a textured pattern that includes several grooves. For example, as shown in the enlarged view, the coating 2397 includes a groove 2396a and a groove 2396b (both representative of additional grooves) on the outer circumference 2398. The grooves are "synthetic" grooves. In other words, the grooves are formed prior to assembly of the roller element 2132 with a hinge assembly (not shown in FIG. 45). As a result, the roller element 2332 may be made to include an appearance of "wear" prior to any engagement with one or more spacer elements (not shown in FIG. 45). In this manner, use of the roller element 2332 (i.e., use with a hinge assembly) results in little, if any change, in appearance.

Figure 46:
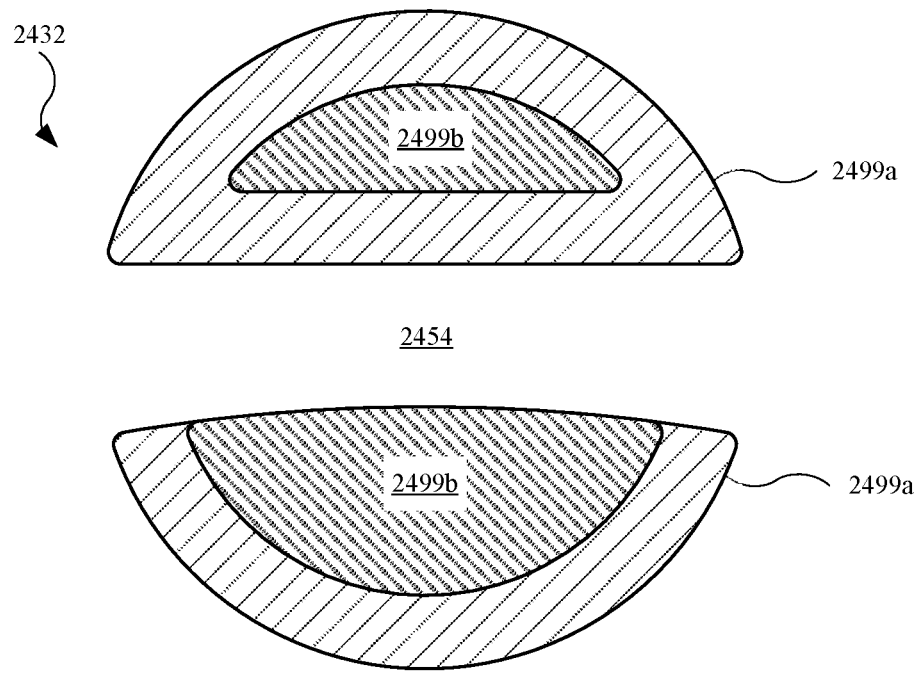
FIG. 46 illustrates a cross sectional view of an embodiment of a roller element, showing the roller element defined by multiple materials.

FIG. 46 illustrates a cross sectional view of an embodiment of a roller element 2432, showing the roller element 2432 defined by multiple materials. For example, the roller element 2432 may include a material 2499a and a material 2499b. In some embodiments, the material 2499a includes a polymer/plastic, while the material 2499b includes a metal (such as steel or stainless steel, as non-limiting examples). In this manner, the weight of the roller element 2432 can be better controlled (as compared to use of a monolithic roller element), as polymers and metals are known to include different densities. Also, the appearance of the roller element 2432 can manipulated to, for example, match the appearance of another element of a hinge assembly (not shown in FIG. 46). The roller element 2432 includes an opening 2454. The opening 2454 can be defined by both the material 2499a and the material 2499b, as shown in FIG. 46. In particular, the surface designed to receive a retention structure or a cable (not shown in FIG. 46) is defined by the material 2499b.

Figure 47:
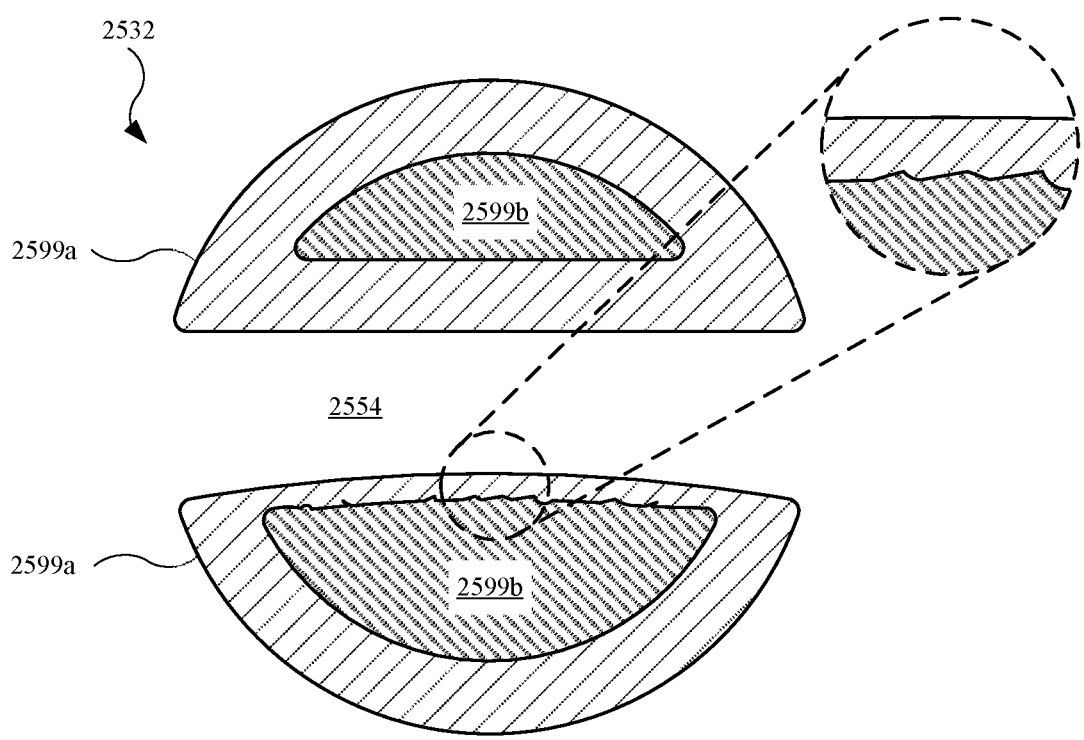
FIG. 47 illustrates a cross sectional view of an embodiment of a roller element, showing the roller element defined by multiple materials.

FIG. 47 illustrates a cross sectional view of an embodiment of a roller element 2532, showing the roller element 2532 defined by multiple materials. For example, the roller element 2532 may include a material 2599a and a material 2599b. In some embodiments, the material 2599a includes a polymer/plastic, while the material 2599b includes a metal (such as steel or stainless steel, as non-limiting examples). Also, the roller element 2532 includes an opening 2554 defined by both the material 2599a and the material 2599b, as shown in FIG. 47. As shown in the enlarged view, the material 2599b is generally rough or jagged. This may result from cutting or other machining processes. When a retention structure or a cable (not shown in FIG. 47) passes through the opening 2554, the jagged surface of the material 2599b will not come into contact with, and cause damage to, the retention structure or cable, as the material 2599a covers the material 2599b. Accordingly, a smoothing operation to the material 2599b need not be performed due to the relatively smooth surface of the material 2599a, and the retention structure or cable is less susceptible to damage.

Figure 48:
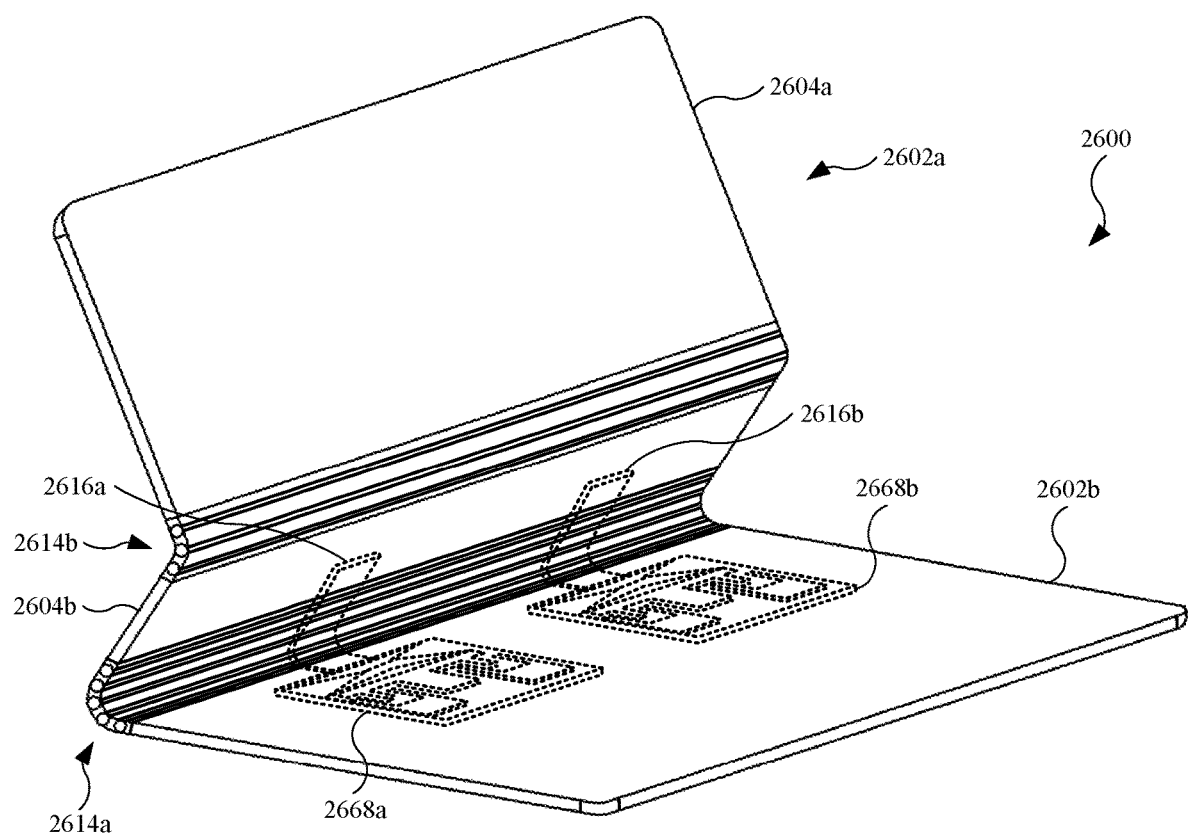
FIG. 48 illustrates an isometric view of an embodiment of an accessory device with retention structures, showing each retention structure coupled to a tension adjustment system, in accordance with some described embodiments.

In order to adjust a hinge assembly (assemblies), some accessory devices herein may include additional features designed to adjust the tension provided to the retention structures that in turn alter features of the hinge assembly. For example, FIG. 48 illustrates an isometric view of an embodiment of an accessory device 2600 with retention structures, showing each retention structure coupled to a tension adjustment system, in accordance with some described embodiments. Similar to other embodiments described herein, the accessory device 2600 may include a section 2602a coupled to a section 2602b by a hinge assembly 2614a that allows relative movement between the section 2602a and the section 2602b. For purposes of illustration, one or more input mechanisms (such as a keyboard, touch pad, and/or touch input display) are removed from the section 2602b. The section 2602a may include a segment 2604a coupled to a segment 2604b by a hinge assembly 2614b that allows relative movement between the segment 2604a and the segment 2604b.

The accessory device 2600 further includes a retention structure 2616a and a retention structure 2616b, both of which pass through the hinge assembly 2614a and the hinge assembly 2614b. In some embodiments, at least one of the retention structure 2616a and the retention structure 2616b are integrated into the hinge assembly 2614a and the hinge assembly 2614b in an offset manner with respect to the center of the hinge assembly 2614a and the hinge assembly 2614b. As a result, the retention structure 2616a and the retention structure 2616b may bias to the hinge assembly 2614a and the hinge assembly 2614b, thereby causing a tendency in the hinge assembly 2614a and the hinge assembly 2614b to maneuver the accessory device 2600 to an open position or a closed position. For example, when the retention structure 2616a and the retention structure 2616b are offset to an outer/exterior region of the hinge assembly 2614a and the hinge assembly 2614b, the hinge assembly 2614a and the hinge assembly 2614b may provide some bias to place the accessory device 2600 to the open position, as shown in FIG. 48. Generally, however, the biasing force does not automatically position the accessory device 2600 in the open position, and a user-applied force is required to position the accessory device 2600 in a desired manner.

While providing a biasing force can assist a user in opening the accessory device 2600, the same biasing force may prevent the accessory device 2600 from remaining in a fully closed position when a user desires such a position. In this regard, the accessory device 2600 can integrate features designed to alter the tension to the retention structure 2616a and the retention structure 2616b, thereby changing the forces provided by the hinge assembly 2614a and/or the hinge assembly 2614b. For example, the accessory device 2600 may include a tension adjustment system 2668a and a tension adjustment system 2668b coupled to the retention structure 2616a and the retention structure 2616b, respectively. The tension adjustment systems are designed to release, or at least relieve, some of the tension on the retention structures. As a result, when the accessory device 2600 in the closed position (as shown in FIG. 2 for the accessory device 100), the retention structures do not cause the hinge assemblies to bias the accessory device 2600 in an undesired manner (i.e., the open position). However, when the accessory device 2600 transition to the open position, the tension adjustment system 2668a and the tension adjustment system 2668a allow the 2616a and the retention structure 2616b, respectively, to return to prior tension profiles. This will be shown and described below. Also, although the tension adjustment system 2668a and the tension adjustment system 2668a are positioned in the section 2602b, in some embodiments, the tension adjustment system 2668a and the tension adjustment system 2668a are positioned in the segment 2604a or the segment 2604b. Also, while one end of the retention structure 2616a and the retention structure 2616b is coupled to the tension adjustment system 2668a and the tension adjustment system 2668b, respectively, the opposing end of the retention structure 2616a and the retention structure 2616b can be fixed/fastened within the segment 2604a.

Figure 49:
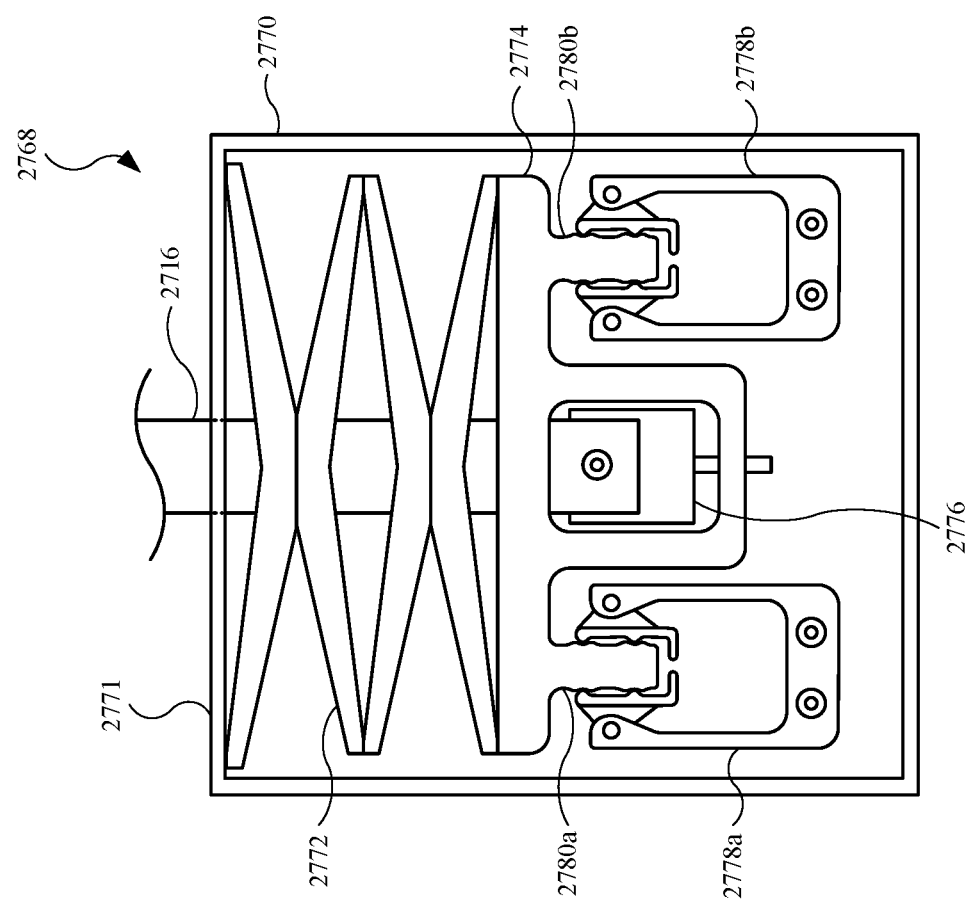
FIG. 49 illustrates a plan view of an embodiment of a tension adjustment system, in accordance with some described embodiments.

FIG. 49 illustrates a plan view of an embodiment of a tension adjustment system 2768, in accordance with some described embodiments. The tension adjustment system 2668a and the tension adjustment system 2668b (shown in FIG. 48) may include any of the features describe herein for the tension adjustment system 2768. The tension adjustment system 2768 may include a housing 2770 that carries the various components and features. For example, the tension adjustment system 2768 may include a biasing mechanism 2772 located in the housing 2770. In some embodiments, the biasing mechanism 2772 is a spring. The tension adjustment system 2768 further includes a structural element 2774, such as a bracket (as a non-limiting example). As shown in FIG. 49, the biasing mechanism 2772 is positioned in a manner such that the biasing mechanism 2772 biases the structural element 2774 away from a wall 2771 (of the housing 2770). The tension adjustment system 2768 further includes a fastening component 2776 that couples the structural element 2774 to a retention structure 2716 that passes through a hinge assembly (or assemblies) of an accessory device (not shown in FIG. 49). The fastening component 2776 may include an adjustable component designed to provide an adjustment to the tension to the retention structure 2716 in order to "fine tune" the tension provided by the biasing mechanism 2772.

The tension adjustment system 2768 further includes a coupling mechanism 2778a and a coupling mechanism 2778b coupled to an extension 2780a and an extension 2780b, respectively, of the structural element 2774. During use of an accessory device that integrates the tension adjustment system 2768, the accessory device transitions from an open position to a closed position, or vice versa. During the transition, the tension applied to the retention structure 2716 may change, and the tension adjustment system 2768 compensates for the change using the biasing mechanism 2772, the structural element 2774, the coupling mechanism 2778a, and the coupling mechanism 2778b. An example will be further shown and discussed below.

Figure 50:
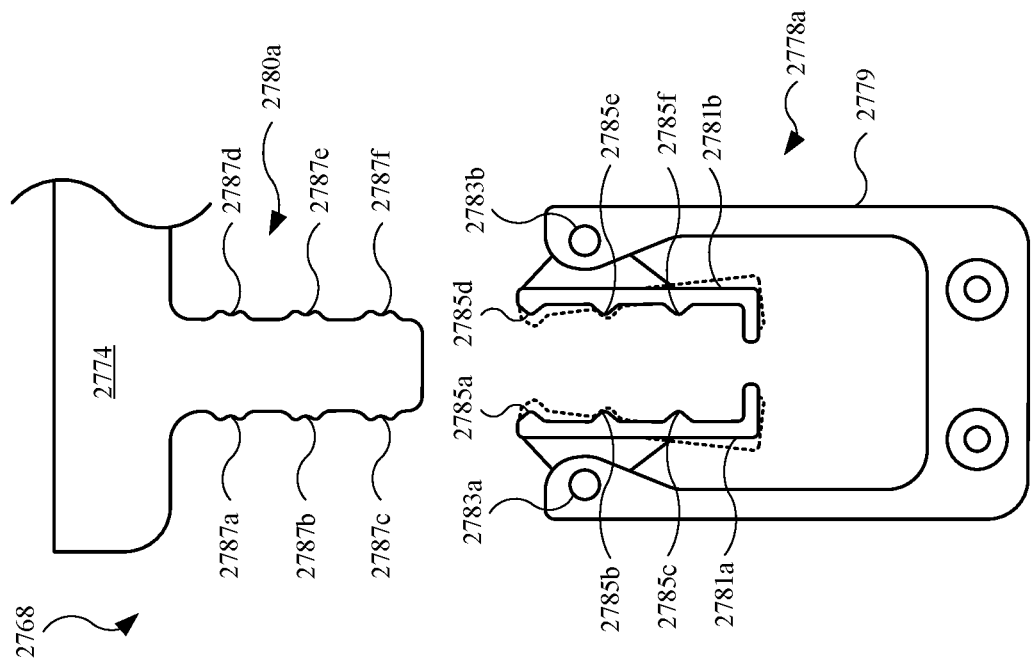
FIG. 50 illustrates a plan view of the extension and the coupling mechanism shown in FIG. 49 of the tension adjustment system, showing several features of the extension and the coupling mechanism.

FIG. 50 illustrates a plan view of the extension 2780a and the coupling mechanism 2778a of the tension adjustment system 2768 shown in FIG. 49, showing several features of the extension 2780a and the coupling mechanism 2778a. The extension 2780a, which is part of the structural element 2774, is designed to mate with the coupling mechanism 2778a. In this regard, the coupling mechanism 2778a may include a body 2779 and a coupling bracket 2781a connected to the body 2779 by a pivot 2783a. The coupling mechanism 2778a may further include a coupling bracket 2781b connected to the body 2779 by a pivot 2783b. The coupling bracket 2781a and the coupling bracket 2781b can rotate (as indicated by the dotted lines) relative to the body 2779 by way of the pivot 2783a and the pivot 2783b, respectively.

In order to mate with the extension 2780a, the coupling bracket 2781a and the coupling bracket 2781b may include one or more protrusions. For example, the coupling bracket 2781a may include a protrusion 2785a, a protrusion 2785b, and a protrusion 2785c. The coupling bracket 2781b may include a protrusion 2785d, a protrusion 2785e, and a protrusion 2785f. The extension 2780a may include a receptacle 2787a, a receptacle 2787b, and a receptacle 2787c designed to engage the protrusion 2785a, the protrusion 2785b, and the protrusion 2785c, respectively. The extension 2780a may further include a receptacle 2787d, a receptacle 2787e, and a receptacle 2787f designed to engage the protrusion 2785d, the protrusion 2785e, and the protrusion 2785f, respectively.

During a transition of an accessory device that integrates the tension adjustment system 2768, the retention structure 2716 (shown in FIG. 49) can move. This may include bending and/or stretching. In conjunction with the retention structure 2716, the extension 2780a can move. Further, the extension 2780a can move relative to the coupling mechanism 2778a. The movement of the extension 2780a may cause engagement or disengagement between at least some the receptacles of the extension 2780a and the protrusions of the coupling bracket 2781a and the coupling bracket 2781b. This will be shown below.

Figure 51:
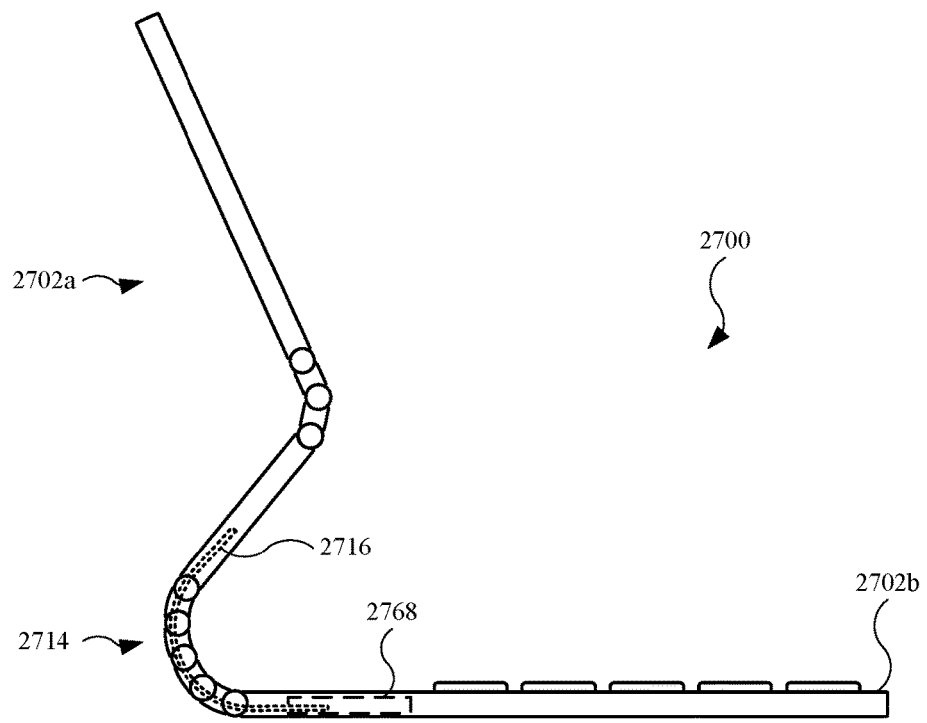
FIG. 51 illustrates a side view of the accessory device in an open position, in accordance with some described embodiments.

FIGS. 51-54 illustrate an exemplary transition of an accessory device 2700 from an open position to a closed position, and resultant movement of the tension adjustment system 2768. FIG. 51 illustrates a side view of the accessory device 2700 in an open position, in accordance with some described embodiments. As shown, the accessory device 2700 includes a section 2702a coupled to a section 2702b by a hinge assembly 2714. Further, the retention structure 2716 passes through the hinge assembly 2714 and connects to the tension adjustment system 2768, which is located in the section 2702b. Also, the retention structure 2716 may be offset (i.e., not centered) in the hinge assembly 2714. For example, the retention structure 2716 is located along an outer, or exterior, region of the hinge assembly 2714. As a result, the hinge assembly 2714 may provide some biasing force, based on the retention structure 2716 under tension, which assists the user in opening the accessory device 2700.

Figure 52:
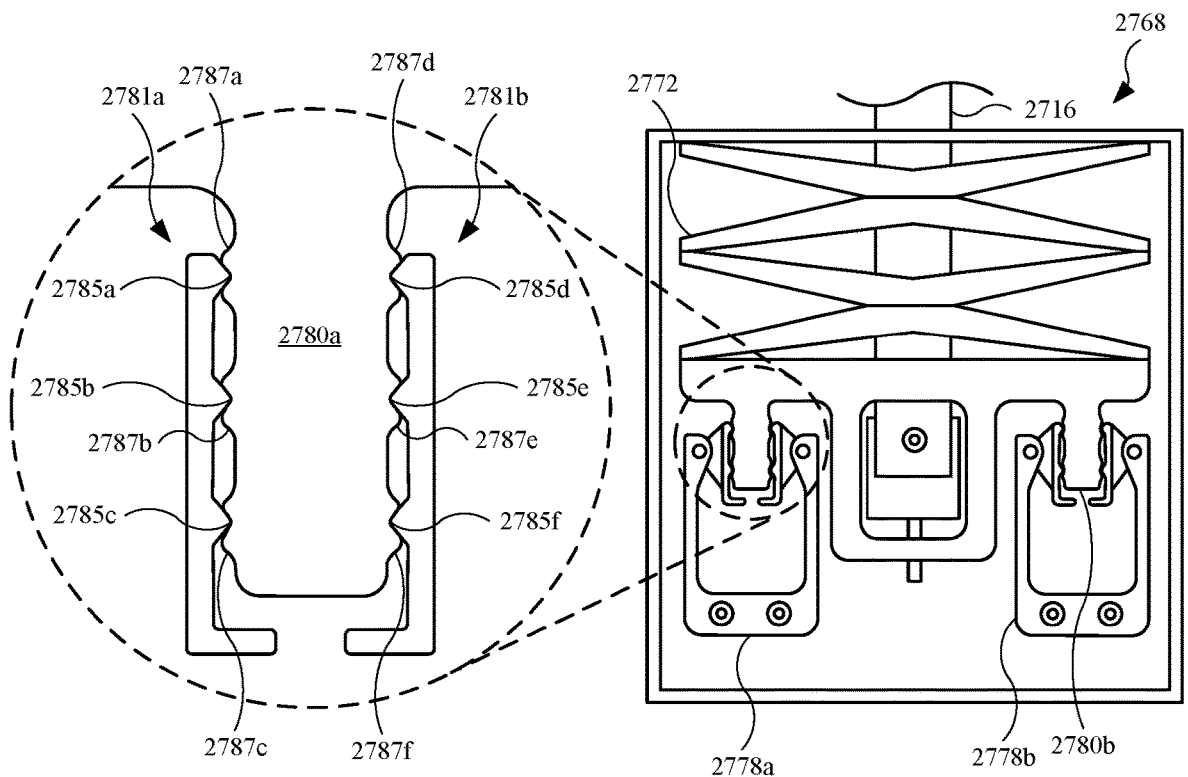
FIG. 52 illustrates a plan view of the tension adjustment system, showing the position of the extension relative to the coupling mechanism when the accessory device is in the open position shown in FIG. 51.

FIG. 52 illustrates a plan view of the tension adjustment system 2768, showing the position of the extension 2780a relative to the coupling mechanism 2778a when the accessory device 2700 is in the open position shown in FIG. 51. The coupling mechanism 2778a is designed to secure the extension 2780a in the open position of the accessory device 2700 (shown in FIG. 51) in the manner described herein. For example, as shown in the enlarged view (with the coupling mechanism 2778a removed for simplicity and illustration), the protrusion 2785a, the protrusion 2785b, and the protrusion 2785b (of the coupling bracket 2781a) are positioned in the receptacle 2787a, the receptacle 2787b and the receptacle 2787c (of the extension 2780a), respectively. Also, the protrusion 2785d, the protrusion 2785e, and the protrusion 2785f (of the coupling bracket 2781b) are positioned in the receptacle 2787d, the receptacle 2787e and the receptacle 2787f (of the extension 2780a), respectively. Accordingly, the extension 2780a can be referred to as being fully engaged with the coupling mechanism 2778a, as all protrusions are positioned in their respective receptacles. It should be noted that the coupling mechanism 2778b can secure the extension 2780b in a similar manner as described for the coupling mechanism 2778a and the extension 2780a. The tension adjustment system 2768 can maintain the retention structure 2716 using the structural element 2774 and provide tension in the form of the biasing mechanism 2772. Although not shown, the accessory device 2700 (shown in FIG. 51) may include additional tension adjustment systems secured to additional retention structures, with each tension adjustment system working in a manner similar to that of the tension adjustment system 2768.

Figure 53:
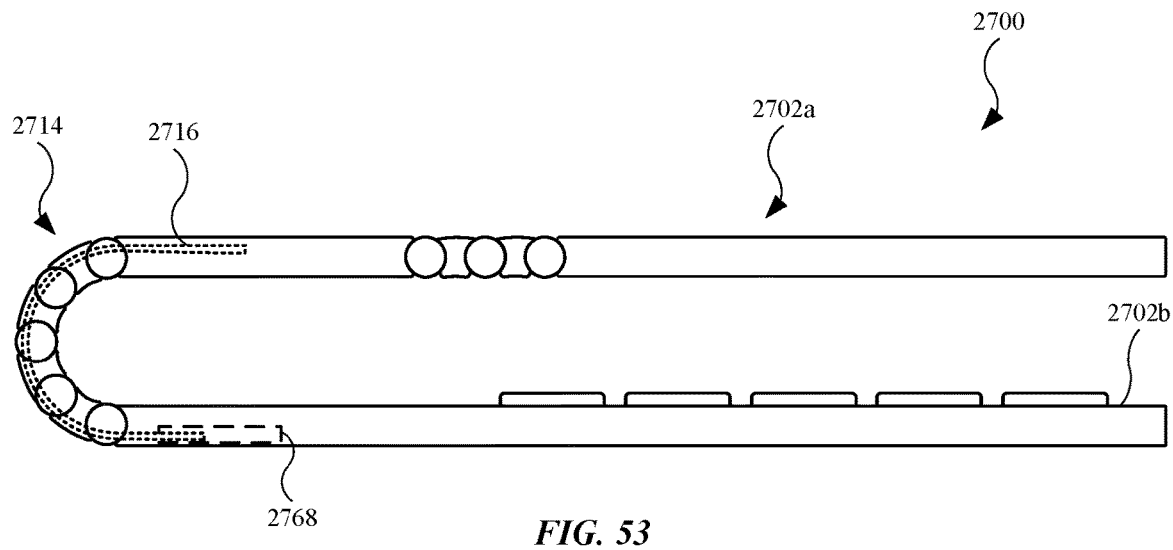
FIG. 53 illustrates a side view of the accessory device in a closed position, subsequent to a transition from the open position, in accordance with some described embodiments.

FIG. 53 illustrates a side view of the accessory device 2700 in a closed position, subsequent to a transition from the open position, in accordance with some described embodiments. As shown, the section 2702a is rotated, using the hinge assembly 2714, such that the section 2702a is positioned over the section 2702b. When the retention structure 2716 is offset within the hinge assembly 2714, the retention structure 2716 may provide additional torque on the components of the hinge assembly 2714 and subsequently provide at least some force to the hinge assembly 2714 that biases the accessory device 2700 in the direction of the open position (shown in FIG. 51). Generally, in the closed position, the section 2702a lies flat, and is parallel with respect to the section 2702b. Subject to the biasing force, the accessory device 2700 may tilt or may not lie flat, and accordingly, may parallel with respect to the section 2702b. However, the tension adjustment system 2768 can reduce the tension on the retention structure 2716, thereby remove the biasing force provided by the hinge assembly 2714 so that the aforementioned sections are parallel to each other in the closed position.

Figure 54:
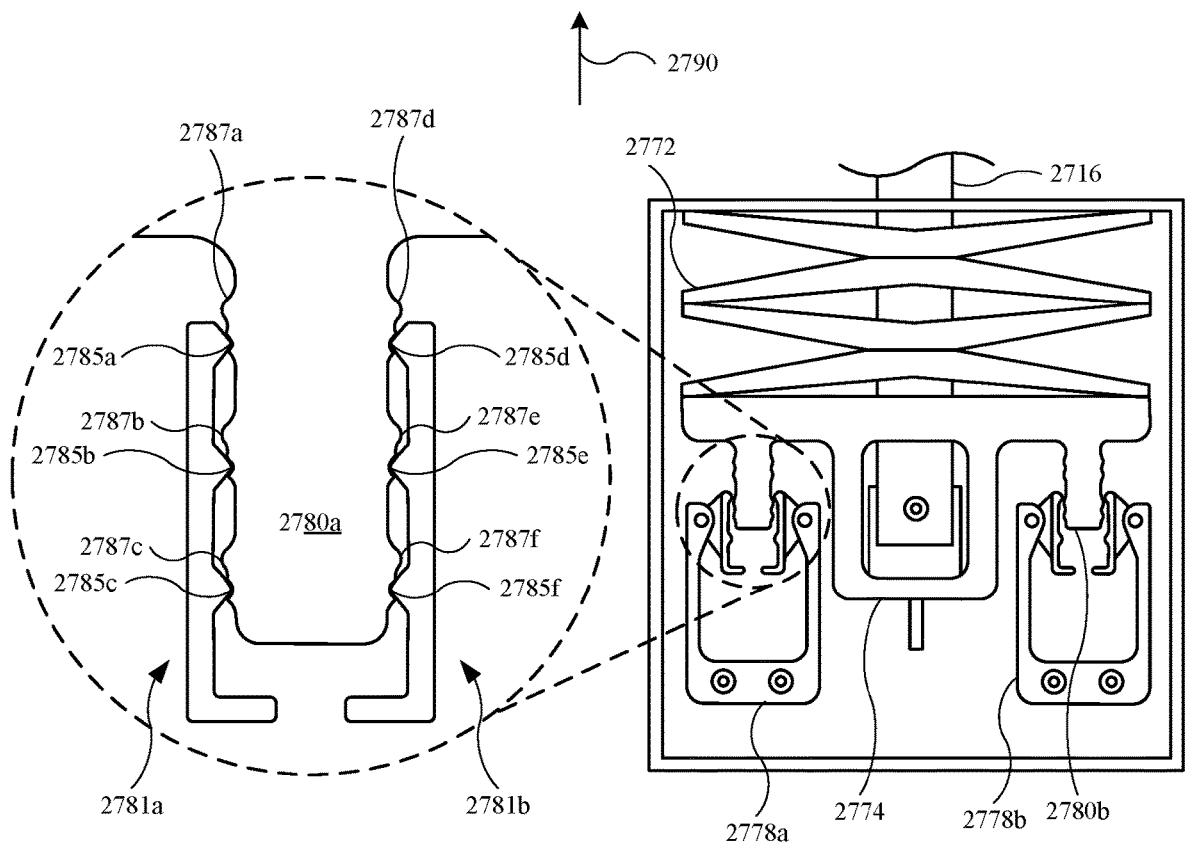
FIG. 54 illustrates a plan view of the tensioning adjustment system, showing the position of the extension relative to the coupling mechanism when the accessory device is in the closed position shown in FIG. 53.

FIG. 54 illustrates a plan view of the tension adjustment system, showing the position of the extension 2780a relative to the coupling mechanism 2778a when the accessory device 2700 is in the closed position shown in FIG. 53. Due to the transition of the accessory device 2700 to the closed position, a pulling force may be exerted on the retention structure 2716, thereby increasing the tension on the retention structure 2716. The increased tension to the retention structure 2716 may provide a force that causes the structural element 2774 to move, which in turn causes a change in the relative position between the extension 2780a and the coupling mechanism 2778a. As shown in the enlarged view (with the coupling mechanism 2778a removed for simplicity and illustration), the protrusions of the coupling mechanism 2778a are shifted with relative to their respective receptacles of the extension 2780a. For example, the protrusion 2785a, the protrusion 2785b, and the protrusion 2785c (of the coupling bracket 2781a) are shifted (and located at different positions on) the receptacle 2787a, the receptacle 2787a, and the receptacle 2787c, respectively. Also, the protrusion 2785d, the protrusion 2785e and the protrusion 2785f (of the coupling bracket 2781b) are shifted (and located at different positions on) the receptacle 2787d, receptacle 2787e, and the receptacle 2787f, respectively. Accordingly, the extension 2780a is partially engaged with the coupling mechanism 2778a, as the extension 2780a is partially pulled away from the coupling mechanism 2778a. Although not expressly shown, the extension 2780b may be in similar relationship with respect to the coupling mechanism 2778b.

It should be noted that the retention structure 2716, under increased tension due to the transition to the closed position, is pulled in a direction 2790, and the structural element 2774, along with the extension 2780a and the extension 2780b, is also pulled in the direction 2790. Based on the structural element 2774 moving in the direction 2790 (due to the partial decoupling between the extensions and the coupling mechanism), the structural element 2774 provides at least some tension relief to the retention structure 2716. As a result, the torque provided by the retention structure 2716 to the hinge assembly 2714 (shown in FIG. 53) is reduced such that the bias to the open position is reduced or eliminated, and the accessory device 2700 remains fully closed. Accordingly, the tension adjustment system 2768 provides a notable advantage over stationary fasteners that fixed each end of the retention structure 2716 to the accessory device 2700, and subsequently provide a relatively static tension to the retention structure 2716.

Figure 55:
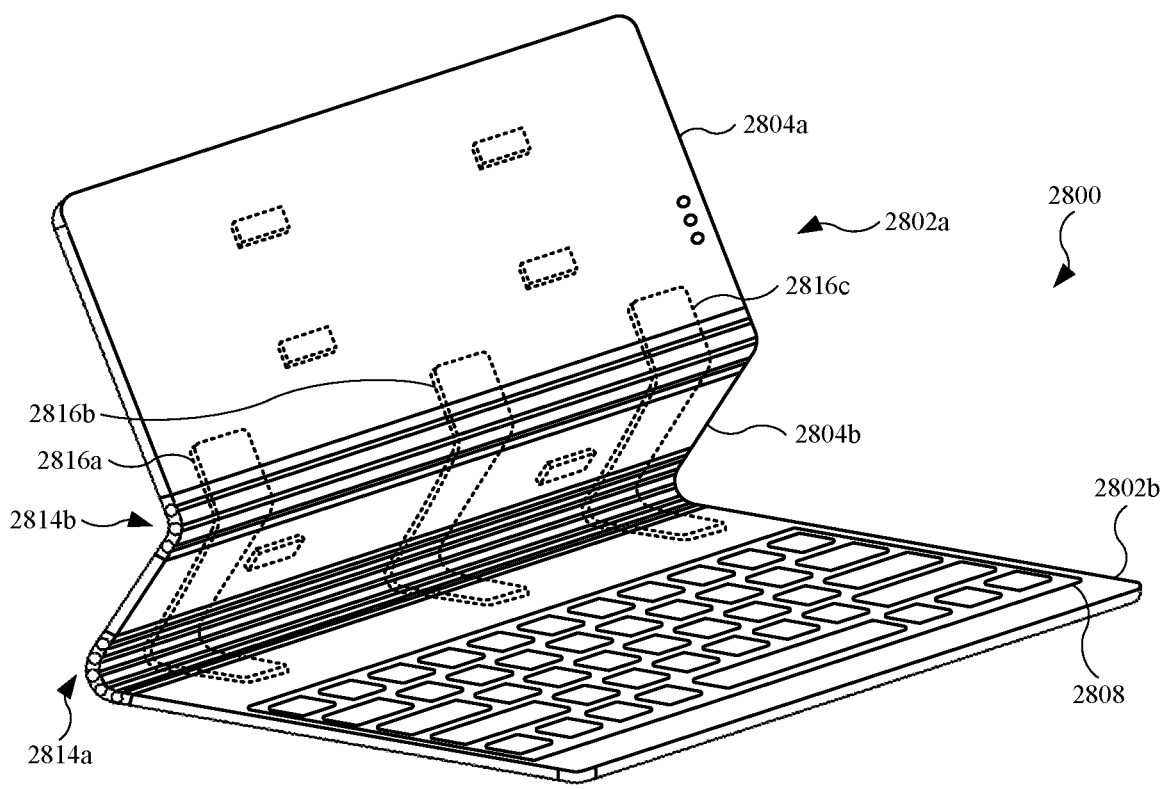
FIG. 55 illustrates an isometric view of an alternate embodiment of an accessory device, showing an alternate arrangement of retention structures passing through multiple hinge assemblies, in accordance with some described embodiments.
Figure 56:
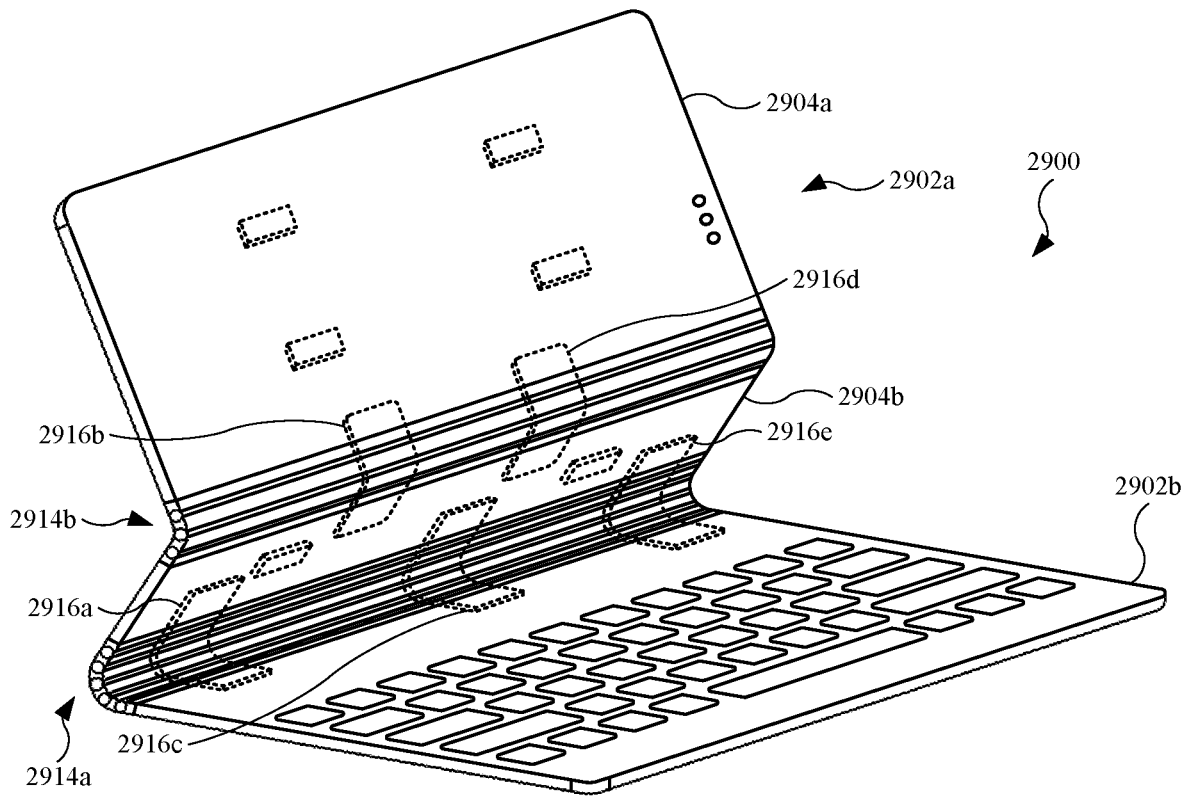
FIG. 56 illustrates an isometric view of an alternate embodiment of an accessory device, showing a different number of retention structures passing through hinge assemblies, in accordance with some described embodiments.

FIGS. 55 and 56 illustrate alternate embodiments of accessory devices. The accessory devices shown and described in FIGS. 55 and 56 may integrate at least some features previously described for an accessory device, such as hinge assemblies and/or retention structures.

FIG. 55 illustrates an isometric view of an alternate embodiment of an accessory device 2800, showing an alternate arrangement of retention structures passing through multiple hinge assemblies, in accordance with some described embodiments. As shown, the accessory device 2800 includes a section 2802a and a section 2802b connected to the section 2802a by a hinge assembly 2814a, thereby allowing relative rotational movement between the section 2802a and the section 2802b. The section 2802a further includes a segment 2804a and a segment 2804b connected to the segment 2804a by a hinge assembly 2814b, thereby allowing relative rotational movement between the segment 2804a and the segment 2804b.

The section 2802b includes an input mechanism 2808. As shown in FIG. 53, the input mechanism 2808 is a display, which includes a capacitive touch input display. The input mechanism 2808 is presenting a keyboard. However, the input mechanism 2808 may present several different types of input features, such as a dynamic row of function buttons that displays information specific to a software application running on an electronic device (not shown in FIG. 55), a touch pad (in conjunction with the keyboard), and/or other features. It should be noted that the input mechanism 2808 can provide a command to an electronic device (not shown in FIG. 55) that is in communication with the accessory device 2800.

The accessory device 2800 further includes a retention structure 2816a, a retention structure 2816b, and a retention structure 2816c. As shown, the retention structure 2816a, the retention structure 2816b, and the retention structure 2816c pass through both the hinge assembly 2814a and the hinge assembly 2814b. With at least one of the retention structures passing through both the hinge assembly 2814a and the hinge assembly 2814b, the accessory device 2800 can provide coordinated and regulated movement of the hinge assembly 2814a and/or the hinge assembly 2814b. For instance, similar to the hinge assembly 114a and the hinge assembly 114b shown and described in FIGS. 6 and 7, the hinge assembly 2814a may be free to move while the hinge assembly 2814b remains fixed, and vice versa.

FIG. 56 illustrates an isometric view of an alternate embodiment of an accessory device 2900, showing a different number of retention structures passing through hinge assemblies, in accordance with some described embodiments. As shown, the accessory device 2900 includes a section 2902a and a section 2902b connected to the section 2902a by a hinge assembly 2914a, thereby allowing relative rotational movement between the section 2902a and the section 2902b. The section 2902a further includes a segment 2904a and a segment 2904b connected to the segment 2904a by a hinge assembly 2914b, thereby allowing relative rotational movement between the segment 2904a and the segment 2904b.

The accessory device 2900 further includes a retention structure 2916a, a retention structure 2916b, a retention structure 2916c, a retention structure 2916d, and a retention structure 2916e. As shown, the retention structure 2916a, the retention structure 2916c, and the retention structure 2916e pass through both the hinge assembly 2914a, while the retention structure 2916b and the retention structure 2916d pass through the hinge assembly 2914b. By providing a different number of retention structures that pass through the hinge assemblies, the hinge assemblies may provide different properties. For example, due to the greater number of integrated retention structures, the hinge assembly 2914a may provide greater stiffness than the hinge assembly 2914b. As a result, the hinge assembly 2914a can support more weight/force than the hinge assembly 2914b, or the hinge assembly 2914a may resist move more than the hinge assembly 2914b. However, the hinge assembly 2914b may be more flexible than the hinge assembly 2914a, thereby providing the hinge assembly 2914b with greater ease of movement. It should be noted that in some embodiments (not shown in FIG. 56), the hinge assembly 2914b includes a greater number of retention structures as compared to the hinge assembly 2914a.

Figure 57:
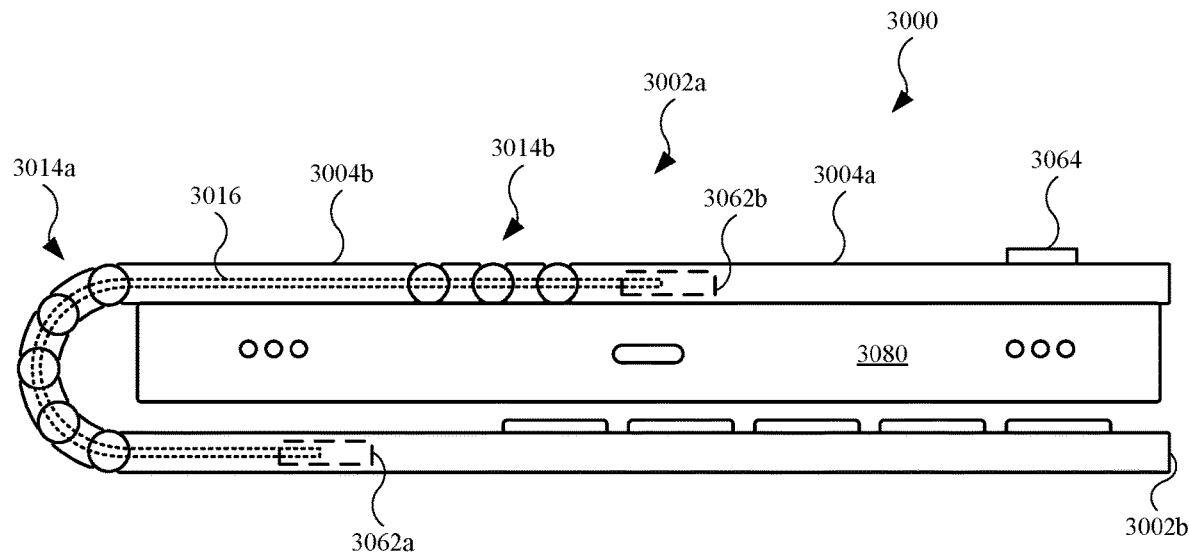
FIG. 57 illustrates a side view of an alternate embodiment of an accessory device with an automated opening system, showing the accessory device in a closed position, in accordance with some described embodiments.
Figure 58:
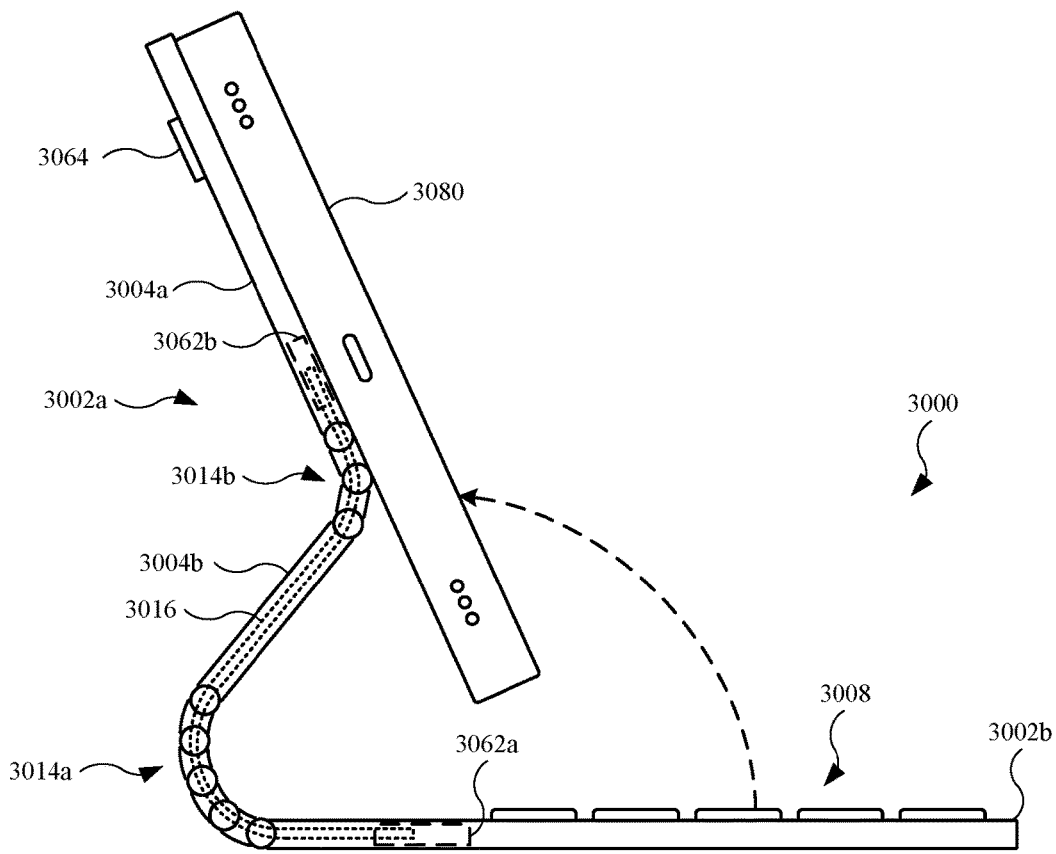
FIG. 58 illustrates a side view of the accessory device shown in FIG. 47, showing the accessory device in an open position using the automated opening system.

FIGS. 57 and 58 illustrate an accessory device capable of automated opening and closing using a retention structure. FIG. 57 illustrates a side view of an alternate embodiment of an accessory device 3000 with an automated opening system, showing the accessory device 3000 in a closed position, in accordance with some described embodiments. As shown, the accessory device 3000 includes a section 3002a and a section 3002b connected to the section 3002a by a hinge assembly 3014a, thereby allowing relative rotational movement between the section 3002a and the section 3002b. The section 3002a further includes a segment 3004a and a segment 3004b connected to the segment 3004a by a hinge assembly 3014b, thereby allowing relative rotational movement between the segment 3004a and the segment 3004b. Also, similar to prior embodiments, the accessory device 3000 is capable of carrying an electronic device 3080.

The accessory device 3000 may further include a retention structure 3016 that passes through both the hinge assembly 3014a and the hinge assembly 3014b. The retention structure 3016 may promote synchronous movement of the hinge assembly 3014a and the hinge assembly 3014b. The accessory device 3000 may additional features designed to further promote movement of the hinge assemblies. For example, the accessory device 3000 may include automated opening. The automated opening may include an automated system 3062a and an automated system 3062b. The automated system 3062a and the automated system 3062b may each include a motor (including a step motor), a spring-loaded mechanism, and/or a cam mechanism. The accessory device 3000 may include an internal power supply (not shown in FIG. 57), such as a battery, that provides energy to the automated system 3062a and the automated system 3062b. Alternatively, the accessory device 3000 can receive energy from an internal power supply located in an electronic device (not shown in FIG. 57) when the accessory device 3000 is coupled to the electronic device. As shown, the automated system 3062a is secured to one end of the retention structure 3016, and the automated system 3062b is secured to the other (opposing) end of the retention structure 3016. The automated system 3062a and the automated system 3062b can work in unison to adjust the tension of the retention structure 3016. For instance, the automated system 3062a and the automated system 3062b can provide a pulling force to each end the retention structure 3016. The pulling force may include a winding of the retention structure 3016 to reduce the amount of "free" or available retention structure available to the hinge assembly 3014a and the hinge assembly 3014b. As result of the pulling force to the retention structure 3016, the retention structure 3016 may cause movement of the hinge assembly 3014a and the hinge assembly 3014b. This will be further shown and described below. The accessory device 3000 may further include a button 3064 that can be operated by a user. The button 3064 may include a mechanical button that actuates a switch (not shown in FIG. 57), or a button with a capacitive touch interface. The button 3064 is used to control the automated system 3062a and the automated system 3062b. Accordingly, the button 3064 can control the retention structure 3016, and in turn, control the hinge assembly 3014a and the hinge assembly 3014b. It should be noted that in some embodiments, the accessory device 3000 includes a single automated system.

FIG. 58 illustrates a side view of the accessory device shown in FIG. 57, showing the accessory device 3000 in an open position using the automated opening system. When a user (not shown in FIGS. 57 and 58) contacts the button 3064, the accessory device 3000 can automatically transition from the closed position (shown in FIG. 57) to the open position shown in FIG. 58. By contacting the button 3064, the user activates the automated system 3062a and the automated system 3062b, which increases the tension in the retention structure 3016 and causes movement of the hinge assembly 3014a and the hinge assembly 3014b. The movement of the hinge assembly 3014a rotates the section 3002a from the section 3002b. Also, the movement of the hinge assembly 3014b causes the segment 3004a to move relative to the segment 3004b. As a result, the electronic device 3080 is positioned at a desirable angle with respect to an input mechanism 3008 of the section 3002b. Although not shown, the accessory device 3000 may be capable of transitioning back to the closed position (shown in FIG. 57) by subsequently contacting the button 3064 and/or by contacting the input mechanism 3008. FIGS. 57 and 58 illustrate an accessory device that can automatically move to vary desirable positions without manual movement (other than interacting with the button 3064 or the input mechanism 3008).

Figure 59:
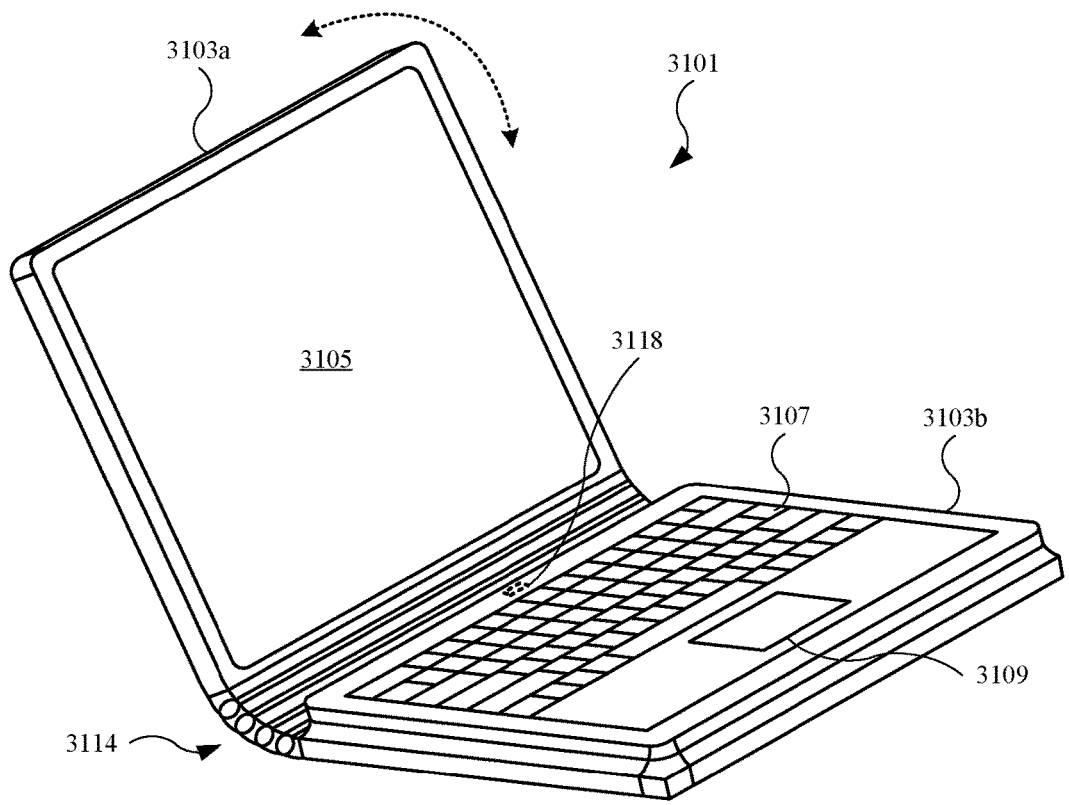
FIG. 59 illustrates an isometric view of an embodiment of a portable electronic device, showing the accessory device in an open position, in accordance with some described embodiments.

Hinge assemblies described herein may be integrated with other devices. For example, FIG. 59 illustrates an isometric view of an embodiment of a portable electronic device 3101, showing the portable electronic device 3101 in an open position, in accordance with some described embodiments. The portable electronic device 3101 may include a laptop computing device. As shown, the portable electronic device 3101 includes a housing 3103a, or display housing, that carries a display 3105 of the portable electronic device 3101. The portable electronic device 3101 may further include a housing 3103b, or base portion, that includes an input mechanism such as a keyboard assembly 3107 and a touch pad 3109, both of which are designed to generate an input or command to a processing system (not shown in FIG. 59) of the portable electronic device 3101. The portable electronic device 3101 may further include a hinge assembly 3114 coupled to the housing 3103a and the housing 3103b. The hinge assembly 3114 allows for rotational movement of the housing 3103a with respect to the housing 3103b, and vice versa. The portable electronic device 3101 is shown in an open position. However, the hinge assembly 3114 allows the housing 3103a to rotate over the housing 3103b such that the display 3105 is positioned over the keyboard assembly 3107 and the touch pad 3109, thereby defining a closed position. The hinge assembly 3114 may include one or more features described herein for hinge assemblies, spacer elements, roller elements, and/or retention structures, as non-limiting examples. Also, the portable electronic device 3101 may include an audio module 3118, or speaker, that emits acoustical energy in the form of audible sound. Based on the position of the portable electronic device 3101 and the hinge assembly 3114, the acoustical energy produced by the audio module 3118 can exit the housing 3103b, and reflect off of the hinge assembly 3114 in a direction toward a user.

Figure 60:
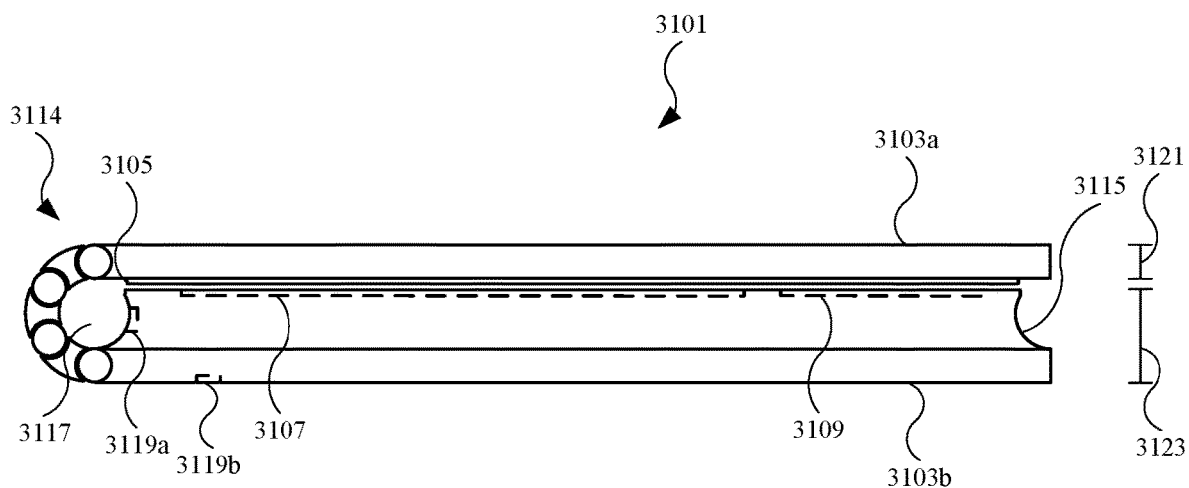
FIG. 60 illustrates a side view of the portable electronic device shown in FIG. 59, showing the portable electronic device in a closed position.

FIG. 60 illustrates a side view of the portable electronic device 3101 shown in FIG. 59, showing the portable electronic device 3101 in a closed position. As shown, the housing 3103a includes a thickness 3121 and the housing 3103b includes a thickness 3123 that is greater than the thickness 3121 of the housing 3103a. Also, the thickness 3121 of the housing 3103a is the same, or at least approximately the same, thickness as that of the hinge assembly 3114. Also, the housing 3103b may include a notch 3115, or curved portion, that allows a user to position a digit (such as a finger) under the housing 3103a and pull the housing 3103a away from the housing 3103b, and transition the portable electronic device 3101 from the closed position to the open position (as shown in FIG. 59).

The housing 3103b may include a recess. As shown in FIG. 60, the recess may position the keyboard assembly 3107 and the touch pad 3109 sub-flush, or below, an uppermost surface of the housing 3103b. In this manner, in the closed position, the display 3105 may not contact the keyboard assembly 3107 or the touch pad 3109. Also, in the closed position, the portable electronic device 3101 defines an opening 3117 capable of carrying an object (not shown in FIG. 60) such as a stylus or other digital interactive tool designed to provide an input to the display 3105. In this manner, when the display 3105 includes touch input capabilities, the portable electronic device 3101 can carry the object and the object can be removed from the opening 3117 so that the user can interact with the display 3105 using the object. As shown, the hinge assembly 3114 and the housing 3103b are shaped such that the opening 3117 includes a circular opening. However, other shapes are possible.

Furthermore, the opening 3117 may provide a thermal dissipation path for the portable electronic device 3101. For example, the portable electronic device 3101 may include an opening 3119a (representative of several openings) used as an air intake opening to provide cooling capabilities for internal components (such as processing circuits) located in the housing 3103b. The air entering the opening 3119a can subsequently leave an opening 3119b (representative of several openings) after the air convectively cools the internal components.

Figure 61:
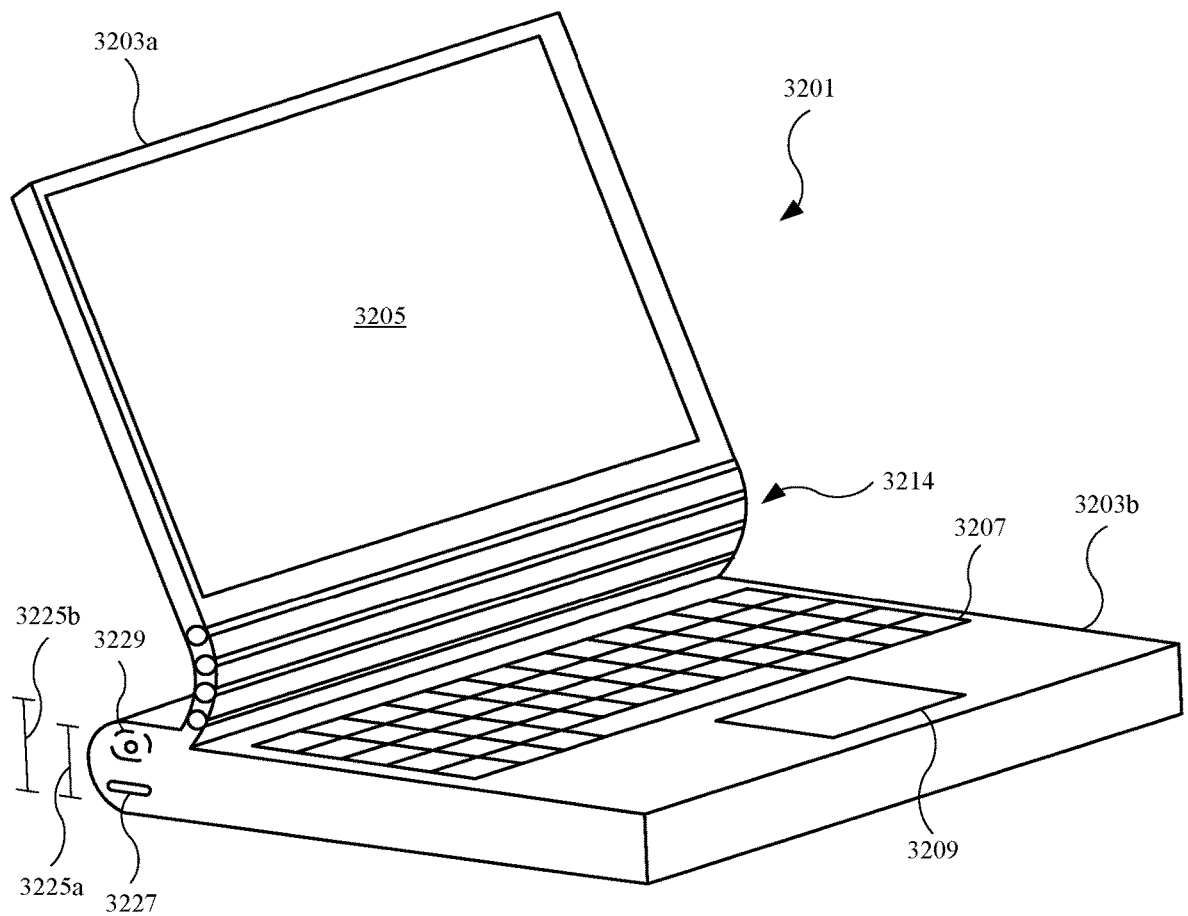
FIG. 61 illustrates an isometric view of an alternate embodiment of a portable electronic device, showing the portable electronic device in an open position, in accordance with some described embodiments.

FIG. 61 illustrates an isometric view of an alternate embodiment of a portable electronic device 3201, showing the portable electronic device 3201 in an open position, in accordance with some described embodiments. The portable electronic device 3201 may include a laptop computing device. As shown, the portable electronic device 3201 may include a housing 3203a, or display housing, that carries a display 3205 of the portable electronic device 3201. The portable electronic device 3201 may further include a housing 3203b, or base portion, that includes input mechanism such as a keyboard assembly 3207 and a touch pad 3209, both of which are designed to generate an input or command to a processing system (not shown in FIG. 61) of the portable electronic device 3201. The portable electronic device 3201 may further include a hinge assembly 3214 coupled to the housing 3203a and the housing 3203b. The hinge assembly 3214 allows for rotational movement of the housing 3203a with respect to the housing 3203b, and vice versa. The portable electronic device 3201 is shown in an open position. However, the hinge assembly 3214 allows the housing 3203a to rotate over the housing 3203b such that the display 3205 is positioned over the keyboard assembly 3207 and the touch pad 3209, thereby defining a closed position. The hinge assembly 3214 may include one or more features described herein for hinge assemblies, spacer elements, roller elements, and/or retention structures, as non-limiting examples.

While the housing 3203b provides an additional thickness (as compared to the housing 3203a), the housing 3203b may further provide a two-tiered thickness. For instances, the housing 3203b includes a dimension 3225a and a dimension 3225b. As shown, the dimension 3225b is greater than the dimension 3225a, corresponding to a greater thickness along the dimension 3225b as compared to the thickness along the dimension 3225a. As a result, the housing 3203b that can be utilized by positioning certain components in a location of the housing 3203b corresponding to the dimension 3225b. For example, the housing 3203b includes a port 3227 that can be used for power and data transmission to the portable electronic device 3201. The housing 3203b may further include an audio module 3229 that can be used for transmission of acoustical energy in the form of audible sound. As shown, both the port 3227 and the audio module 3229 are in a location of the housing 3203b corresponding to the dimension 3225b.

Figure 62:
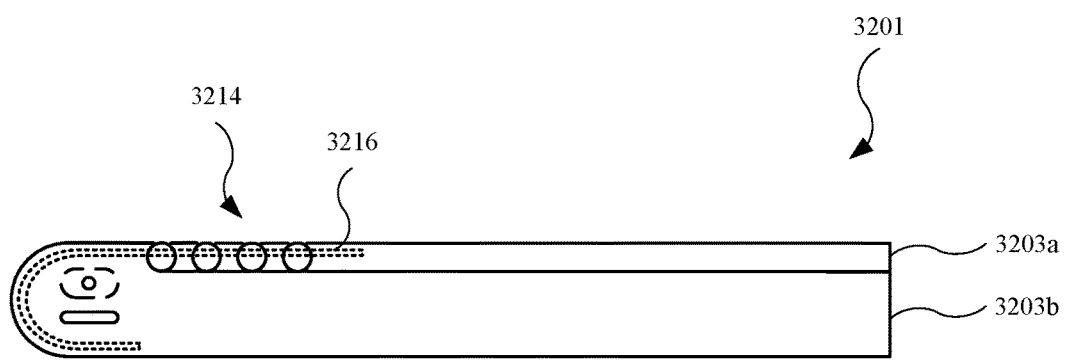
FIG. 62 illustrates a side view of the portable electronic device shown in FIG. 61, showing the portable electronic device in a closed position.

FIG. 62 illustrates a side view of the portable electronic device 3201 shown in FIG. 61, showing the accessory device in a closed position. As shown, the hinge assembly 3214 allows the housing 3203a to move relative to the housing 3203b. The hinge assembly 3214 may include a retention structure 3216 used to keep roller elements and spacer elements (not labeled) together, and to promote frictional engagement between the roller elements and the spacer elements.

Figure 63:
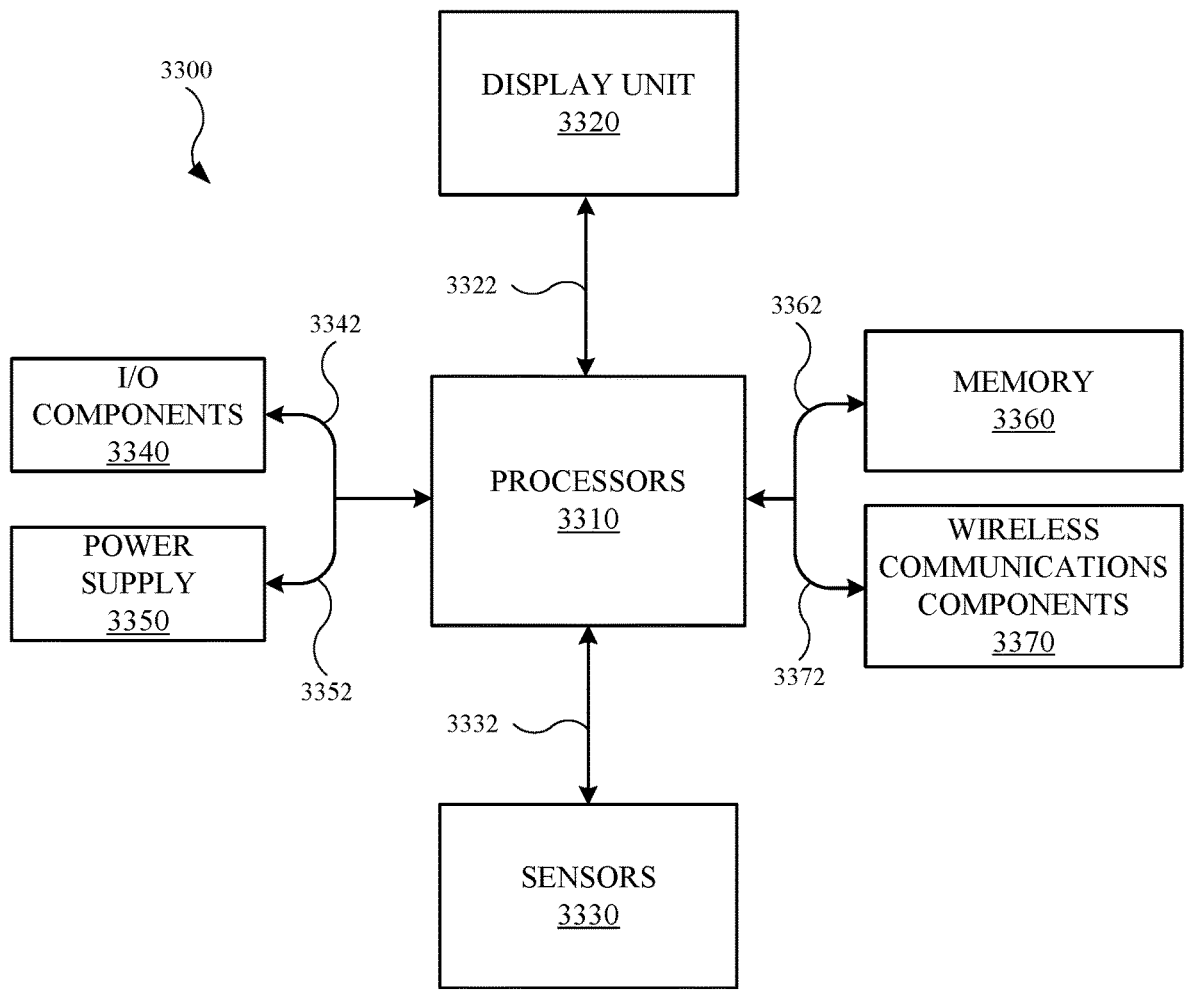
FIG. 63 illustrates a block diagram of an electronic device, in accordance with some described embodiments.

FIG. 63 illustrates a block diagram of an electronic device 3300, in accordance with some embodiments. The electronic device 3300 may include a portable electronic device, such as a mobile wireless communication device described herein. The electronic device 3300 is capable of implementing the various techniques described herein. The electronic device 3300 may include one or more processors 3310 for executing functions of the electronic device 3300. The one or more processors 3310 can refer to at least one of a central processing unit (CPU) and at least one microcontroller for performing dedicated functions. Also, the one or more processors 3310 can refer to application specific integrated circuits.

According to some embodiments, the electronic device 3300 can include a display unit 3320. The display unit 3320 is capable of presenting a user interface that includes icons (representing software applications), textual images, and/or motion images. In some examples, each icon can be associated with a respective function that can be executed by the one or more processors 3310. In some cases, the display unit 3320 includes a display layer (not illustrated), which can include a liquid-crystal display (LCD), light-emitting diode display (LED), or the like. According to some embodiments, the display unit 3320 includes a touch input detection component and/or a force detection component that can be configured to detect changes in an electrical parameter (e.g., electrical capacitance value) when the user's appendage (acting as a capacitor) comes into proximity with the display unit 3320 (or in contact with a transparent cover layer that covers the display unit 3320). The display unit 3320 is connected to the one or more processors 3310 via one or more connection cables 3322.

According to some embodiments, the electronic device 3300 can include one or more sensors 3330 capable of detecting an orientation of the electronic device 3300. In some examples, the one or more sensors 3330 may include an accelerometer, an electronic gyroscope, or some other orientation sensor. In some embodiments, the one or more sensors 3330 can determine whether the electronic device 3300 is positioned in a manner that a user can use certain features, such as an input mechanism of an accessory device (not shown in FIG. 63). In response, the one or more processors 3310 can modify a notification that activates both the keyboard and the display unit 3320. The one or more sensors 3330 can also include magnetic field sensors, such as Hall Effect sensors. The one or more sensors 3330 is/are connected to the one or more processors 3310 via one or more connection cables 3332.

According to some embodiments, the electronic device 3300 can include one or more input/output components 3340 that enable communication between a user and the electronic device 3300. In some cases, the one or more input/output components 3340 can refer to a button or a switch that is capable of actuation by the user. In some examples, the one or more input/output components 3340 can refer to a switch having a mechanical actuator (e.g., spring-based switch, slide-switch, rocker switch, rotating dial, etc.) or other moving parts that enable the switch to be actuated by the user. The one or more input/output components 3340 can include an accelerometer that determines whether the electronic device 3300, and to what extent, is accelerating or decelerating. When the one or more input/output components 3340 are used, the one or more input/output components 3340 can generate an electrical signal that is provided to the one or more processors 3310 via one or more connection cables 3342.

According to some embodiments, the electronic device 3300 can include a power supply 3350 that is capable of providing energy to the operational components of the electronic device 3300. In some examples, the power supply 3350 can refer to a rechargeable battery. The power supply 3350 can be connected to the one or more processors 3310 via one or more connection cables 3352. The power supply 3350 can be directly connected to other devices of the electronic device 3300, such as the one or more input/output components 3340. In some examples, the electronic device 3300 can receive power from another power sources (e.g., an external charging device) not shown in FIG. 63.

According to some embodiments, the electronic device 3300 can include memory 3360, which can include a single disk or multiple disks (e.g., hard drives), and includes a storage management module that manages one or more partitions within the memory 3360. In some cases, the memory 3360 can include flash memory, semiconductor (solid state) memory or the like. The memory 3360 can also include a Random Access Memory ("RAM") and a Read-Only Memory ("ROM"). The ROM can store programs, utilities or processes to be executed in a non-volatile manner. The RAM can provide volatile data storage, and stores instructions related to the operation of the electronic device 3300. In some embodiments, the memory 3360 refers to a non-transitory computer readable medium, where an operating system ("OS") is established at the memory 3360 that can be configured to execute software applications. The one or more processors 3310 can also be used to execute software applications. In some embodiments, a data bus 3362 can facilitate data transfer between the memory 3360 and the one or more processors 3310.

According to some embodiments, the electronic device 3300 can include wireless communications components 3370. A network/bus interface 3372 can couple the wireless communications components 3370 to the one or more processors 3310. The wireless communications components 3370 can communicate with other electronic devices via any number of wireless communication protocols, including at least one of a global network (e.g., the Internet), a wide area network, a local area network, a wireless personal area network (WPAN), or the like. In some examples, the wireless communications components 3370.

It should also be noted that accessory described herein may include several features described herein for the electronic device 3300, such as one or more processors 3310, the sensors 3330, the input/output components 3340, the power supply 3350, memory 3360, and the wireless communications components 3370.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device suitable for use with an electronic device, the accessory device comprising:
    a first section comprising a first segment and a second segment;
    a second section comprising an input mechanism configured to provide a command to the electronic device;
    a first hinge assembly coupled to the first section and the second section, the first hinge assembly comprising:
        a first cylindrical roller element;
        a second cylindrical roller element, wherein each of the first cylindrical roller element and the second cylindrical roller element comprises circular cross section; and
        a spacer element having i) a first receiving surface engaging the first cylindrical roller element and ii) a second receiving surface engaging the second cylindrical roller element; and
    a second hinge assembly coupled to the first segment and the second segment; and
    a retention structure coupled to the first section and the second section, the retention structure passing through at least the first hinge assembly,
    wherein a first position comprises the first section positioned over the second section and the first segment being fixed relative to the second segment, and
    wherein a second position comprises the first section rotated away from the second section via the first hinge assembly such that the input mechanism is uncovered by the first section, and the first segment is rotated relative to the second segment via the second hinge assembly.

2. The accessory device of claim 1, wherein the first segment and the second segment define a receiving surface for the electronic device in the first position, and in the second position, a rotation of the first segment relative to the second segment causes the second segment to disengage from the electronic device.

3. The accessory device of claim 2, wherein the first hinge assembly allows the first segment to move relative to the second segment only in the second position.

4. The accessory device of claim 1, wherein the second position comprises the first section rotated away from the second section by a maximum angle of rotation between the first section and the second section, the maximum angle of rotation based upon the second hinge assembly.

5. The accessory device of claim 1,
    wherein the first cylindrical roller element and the second cylindrical roller element rotate along the first receiving surface and the second receiving surface, respectively, while transitioning from the first position to the second position.

6. The accessory device of claim 5, wherein the spacer element comprises:
    a first insert having a first set of protrusions positioned in the first cylindrical roller element, the first set of protrusions directed toward a first portion of the spacer element; and
    a second insert having a second set of protrusions positioned in the second cylindrical roller element, the second set of protrusions directed toward a second portion of the spacer element, the second portion being different from the first portion.

7. The accessory device of claim 1, further comprising:
    a tension adjustment system coupled to the retention structure, the tension adjustment system configured to adjust tension to the retention structure in the first position.

8. An accessory device suitable for use with an electronic device, the accessory device comprising:
    a first section that defines a receiving surface for the electronic device;
    a second section comprising an input mechanism configured to provide a command to the electronic device; and
    a hinge assembly coupled to the first section and the second section, the hinge assembly comprises:
        a first roller element that includes a first opening;
        a second roller element that includes a second opening; and a spacer element that engages the first roller element and the second roller element, the spacer element having i) a first protrusion located in the first opening and ii) a second protrusion located in the second opening, wherein the first roller element and the second roller element rotate along the spacer element while the first section rotates relative to the second section.

9. The accessory device of claim 8, further comprising a retention structure coupled to the first section and the second section, the retention structure that passes through the first roller element, the second roller element, and the spacer element.

10. The accessory device of claim 9, further comprising a shim structure positioned on the retention structure, the shim structure remains engaged with the first roller element and the second roller element.

11. The accessory device of claim 8, wherein the hinge assembly comprises a first hinge assembly, and wherein the first section comprises:
a first segment;
a second segment; and
a second hinge assembly that couples the first segment with the second segment.

12. The accessory device of claim 11, wherein a first position comprises the first section positioned over the second section and the first segment being fixed relative to the second segment, and wherein a second position comprises the first section rotated away from the second section via the first hinge assembly, and the first segment is capable of rotation relative to the second segment via the second hinge assembly.

13. The accessory device of claim 8, wherein the spacer element comprises:
a first convex surface that engages the first roller element; and
a second convex surface that engages the second roller element.

14. The accessory device of claim 8, further comprising a fastening component, wherein:
the first roller element comprises a first roller element opening,
the second roller element comprises a second roller element opening,
the spacer element comprises a spacer element opening, and
the fastening component passes through the spacer element opening and is positioned in the first roller element opening and the second roller element opening.

15. An accessory device suitable for use with an electronic device, the accessory device comprising:
a first section comprising a first segment and a second segment;
a second section comprising an input mechanism configured to provide a command to the electronic device,
a first hinge assembly coupled to the first section and the second section, the first hinge assembly comprising:
a roller element having a first opening defined by a planar surface and a curved surface opposite the planar surface,
a spacer element engaging the roller element, the spacer element having a second opening, and
a retention structure passing through the first opening and the second opening, the retention structure secured to the first section and the second section; and
a second hinge assembly that rotationally couples the first segment with the second segment
wherein a first position comprises:
the first segment and the second segment engaging the electronic device, and
the retention structure engaging the planar surface, and
wherein a second position comprises:
the first section rotated relative to the second section to a maximum angle based on the second hinge assembly,
the retention structure engaging the curved surface, and
the second segment is free of contact with the electronic device.

16. The accessory device of claim 15, wherein the maximum angle is between 50 and 75 degrees.

17. The accessory device of claim 15, wherein:
the first segment comprises a first magnet configured to form a first magnetic coupling with a first device magnet of the electronic device,
the second segment comprising a second magnet configured to form a second magnetic coupling with a second device magnet of the electronic device, and
rotation of the first segment relative to the second segment overcomes the second magnetic coupling.

18. The accessory device of claim 15, wherein the planar surface is defined by a flat surface and the curved surface is defined by a convex surface.

19. The accessory device of claim 15, wherein the first hinge assembly provides a counterbalance force that offsets the electronic device, and wherein the counterbalance force varies based upon a relative position between the first segment and the second segment.

* * * * *